United States Patent
Park et al.

(10) Patent No.: US 9,453,299 B2
(45) Date of Patent: Sep. 27, 2016

(54) HOME APPLIANCE, HOME APPLIANCE SYSTEM, AND METHOD FOR OPERATING SAME

(75) Inventors: Chang Kwon Park, Changwon-si (KR); Mi Kyung Ha, Changwon-si (KR); Min Hwan Hong, Changwon-si (KR); Woon Je Choe, Changwon-si (KR); Jong Hye Han, Changwon-si (KR); Pyoung Hwan Kim, Changwon-si (KR); Sang Su Lee, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 603 days.

(21) Appl. No.: 13/698,460

(22) PCT Filed: May 17, 2011

(86) PCT No.: PCT/KR2011/003653
§ 371 (c)(1),
(2), (4) Date: Apr. 4, 2013

(87) PCT Pub. No.: WO2011/145873
PCT Pub. Date: Nov. 24, 2011

(65) Prior Publication Data
US 2013/0185079 A1    Jul. 18, 2013

(30) Foreign Application Priority Data

| May 17, 2010 | (KR) | 10-2010-0046110 |
|---|---|---|
| May 17, 2010 | (KR) | 10-2010-0046111 |
| May 20, 2010 | (KR) | 10-2010-0047583 |
| May 20, 2010 | (KR) | 10-2010-0047584 |
| May 20, 2010 | (KR) | 10-2010-0047585 |
| Jun. 17, 2010 | (KR) | 10-2010-0057641 |

(51) Int. Cl.
*G10L 21/00* (2013.01)
*D06F 39/00* (2006.01)
(Continued)

(52) U.S. Cl.
CPC ............. *D06F 39/005* (2013.01); *D06F 33/02* (2013.01); *G10L 15/26* (2013.01); *H04L 12/2818* (2013.01); *D06F 2210/00* (2013.01); *D06F 2216/00* (2013.01)

(58) Field of Classification Search
CPC ......... G10L 15/26; G10L 15/30; G10L 5/22; G10L 15/265; D06F 39/005; D06F 33/02; D06F 39/022; D06F 39/125; H04L 12/2818; H04L 2012/285; H04L 12/12; A47B 77/08; G08B 13/1418; G08B 25/08; G08C 2201/40; G08C 2201/41; G08C 2201/42; G08C 2201/50; G08C 2201/93; G08C 23/04
USPC ............... 704/270, 270.1, 275, 246; 340/3.7, 340/10.1, 12.5, 13.24, 310.11, 3.1, 4.3, 340/679; 700/90; 370/338; 379/106.01; 455/41.2, 426.1, 426.2, 466; 715/771
See application file for complete search history.

(56) References Cited

U.S. PATENT DOCUMENTS 5,987,105 A * 11/1999 Jenkins et al. ........... 379/106.01
6,987,462 B2 * 1/2006 Bae et al. .................... 340/12.5
(Continued)

FOREIGN PATENT DOCUMENTS

| CN | 1316863 | 10/2001 |
|---|---|---|
| CN | 1343806 A | 4/2002 |

(Continued)

*Primary Examiner* — Vijay B Chawan
(74) *Attorney, Agent, or Firm* — Dentons US LLP

(57) ABSTRACT

The present invention relates to a home appliance, to a home appliance system, and to a method for operating same, wherein the home appliance and a mobile terminal are connected to one another to add or update data in the home appliance through the mobile terminal connected thereto, diagnose the state of the home appliance by means of the mobile terminal, and supplement the function of the home appliance by means of the mobile terminal, thus expanding the functions of the home appliance to enable the easy control of the home appliance, and more conveniently controlling the home appliance.

18 Claims, 33 Drawing Sheets

(51) Int. Cl.
  *G10L 15/26* (2006.01)
  *D06F 33/02* (2006.01)
  *H04L 12/28* (2006.01)

(56) References Cited

U.S. PATENT DOCUMENTS

| | | | |
|---|---|---|---|
| 6,988,070 B2* | 1/2006 | Kawasaki et al. | 704/275 |
| 7,006,190 B2* | 2/2006 | Lee | 349/149 |
| 7,562,543 B2* | 7/2009 | Kendall et al. | 68/13 R |
| 7,778,654 B2* | 8/2010 | Ahn et al. | 455/466 |
| 8,629,753 B2* | 1/2014 | Yum et al. | 340/3.1 |
| 2001/0025497 A1 | 10/2001 | Roh et al. | |
| 2001/0041982 A1* | 11/2001 | Kawasaki et al. | 704/275 |
| 2006/0290465 A1* | 12/2006 | Go et al. | 340/3.7 |
| 2007/0200870 A1* | 8/2007 | Jeong et al. | 345/619 |
| 2009/0081950 A1* | 3/2009 | Matsubara | H04H 30/80 |
| | | | 455/3.06 |
| 2011/0106279 A1* | 5/2011 | Cho et al. | 700/90 |
| 2011/0113345 A1* | 5/2011 | Choi | H04M 1/66 |
| | | | 715/740 |
| 2011/0264245 A1* | 10/2011 | Lim et al. | 700/90 |
| 2012/0110747 A1* | 5/2012 | Yum et al. | 8/137 |

FOREIGN PATENT DOCUMENTS

| | | |
|---|---|---|
| CN | 1805392 A | 7/2006 |
| CN | 101446018 A | 6/2009 |
| CN | 101506584 | 8/2009 |
| EP | 0742308 A1 | 11/1996 |
| EP | 1906094 A1 | 4/2008 |
| JP | 2002-186057 A | 6/2002 |
| JP | 2003-047796 A | 2/2003 |
| JP | 2003-225491 A | 8/2003 |
| JP | 2004-271174 A | 9/2004 |
| JP | 2005-046418 A | 2/2005 |
| JP | 2005-055104 A | 3/2005 |
| KR | 10-2002-0009275 A | 2/2002 |
| KR | 10-2002-0020831 A | 3/2002 |
| KR | 10-2002-0039959 A | 5/2002 |
| KR | 10-0429614 | 5/2004 |
| KR | 10-2004-0070395 A | 8/2004 |
| KR | 10-2004-0077756 A | 9/2004 |
| KR | 10-2005-0021694 A | 3/2005 |
| KR | 10-2008-0068450 A | 7/2008 |
| RU | 2105344 C1 | 2/1998 |
| RU | 2375834 C2 | 12/2009 |
| WO | 2006/097575 | 9/2006 |

* cited by examiner (a)

(b)

HOME APPLIANCE, HOME APPLIANCE SYSTEM, AND METHOD FOR OPERATING SAME

This application is a National Stage Entry of International Application No. PCT/KR2011/003653, filed May 17, 2011, and claims the benefit of Korean Application Nos. 10-2010-0046110, filed on May 17, 2010, 10-2010-0046111, filed on May 17, 2010, 10-2010-0047585, filed on May 20, 2010, 10-2010-0047584, filed on May 20, 2010, 10-2010-0047583, filed on May 20, 2010, 10-2010-0057641, filed on Jun. 17, 2010, all of which are hereby incorporated by reference for all purposes as if fully set forth herein.

TECHNICAL FIELD

The present invention relates to a home appliance system and a method for operating the same. More particularly, the present invention relates to a home appliance, a home appliance system, and a method for operating the same, which updates data in the home appliance and diagnoses the state of the home appliance by collecting the data in the home appliance.

BACKGROUND ART

Various home appliances such as a laundry treatment machine, a refrigerator, an air conditioner, a TV and a rice-cooker are used in a home. The home appliances are designed so that a user can conveniently use and operate the home appliances, and efforts are continuously made to improve functions of the home appliances.

Among these home appliances, laundry treatment machines are divided into a top loading type in which laundry is input into a drum from the top of the laundry treatment machine and a front loading type in which the laundry is input into the drum from the front of the laundry treatment machine according to laundry input methods. In both the two types, the drum for receiving the laundry is rotated to sequentially and selectively perform washing, rinsing, dewatering and drying of the laundry, thereby treating the laundry. Users selectively purchase and use these laundry treatment machines for the sake of convenience.

The laundry treatment machine can be divided into a washer, drier, refresher, etc. The washer removes dust from laundry using chemical reaction of a detergent dissolved in washing water, friction between the washing water and the laundry, generated by the rotation of a drum or pulsator, and physical reaction caused by water current. The drier dries the laundry using hot or cold wind. The refresher removes wrinkles of the laundry using steam, and sterilizes and deodorizes the laundry. In recent years, a washer with a drying function, a washer with a refreshing function, etc. can be easily seen in the market.

Home appliances are configured and produced with only information on basic operations, regardless of their types.

An operating program of a home appliance is determined in a product manufacturing process. However, it is impossible to update the operating program for the purpose of further function improvement or to delete the no longer used operating program and add a new operating program.

Therefore, if an improved technique is developed with the development of technologies, consumers will desire to use the technique. However, there is a problem in that the consumers cannot use the technique without replacing conventionally used home appliances with up-to-date products.

Particularly, to obtain the optimal washing performance, the laundry treatment machine should perform washing on laundry in an appropriate washing course according to a state of the laundry, such as a degree of contamination of the laundry or kind of the laundry. To this end, it is necessary that a user should exactly understand the state of the laundry. However, there is a limitation in exactly understanding the state of the laundry with only the user's sense. Although the user can exactly understand the state of the laundry, it is difficult to determine an optimal washing course according to the state of the laundry, understood by the user.

In case of a commercial laundry treatment machine, a user uses the laundry treatment machine after paying a certain charge for the use of the laundry treatment machine. However, the usability of the laundry treatment machine is limited with only functions provided to the laundry treatment machine, and a credit card payment system or cash payment means for charge payment should be added to the laundry treatment machine.

In a case where the operation of a home appliance is abnormal, it is difficult to confirm the state of the home appliance without contacting a service center and receiving a check on the home appliance from a service technician, and time and cost for the check increase. Therefore, it is required to develop a method capable of increasing the usability of a home appliance and easily checking the state of the home appliance by using a generally used device linked with the home appliance.

DISCLOSURE

Technical Problem

The present invention is conceived to solve the aforementioned problems. Accordingly, an object of the present invention is to provide a home appliance, a home appliance system, and a method for operating the same which can communicate with a mobile terminal having a communication function capable of changing an operation program controlling an operation of the home appliance, and update a previously set operation program or add a new operation program.

Another object of the present invention is to provide a home appliance, a home appliance system, and a method for operating the same, in which when an operation performance command or operation program of the home appliance is transmitted to a mobile terminal, it is possible to control the operation of the home appliance connected in the state in which the home appliance can communicate with the mobile terminal.

Still another object of the present invention is to provide a home appliance, a home appliance system, and a method for operating the same which has no separate payment means for paying a payment according to the use of the home appliance.

Still another object of the present invention is to provide a home appliance, a home appliance system, and a method for operating the same, in which functions of the home appliance is supplemented by connecting, to the home appliance, a mobile terminal having the functions of the home appliance and a program for controlling the functions of the home appliance, so that the home appliance can be more easily controlled, thereby extending the functions of the home appliance.

Still another object of the present invention is to provide a home appliance, a home appliance system, and a method for operating the same which can recognize voice through a mobile terminal connected to the home appliance and control the operation of the home appliance through the recognized voice.

Still another object of the present invention is to provide a home appliance, a home appliance system, and a method for operating the same which can exactly detects the state of laundry and accordingly perform an optimal treatment of the laundry.

Technical Solution

In accordance with an aspect of the present invention, there is provided a home appliance, comprising: a memory unit storing at least one operation program for operation control; a communication unit communicating with a mobile terminal connected to a server through a communication network; and a control unit controlling an operation of the home appliance by executing an operation program and changing the operation programs stored in the memory unit according to data input from the mobile terminal through the communication unit.

In accordance with an aspect of the present invention, there is provided a home appliance, comprising: a terminal mounting unit to which a mobile terminal having a display means is mounted; and a control unit transmitting operation state data to the mobile terminal through the terminal mounting unit during an operation of the home appliance, and controlling the operation state data to be displayed in the mobile terminal, when the mobile terminal is mounted to the terminal mounting unit.

In accordance with an aspect of the present invention, there is provided a home appliance system, comprising: a home appliance, a server providing operation programs of the home appliance and operation control data for controlling the home appliance; and a mobile terminal receiving the operation programs of the home appliance or the operation control data, being connected to the server, and transmitting the operation programs or the operation control data to the home appliance, wherein the home appliance receives an operation program from the mobile terminal so as to add the received operation program or to renew a previously stored operation program, and is operated by executing an operation program according to operation control data.

In accordance with an aspect of the present invention, there is provided a home appliance system, comprising: a home appliance performing a predetermined operation; and a mobile terminal collecting predetermined measurement data on the home appliance being operated, being contacted with the home appliance or adjacent to the home appliance, and diagnosing a state of the home appliance using at least one of an operation state data received from the home appliance and the measurement data.

In accordance with an aspect of the present invention, there is provided a home appliance system, comprising: a home appliance performing a predetermined operation; and a mobile terminal collecting predetermined measurement data on the home appliance being operated, being contacted with the home appliance or adjacent to the home appliance, wherein the home appliance diagnosing a state of the home appliance using at least one of the measurement data received from the mobile terminal and operation state data stored during an operation of the home appliance.

In accordance with an aspect of the present invention, there is provided a home appliance system, comprising: a home appliance having a terminal mounting unit; and a mobile terminal generating a control signal for an input voice by recognizing the input voice, and transmitting the control signal to the home appliance, when the mobile terminal is connected to the home appliance by being mounted to the terminal mounting unit.

In accordance with an aspect of the present invention, there is provided a method for operating a home appliance, comprising: sensing whether a mobile terminal is mounted to the home appliance; outputting transmitting operation state data of the home appliance to the mobile terminal and outputting the operation state data through the mobile terminal, when the mobile terminal is mounted to the home appliance; and operating the home appliance by changing an operation setting according to data input from the mobile terminal, when the data is input from the mobile terminal.

In accordance with an aspect of the present invention, there is provided a method for self-diagnosing a home appliance, comprising: setting a test mode; performing a test operation by sequentially performing a specified operation for each detailed mode in the test mode; storing data generated or measured during the test operation as operation state data; transmitting the operation state data to a mobile terminal connected to the home appliance by wire/wireless when no diagnosis program exists; and receiving measurement data from the mobile terminal connected to the home appliance and diagnosing a state of the home appliance, based on at least one of the operation state data and the measurement data, when the diagnosis program exists.

In accordance with an aspect of the present invention, there is provided a method for diagnosing a home appliance, comprising: setting a measurement mode for the home appliance during an operation of the home appliance; collecting measurement data of the home appliance, being adjacent to the home application or contacted with the home appliance; and performing diagnosis for a state of the home appliance by comparing the measurement data with reference data, and outputting the diagnosed result.

Advantageous Effects

According to the home appliance, the home appliance system, and the method for operating the same of the present invention, one or more effects can be obtained as follows. First, data stored in an external server is downloaded through a mobile terminal, and the home appliance receives the downloaded data by communicating with the mobile terminal, so that a communication means for communicating with the external server is not provided.

Second, it is possible to change a program for controlling the operation of the home appliance, to update an operation program, corresponding to an improved technique, to delete an operation course that is not used any more, and to replace the operation course with a new operation course, thereby improve the usability of the home appliance.

Third, a user can select an operation program for controlling the operation of the home appliance, the treatment method of the home appliance can be changed by arbitrarily changing the configuration of courses, and a separate payment means for paying a payment according to the use of the home appliance is not provided.

Fourth, the state information of laundry is exactly detected, and the laundry is treated in an appropriate manner, based on the detected state information, so that the treatment of laundry can be performed based on the more exactly detected state information of the laundry. Further, the washing course is automatically determined according to the state of the laundry, thereby improving user's convenience.

Fifth, the functions of the home appliance using a mobile terminal, so that detailed information on the home appliance can be output through the mobile terminal, and the operation of the home appliance can be easily controlled. Further, the functions of the home appliance can be supplemented and extended, thereby improving the usability of the home appliance.

Sixth, it is possible to recognize ambient sounds through a mobile terminal connected to the home appliance, and it is possible to control the operation of the home appliance and confirm the operation of the home appliance, based on data generated or measured during the operation of the home appliance. Further, the diagnosis of the home appliance is possible, thereby improving convenience in the control of the home appliance.

BEST MODE

Hereinafter, a case where the home appliance of the present invention is a laundry treatment machine is described as an example, but the present invention is not limited thereto. That is, the present invention can be applied to all home appliances such as a TV, an air conditioner, an electric rice-cooker and a microwave oven. In this case, the present invention can be applied any device that displays its operating state by being electrically connected to a mobile terminal.

The laundry treatment machine used as an example of the home appliance of the present invention can be applied to a drier, a refresher, a washer with a drying function, a washer with a refreshing function, etc., which belong to the scope of the laundry treatment machine.

Figure 1:
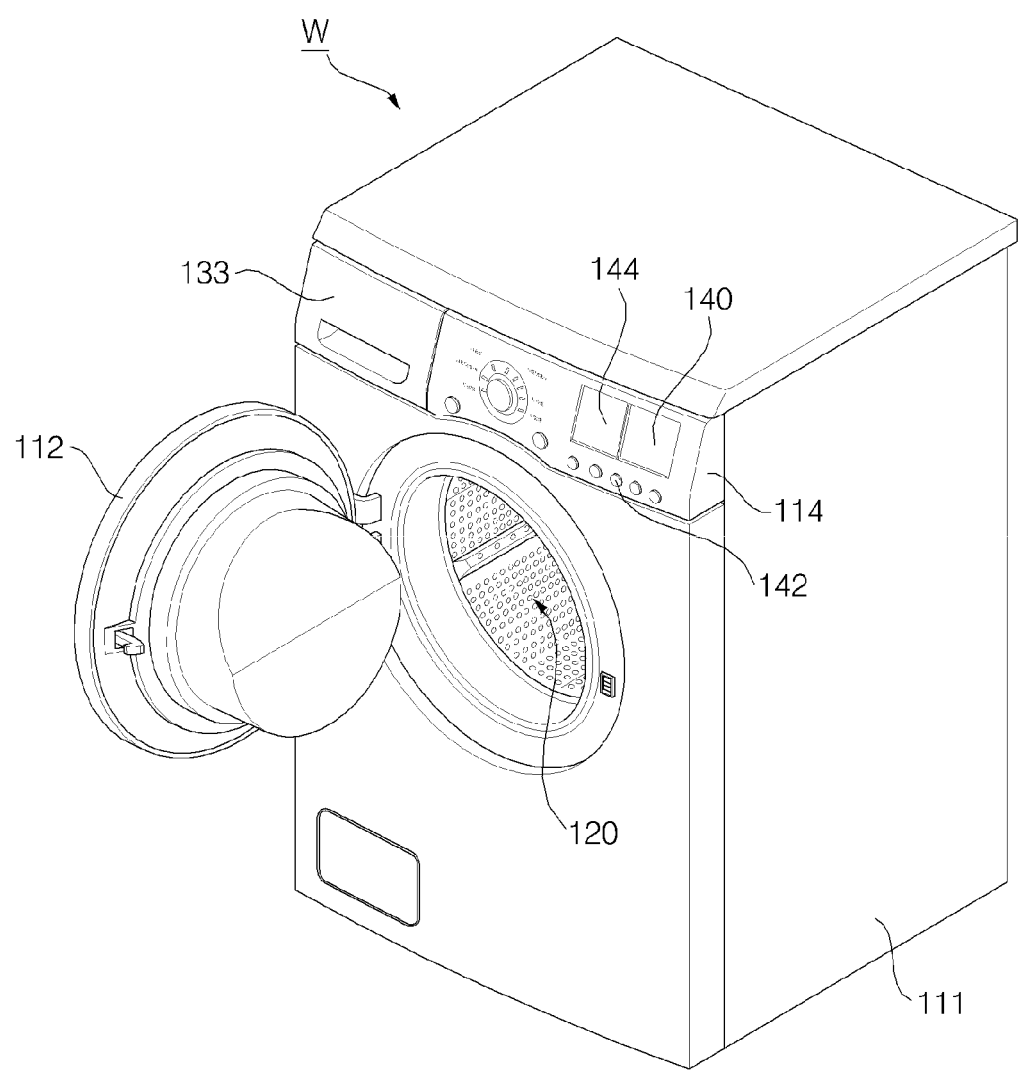
FIG. 1 is a perspective view of a washer according to an embodiment of the present invention.
Figure 2:
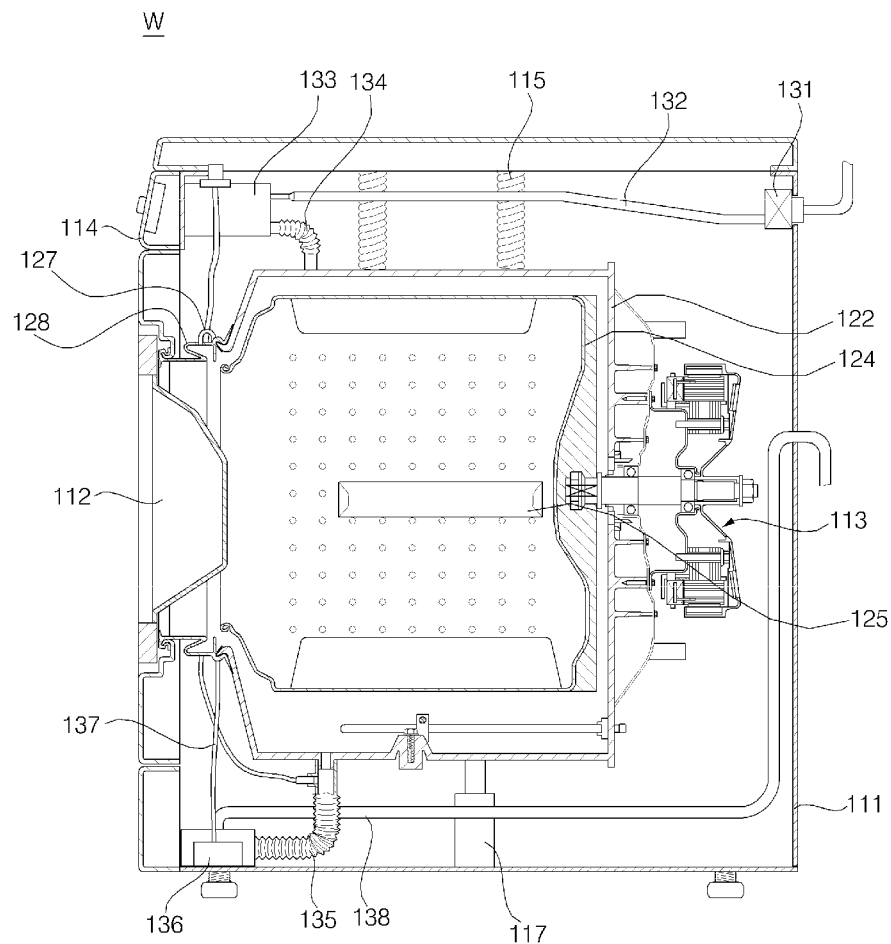
FIG. 2 is a cross-sectional view of the washer shown in FIG. 1.
Figure 3:
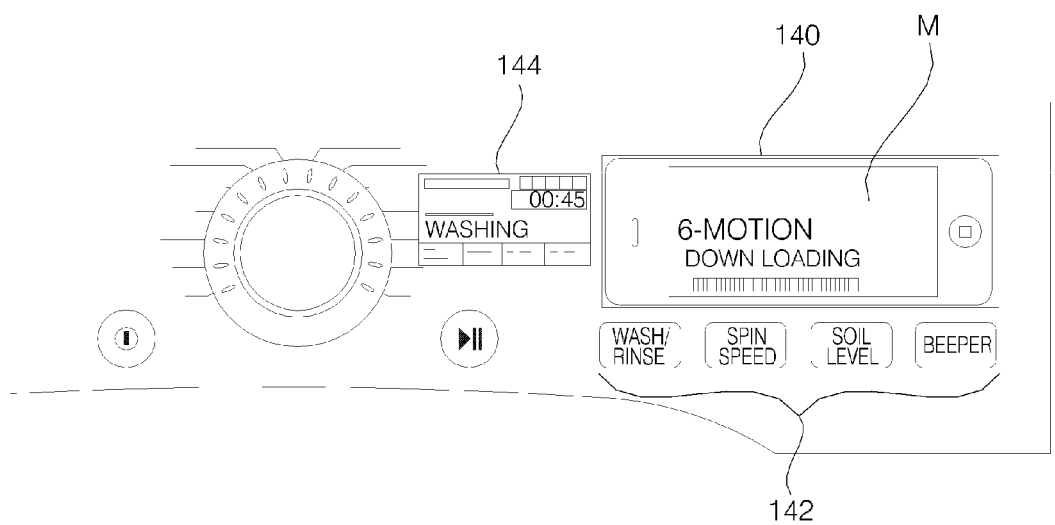
FIG. 3 is an enlarged view of a control panel shown in FIG. 1.

FIG. 1 is a perspective view of a washer according to an embodiment of the present invention. FIG. 2 is a cross-sectional view of the washer shown in FIG. 1. FIG. 3 is an enlarged view of a control panel shown in FIG. 1.

Referring to FIGS. 1 to 3, the washer W according to the embodiment of the present invention includes a cabinet 111 forming the exterior appearance of the washer W, a door 112 opening/closing one side of the cabinet 111 so that cloth enters into or exits from the cabinet 111, a tub 122 disposed inside the cabinet 111 and supported by the cabinet 111, a drum 124 disposed inside the tub 122 and rotated in the state in which the cloth is inserted into the tub 122, a driving unit 113 providing a driving force for rotating the drum 124, a detergent box 133 into which a detergent is input, and a control panel 114 receiving various commands for operating the washer W from a user and displaying various information on operating states of the washer W so that the user can recognize the information.

The cabinet 111 is provided with a cloth entrance/exit hole 120 through which the cloth enters into or exits from the cabinet 111. The door 112 is rotatably coupled to the cabinet 111 so as to open/close the cloth entrance/exit hole 120. The control panel 114 is provided to the cabinet 111. The cabinet 111 is provided with the detergent box 133 that can be inserted into or extracted from the cabinet 111. Here, the detergent box 133 stores a washing additive such as a detergent, a fabric softener and/or a bleach.

The tub 122 is disposed inside the cabinet 111 so as to absorb shock by means of a spring 115 and a damper 117. Washing water is contained in the tub 122. The washing water in the tub 122 is flowed into the drum 124 through a plurality of through-holes (not shown) formed in the drum 124 so as to wet the cloth.

The drum 124 is rotated by the driving unit 113. A lifter 125 lifting the cloth to a predetermined height in the rotation of the drum 124 is disposed on an inner wall of the drum 124. The drum 124 may be rotated in various manners according to driving patterns of the driving unit 113. For example, in a case where the drum 124 is rotated in a predetermined speed range, the cloth lifted by the lifter 125 drops after approaching the predetermined height. Thus, the cloth is washed by impact using the difference in elevation. Alternatively, in a case where the drum 125 is rotated at a high speed so as to dewater the cloth, the cloth is dewatered while the drum 124 is rotating in the state in which the cloth is stuck to the inner wall of the drum 124 by the centrifugal force.

A gasket 128 seals between the tub 122 and the cabinet 111. The gasket 128 is disposed between the entrance of the tub 122 and the cloth entrance/exit hole 120. The gasket 128 reduces impact transferred to the door 112 by absorbing vibration generated in the rotation of the drum 124, and simultaneously prevents the washing water in the tub 122 from be leaked to the outside of the tub 122. The gasket 128 may be provided with a circulation nozzle 127 circulating the washing water in the tub 122 and spraying the washing water into the drum 124.

The detergent box 133 is preferably provided at the front of the cabinet 111 so as to be inserted into or extracted from the cabinet 111. When washing water is supplied, the washing additive in the detergent box 133 is mixed with the washing water to be flowed into the tub 122.

A water supply valve 131, a water supply path 132 and a water supply pipe 134 are preferably provided inside the cabinet 111. Here, the water supply valve 131 controls the inflow of washing water from an external water source, and the washing water flowed in the cabinet 111 flows in the detergent box 133 through the water supply flow path 132. The water supply pipe 134 guides the washing water mixed with a detergent in the detergent box 133 into the tub 122.

A drainage pipe 135, a pump 136, a drainage flow path 138 and a circulation flow path 137 are preferably provided inside the cabinet 111. Here, the drainage pipe 135 allows the washing water in the tub 122 to be drained therethrough, and the pump 136 pumps the washing water flowing through the drainage pipe 135. The drainage flow path 138 allows the washing water pumped by the pump 136 to be drained to the outside of the washer W therethrough, and the circulation flow path 137 circulates the washing water in the tub 122 to the circulation nozzle 127, being connected to the circulation nozzle 127. Meanwhile, in this embodiment, the pump 136 is commonly connected to the circulation flow path 137 and the drainage flow path 138, but the present invention is not limited thereto. That is, the pump 136 may be separately provided with a pump for pumping washing water on the circulation flow path 137 and a pump for pumping washing water on the drainage flow path 138.

The control panel 114 may be provided with an input unit 142 receiving a washing course selected by a user or various operating commands such as an operation time for each cycle and a reservation, and a display unit 144 displaying operating states of the washer W. The control panel 114 may also be provided with a terminal mounting unit 146 to which a mobile terminal M is attachably/detachably mounted.

The washing course includes not only a standard course but also a lingerie/wool course, a boiling course, a speed washing course, a functional clothes course, a silent course, etc. according to the kind or function of cloth. The operation of the washer W is generally divided into a washing cycle, a rinsing cycle and a dewatering cycle. In each cycle, water supply, washing, rinsing, drainage, dewatering, drying, etc. is performed.

Here, the mobile terminal M is a device having a communication function of performing data communication with a server through a communication network such as a wire/wireless telephone network or Internet. The mobile terminal M collects data on the state of a home appliance during the operation of the home appliance, and diagnoses the state of the home appliance using operation state data received from the home appliance.

The mobile terminal M is connected to the home appliance through the terminal mounting unit 140 or a communication unit so as to receive the operation state data from the home appliance. In a case where the home appliance is abnormal as a diagnosed result, the mobile terminal M is connected to a service center so as to transmit information on the state of the home appliance and request the service center of a service.

The mobile terminal M includes a sensing means for collecting data generated during the operation of the home appliance. The mobile terminal M also includes a diagnosis program and diagnosis data for diagnosing the state of the home appliance using the collected data or the data received from the home appliance.

The mobile terminal M allows the diagnosis program and diagnosis data for the home appliance to be installed therein by receiving the diagnosis program and diagnosis data from the service center of the home appliance. The update of the diagnosis is also possible.

In this case, the mobile terminal M may include any one of portable terminals such as a PDA, a netbook, a PMP, a mobile communication terminal (cellular phone) and a smart phone. Any terminal having the diagnosis program and diagnosis data described above or receiving and installing the diagnosis program and diagnosis data may be applied to the mobile terminal M. The mobile terminal M is preferably a terminal having a communication function of performing data communication with a server through a communication network such as a wire/wireless telephone network or Internet.

Among the mobile terminals described above, the smart phone is a complex wireless communication device obtained by combining advantages of the cellular phone and the PDA. The smart phone generally has functions of the cellular phone, to which functions of the PDA are added. The smart phone can perform not only voice communication but also PC linkage, personal information management, wireless Internet, facsimile transmission/reception, etc.

Generally, a standardized interface is provided to developers of applications executed in the smart phone, and the developers develop various applications through the standardized interface and supply the developed applications through the communication network. Hereinafter, the smart phone having an image recognition function and transmitting image data through the communication network will be described as an example of the mobile terminal M.

Figure 4:
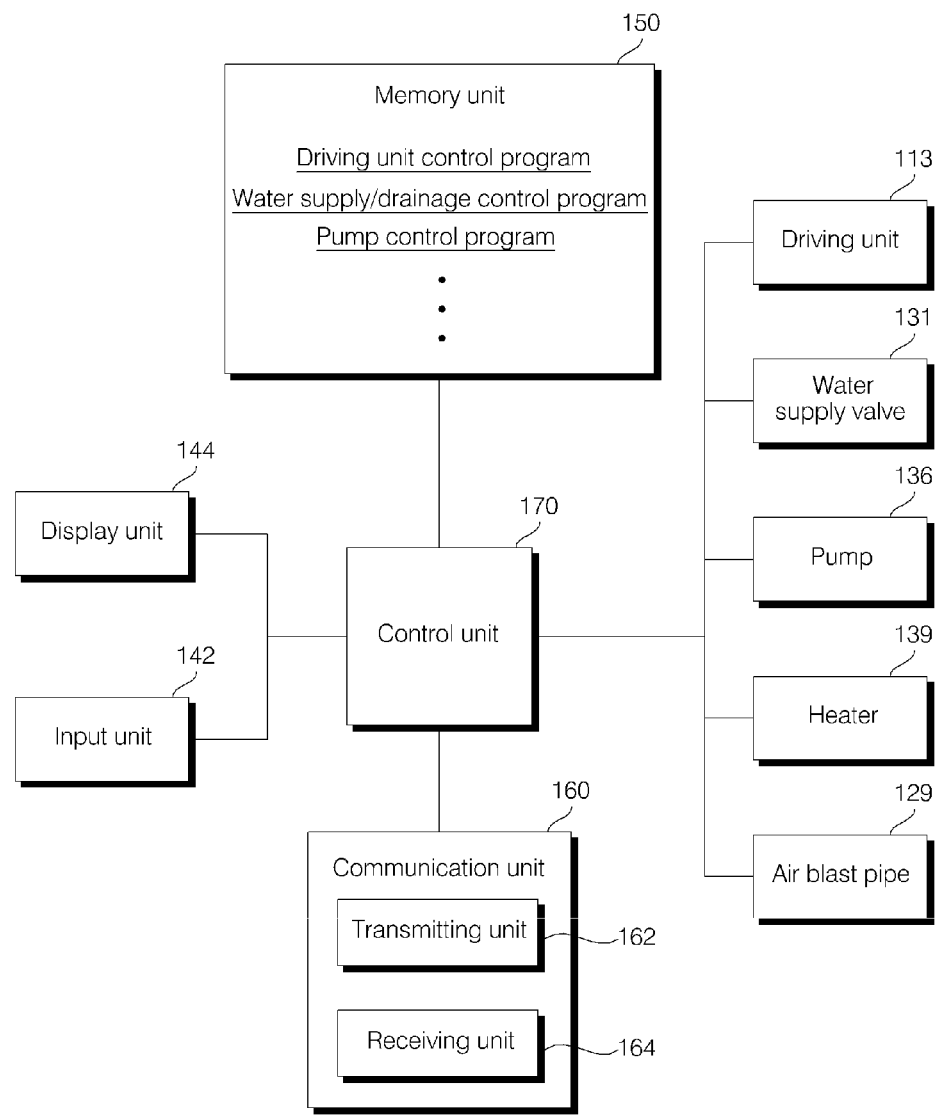
FIG. 4 is a block diagram illustrating main components of the washer according to an embodiment of the present invention.

FIG. 4 is a block diagram illustrating main components of the washer according to an embodiment of the present invention.

Referring to FIG. 4, the washer W according to the embodiment of the present invention includes a memory unit 150 storing an operation program for controlling various kinds of components of the washer W, a communication unit 160 communicating data with the mobile terminal M, and a control unit 170 processing data input from the mobile terminal M to the communication unit 160 and updating the operation program stored in the memory unit 150.

The memory unit 150 may include a driving unit control program for controlling a driving pattern of the driving unit 113, a water supply control program for controlling a water supply unit supplying washing water so as to treat laundry, and a drainage control program for controlling a drainage unit draining washing water in the tub 122. In a case where the laundry treatment machine of the present invention is a dryer or washer with a drying function, the laundry treatment machine may include a drying unit configured with a heater and an air blast fan for supplying hot or cold wind into the drum 124. In this case, the memory unit 150 preferably includes a drying control program for controlling the drying unit. Although the drying unit is not included in the washer shown in FIGS. 1 and 2, the laundry treatment machine of the present invention may be a dryer or washer with a drying function as described above. Thus, the configuration of a heater 139 and an air blast fan 129 is shown together in FIG. 4.

Particularly, the driving unit control program may control a driving pattern including at least one of a rotation speed, a rotation direction and a real operation rate. Here, the real operation rate is defined as a ratio of the time at which the driving unit is substantially driven with respect to the entire time of a driving signal applied to the driving unit 113 by an IPM driver, etc. so as to control the driving pattern of the driving unit 113. The driving signal includes an ON-time section at which current is applied to the driving unit 113 and an OFF-time section at which the current is not applied to the driving unit 113.

Therefore, the real operation rate can be defined as shown in the following Equation 1.

$$\text{Real operation rate} = \frac{T_{ON}}{T_{ON} + T_{OFF}} \qquad \text{Equation 1}$$

In Equation 1, $T_{ON}$ denotes the signal length of a section at which the current is applied to the driving unit 113, and $T_{OFF}$ denotes is the signal length of a section at which the current is not applied to the driving unit 113.

Particularly, the real operation rate is closely related to the temperature control and energy consumption of the driving unit 113. If a driving unit control program having performance improved by a developer is uploaded to a server SVC, the washer W according to the embodiment of the present invention downloads the driving unit control program through the mobile terminal M, so that the temperature of the driving unit 113 can be more appropriately controlled, and the energy consumption of the driving unit 113 can be reduced.

The communication unit 160 includes a transmitting unit 162 for transmitting data to the mobile terminal M and a receiving unit 164 for receiving data from the mobile terminal M. The data transmitted to the mobile terminal M through the transmitting unit 162 may include list information and version information on operating programs stored in the memory unit 150. The data received to the mobile terminal M through the receiving unit 164 may include update data on the operation programs previously stored in the memory unit 150, data on a new operation program, etc.

The control unit 170 renews the memory unit 150 by processing various data received through the communication unit 160. For example, in a case where the data input through the communication unit 160 is update data on an operation program previously stored in the memory unit 150, the control unit 170 updates the operation program previously stored in the memory unit 150 using the update data. In a case where the data input through the communication unit 160 is a new operation program, the control unit 170 additionally stores the new operation program in the memory unit 150. It will be apparent that the control unit 170 deletes the operation program previously stored in the memory unit 150 and store the new operation program in the memory unit 150.

If the mobile terminal M is mounted to the terminal mounting unit 140, the control unit 170 controls the communication unit 160 to be in a state in which the communication unit 160 can communicate with the mobile terminal M. If the mobile terminal M is separated from the terminal mounting unit 140, the control unit 170 controls the communication unit 160 to be in a state in which the communication unit 160 is standing by communication with the mobile terminal M.

When the mobile terminal M is mounted to the terminal mounting unit 140, the control unit 170 controls a control signal for synchronization between the mobile terminal M and the washer W and list information on the operation programs stored in the memory unit 150 to be transmitted to the mobile terminal M through the communication unit 160.

Here, the data input to the communication unit 160 from the mobile terminal M is one downloaded from a remote server connected to the communication network using the mobile terminal M. Various application programs related to the operation of the washer W may be stored in the server. The application programs are ones that developers have developed and uploaded using open libraries. A user may access the server using the mobile terminal M and download a desired application program through an authentication or payment process.

The input unit 142 is disposed at the control panel as described above, and is provided at least one input means for inputting a predetermined signal or data to the home appliance under a user operation. The input unit 142 receives data and transmits the received data to the control unit 170. Here, the data may include operation modes of the home appliance, operation settings for operation courses, temperatures, water levels and strengths, reservation times, kinds of laundry, etc.

The input unit 142 may include a button, a dome switch, a touch pad (static voltage/static current), a jog wheel, a jog switch, a finger mouse, a rotary switch, a jog dial, etc. Any device generating predetermined input data under an operation such as press, rotation, pressure or contact may be applied to the input unit 142.

The input unit 142 may transmit, to the control unit 179, a signal different from that generated in one-time operation according to the number of times of consecutive operation or operation time, so that the laundry treatment machine performs a specific operation specified by the control unit 170.

The display unit 144 displays information input by the input unit 142, information on an operation which the laundry treatment machine is performing and information when the operation is finished, corresponding to a control command of the control unit 170.

The display unit 144 may display the progress state of an operation of the home appliance, such as main washing, rinsing or dewatering cycle, using at least one of a character, a special character, an imoticon and an image.

In addition to the display unit 144, the control panel may further include an output means such as a flickering lamp or a vibration element.

The operation courses which can be performed according to the operation program stored in the memory unit 150 may be displayed in the display unit 144. The control unit 170 preferably renews the display of the display unit 144, corresponding to the changed result of the operation program stored in the memory unit 150.

For example, a baby care course is displayed in the display unit 144 in the state in which a baby care program is stored in the memory unit 150. However, if a child care program is transmitted from the mobile terminal M so that the baby care program is deleted from the memory unit 150 and replaced with the child care program, the control unit 170 controls a child care course is displayed in the display unit 144. Here, the baby care program refers to an operation program set to be suitable for features of baby clothes, and the child care program refers to an operation program set to be suitable for features of child clothes.

Figure 5:
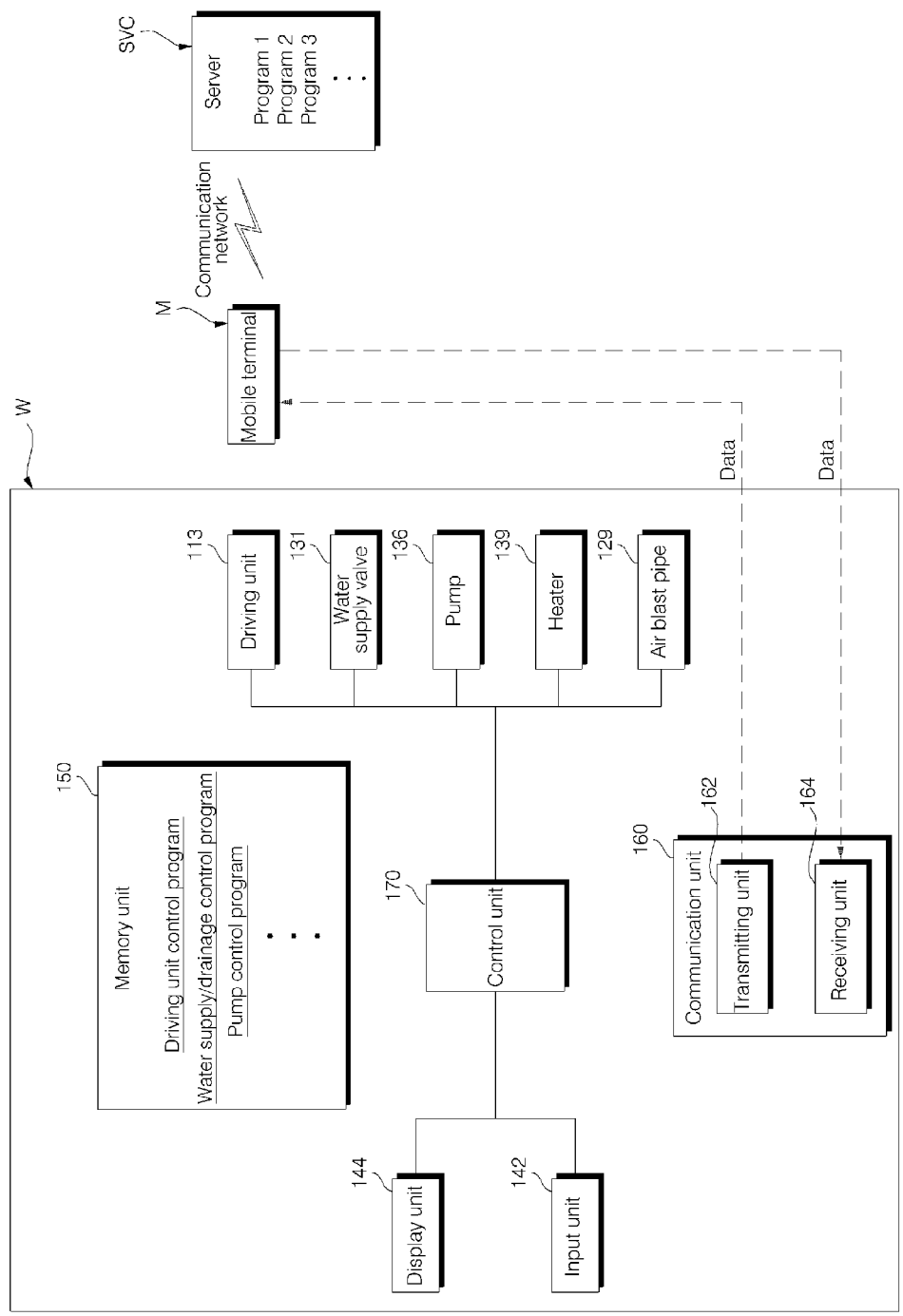
FIG. 5 is a block diagram of a laundry treatment system according to an embodiment of the present invention.

FIG. 5 is a block diagram of a laundry treatment system according to an embodiment of the present invention.

Referring to FIG. 5, the laundry treatment system according to the embodiment of the present invention communicates with the server SVC connected to the mobile terminal M through the communication network and the mobile terminal M so as to download data on operation programs of the washer W through mobile terminal M, and receives data on the operation programs of the washer W, transmitted from the mobile terminal M, so as to update operation programs for controlling the various kinds of components of the washer W. Hereinafter, the components of the washer W are identical to those of the aforementioned embodiment, and therefore, their detailed descriptions will be omitted.

If the washer W and the mobile terminal M are connected in the state in which they can communicate with each other, the control unit 170 controls information on the operation programs stored in the memory unit 150 (hereinafter, referred to as a program list) to be transmitted to the mobile terminal M through the communication unit 160.

The program list is output on a screen of the mobile terminal M receiving the information on the operation programs. Accordingly, a user can identify current operation programs stored in the washer W. Then, the mobile terminal M communicates with the server SVC by accessing the communication network under a user's operation, and downloads operation programs from the server SVC.

Information on various operation programs uploaded from the server SVC is displayed on the screen of the mobile terminal M, and the mobile terminal M searches for a specific operation program according to the input data, so as to download the selected operation program.

The mobile terminal M transmits data (update data or new operation program) downloaded under the user's operation, and the transmitted data is input to the communication unit 160.

In the laundry treatment system of the present invention, in a case where the mobile terminal M has an image recognition function for recognizing a state of laundry as an image, the server SVC receives data obtained by recording to the state of the laundry as the image, which is transmitted through the mobile terminal M, so as to extract state information of the laundry from the transmitted data. The server SVC transmits operation control data to the mobile terminal M so that the laundry treatment machine is operated corresponding to the extracted state information.

In this case, the laundry treatment machine is connected to the mobile terminal M so as to receive the operation control data transmitted from the mobile terminal M. Thus, the laundry treatment machine treats the laundry according to the operation control data.

Before the laundry is treated using the washer W, the mobile terminal M activates the image recognition function under the user's operation so as to photograph an image of the laundry.

The image photographed by the mobile terminal M is transmitted to the server SVC through the communication network, and the server SVC obtains the state information of the laundry by analyzing the image. In this case, the server SVC performs an operation of comparing the image transmitted from the mobile terminal M with sample images divided according to the state of the laundry in a database of the server SVC, using a predetermined image analysis program, or an operation of analyzing the state of the laundry based on reference data for comparing and analyzing state features of the laundry. The analysis operation described above may be automatically performed by a computing operation using the image analysis program provided in the server SVC, but the present invention is not limited thereto. That is, the analysis operation may be manually performed by a supervisor of the server SVC.

If the analysis operation of the image transmitted from the mobile terminal M is finished in any case, state information such as contamination state or material feature of the laundry is extracted, and the operation control data is transmitted from the server SVC to the mobile terminal M so that the washer W is appropriately operated corresponding to the state information.

The operation control data refers to data that allows the washer W to be appropriately controlled according to the state information of the laundry. Here, the operation control data may include a command for instructing the user to select a new operation program to be added to the memory unit 150 of the washer W or an operation program capable of treating the laundry in an optimal state among a plurality of operation programs stored in the memory unit 150.

For example, a cotton course for treating laundry made of a cotton material is programmed in the washer W. In this case, if the image transmitted from the server SVC to the mobile terminal M is analyzed as cotton, the server SVC transmits, to the mobile terminal M, a predetermined operation control data that allows the cotton course to be performed. The mobile terminal M retransmits the operation control data to the washer W, and the control unit 170 calls an operation program for performing the cotton course stored in the memory unit, based on the operation control data, and controls the operation program to be executed.

Meanwhile, a list of the operation programs previously stored in the memory unit 150 may be transmitted from the washer W to the mobile terminal M. In a case where an operation program (e.g., a cotton course program) required according to the state information of the laundry does not exist in the program list, the server SVE transmits operation control data including the operation program to the mobile terminal M, and the mobile terminal M transmits the operation control data to the washer W. The control unit 170 generates an operation program corresponding to the operation control data by processing the operation control data, and controls the generated operation program to be executed. It will be apparent that the operation program included in the operation control data, i.e., a new operation program which did not conventionally exist in the memory unit 150, may be stored in the memory unit 150.

Figure 6:
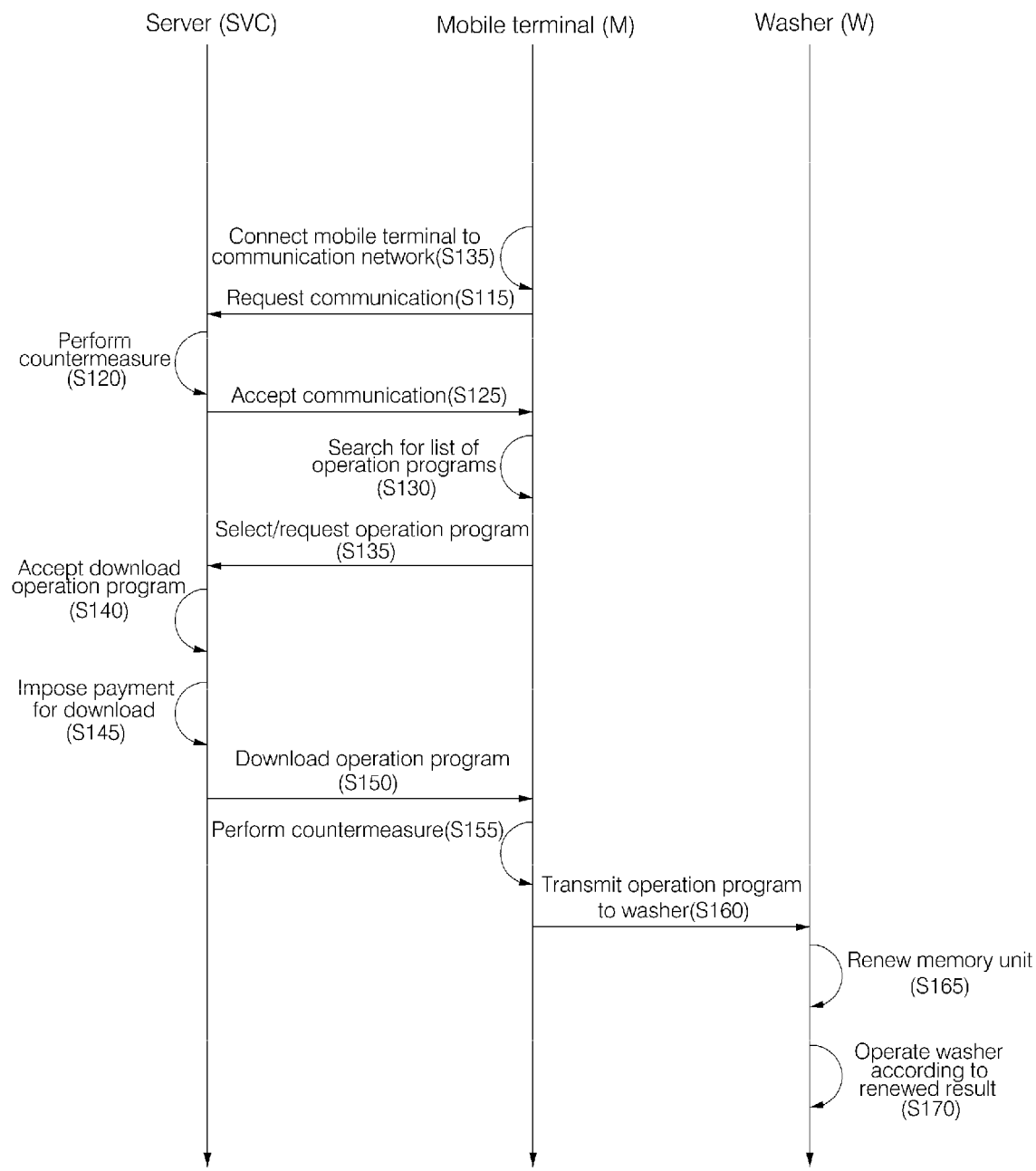
FIG. 6 illustrates a signal processing process performed in the laundry treatment system according to a first embodiment of the present invention.

FIG. 6 illustrates a signal processing process performed in the laundry treatment system according to a first embodiment of the present invention.

Hereinafter, although a case where the mobile terminal M is mounted to the terminal mounting unit 140 of the washer W so as to communicate data is described as an example, this is merely an example. The mobile terminal M may be connected to the washer W or may be connected to the washer W by wire/wireless through the communication unit. The connection between the washer W and the mobile terminal M will be described with reference to details described later.

Referring to FIG. 6, after a user mounts the mobile terminal M to the terminal mounting unit 140, the mobile terminal M is connected to a communication network (S110). A request for communication is performed from the mobile terminal M to the server SVC through the communication network (S115), and the server SVC determines whether to accept communication through a predetermined authentication procedure in response to the request for communication (S120). In a case where it is determined that the communication is accepted, the SVC accepts the communication (S125), so that the server SVC and the mobile terminal M are in a state in which they communicate with each other. In this state, the user can search for various kinds of operation programs stored in the server SVC through the mobile terminal M and select a desired operation program among the searched operation programs (S130). Then, a request for accepting download of the operation program selected by the user is performed through the mobile terminal M (S135), and the server SVC accepts the download in response to the request (S140), and imposes a payment for the corresponding program (S145). The imposed payment may be directly charged to the user, or a communication company providing communication services to the mobile terminal M of the user may impose the payment on the user.

Subsequently, the operation program is downloaded from the server SVC to the mobile terminal M (S150), and the mobile terminal M performs a process for transmitting the downloaded operation program to the washer W through the communication unit 160 of the washer W (S155). The transmission of the operation program is performed through the communication unit 160 (S160).

The washer W stores the operation program input through the communication unit 160 in the memory unit 150 (S165), and controls the washer W to be operated according to the operation program.

Figure 7:
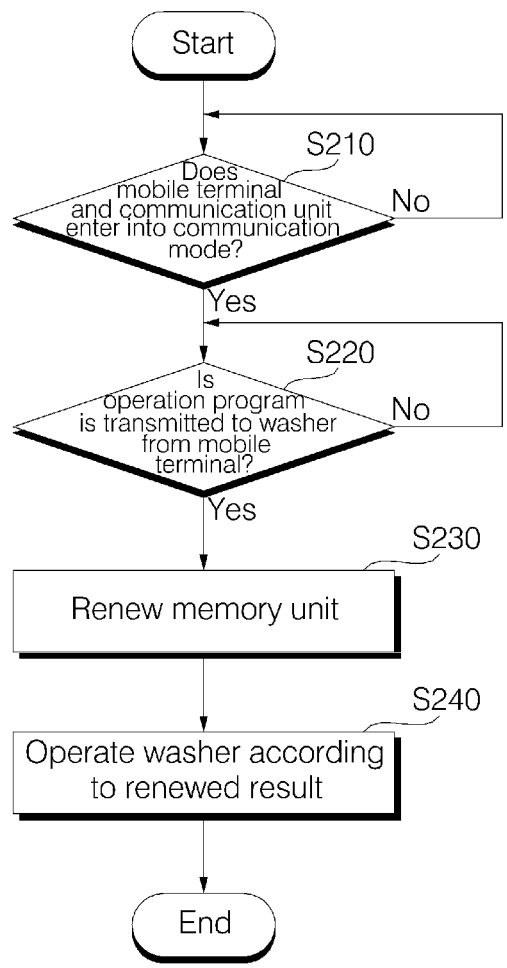
FIG. 7 is a flowchart illustrating a control method of a washer according to the first embodiment of the present invention.

FIG. 7 is a flowchart illustrating a control method of a washer according to the first embodiment of the present invention.

Referring to FIG. 7, if the mobile terminal M and the communication unit 160 enter into a communication mode in which they can communicate with each other (S210), the washer W is in a communication standby state until data is transmitted to the washer W from the mobile terminal M.

Subsequently, if an operation program for controlling the various kinds of components of the washer W is transmitted from the mobile terminal M (S220), the transmitted operation program is stored in the memory unit 150 so that the memory unit 150 is renewed (S230), and the control unit 170 controls the washer W to be operated according to the operation program.

Figure 8:
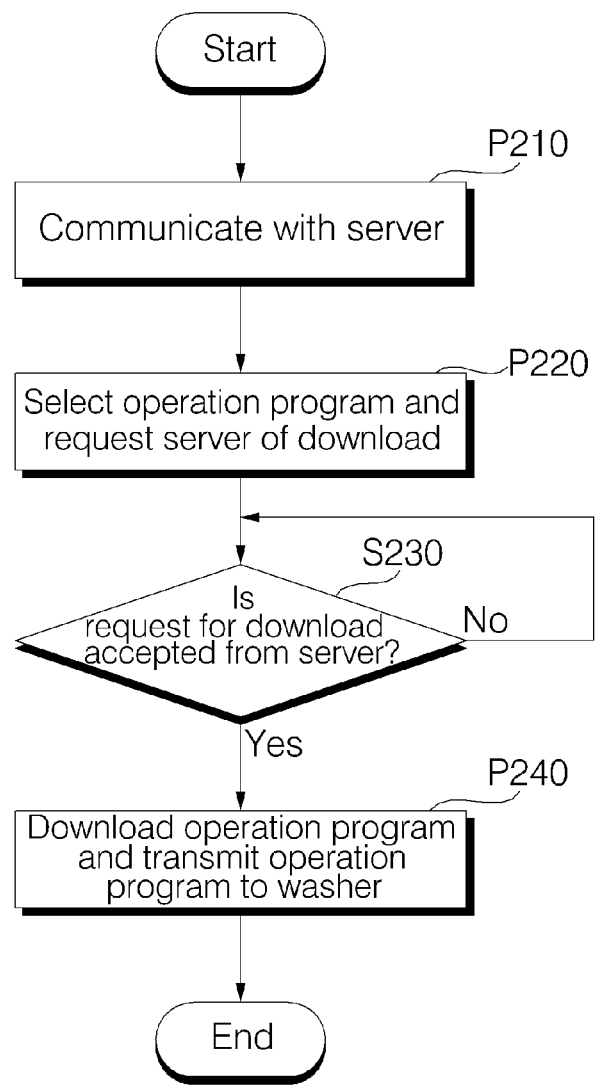
FIG. 8 is a flowchart illustrating an example of a control method of a mobile terminal communicating with the washer according to the first embodiment of the present invention.

FIG. 8 is a flowchart illustrating an example of a control method of a mobile terminal communicating with the washer according to the first embodiment of the present invention.

Referring to FIG. 8, if the mobile terminal M and the communication unit 160 enter into a communication mode in which they can communicate with each other (P210), a user searches for operation programs of the washer W, stored in the server SVC, through the mobile terminal M, and selects a desired program among the searched programs. Accordingly, a request for downloading the selected operation program is performed from the mobile terminal M to the server SVC (P220). If the download is accepted from the server SVC (P230), the operation program is downloaded from the server SVC, and the download operation program is retransmitted to the washer W (P240).

Figure 9:
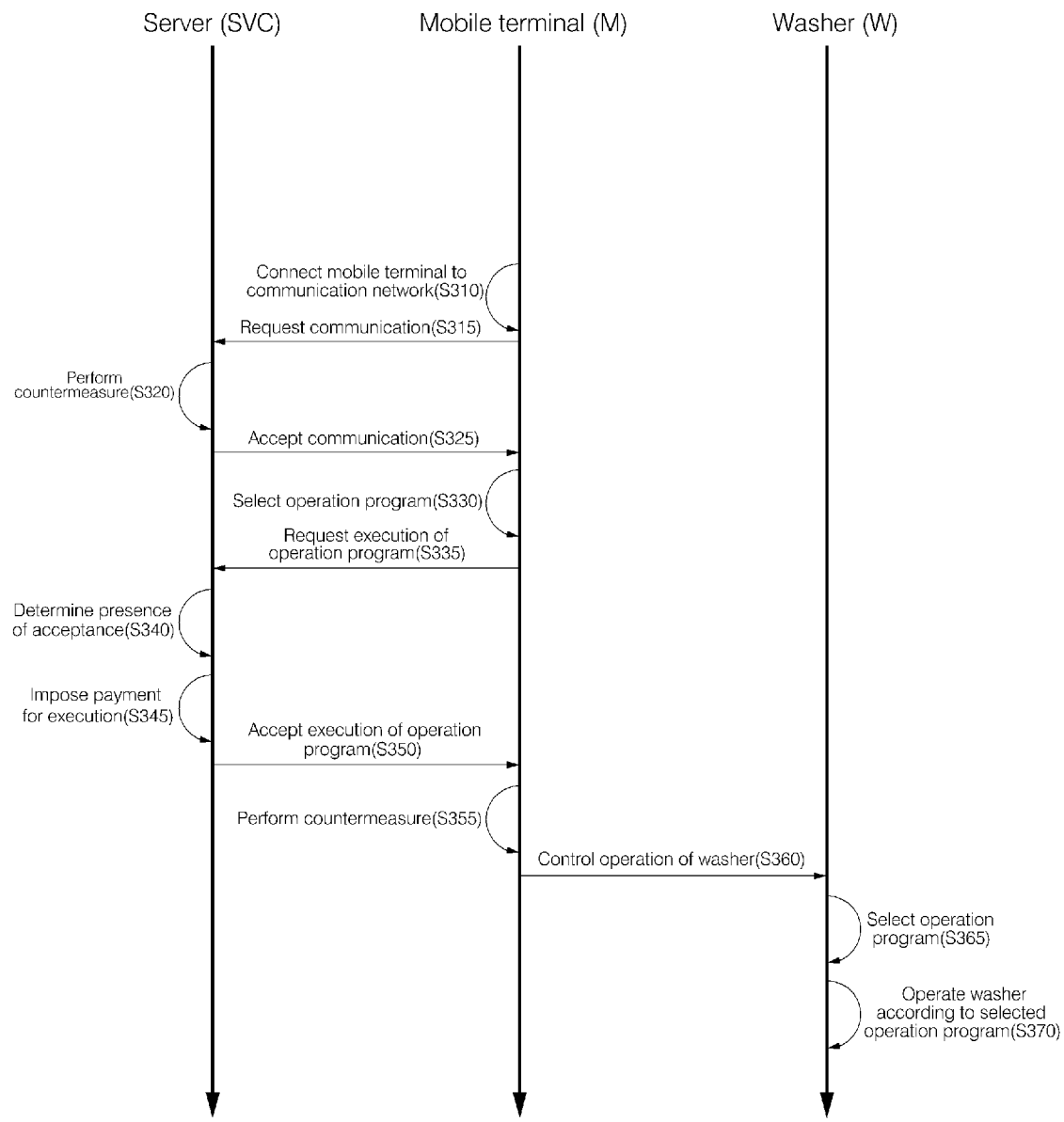
FIG. 9 illustrates a signal processing process performed in the laundry treatment system according to a second embodiment of the present invention.

FIG. 9 illustrates a signal processing process performed in the laundry treatment system according to a second embodiment of the present invention.

The embodiment described below with reference to FIG. 9 is different from the embodiment described with reference to FIG. 6 in that a plurality of operation programs are previously set in the memory unit 10 of the washer W, a desired program among the plurality of operation programs is selected through the mobile terminal M, and the operation of the washer W is performed when the execution of the selected program is accepted from the server SVC.

More specifically, after a user mounts the mobile terminal M to the terminal mounting unit 140 of the washer W, the mobile terminal M is connected to a communication network (S310). A request for communication is performed from the mobile terminal M to the server SVC through the communication network (S315), and the server SVC determines whether to accept communication through a predetermined authentication procedure in response to the request for communication (S320). In a case where it is determined that the communication is accepted, the SVC accepts the communication (S325), so that the server SVC and the mobile terminal M are in a state in which they communicate with each other.

Meanwhile, the communication is also performed between the mobile terminal M and the washer W in the state in which the mobile terminal M is mounted to the terminal mounting unit 140. Hence, the user searches for a plurality of operation programs stored in the memory unit 150 through the mobile terminal M, and selects a desired program to be executed among the plurality of operation program (S330). A request for accepting download of the selected operation program is performed from the mobile terminal M to the server SVC (S335).

The server SVC determines whether to accept the execution of the operation program through a predetermined authentication procedure, in response to the request for acceptance (S340). In a case where the request for acceptance is accepted, the server SVC imposes a payment for the corresponding program (S345). The imposed payment may be directly charged to the user, or a communication company providing communication services to the mobile terminal M of the user may impose the payment on the user.

Subsequently, the acceptance of the execution of the operation program is performed from the server SVC to the mobile terminal M (S350). If a command for accepting the execution of the operation program is inputted through the communication unit 160 of the washer W (S360), the control unit 170 executes the corresponding operation program among the plurality of operation programs stored in the memory unit 150 (S370).

Figure 10:
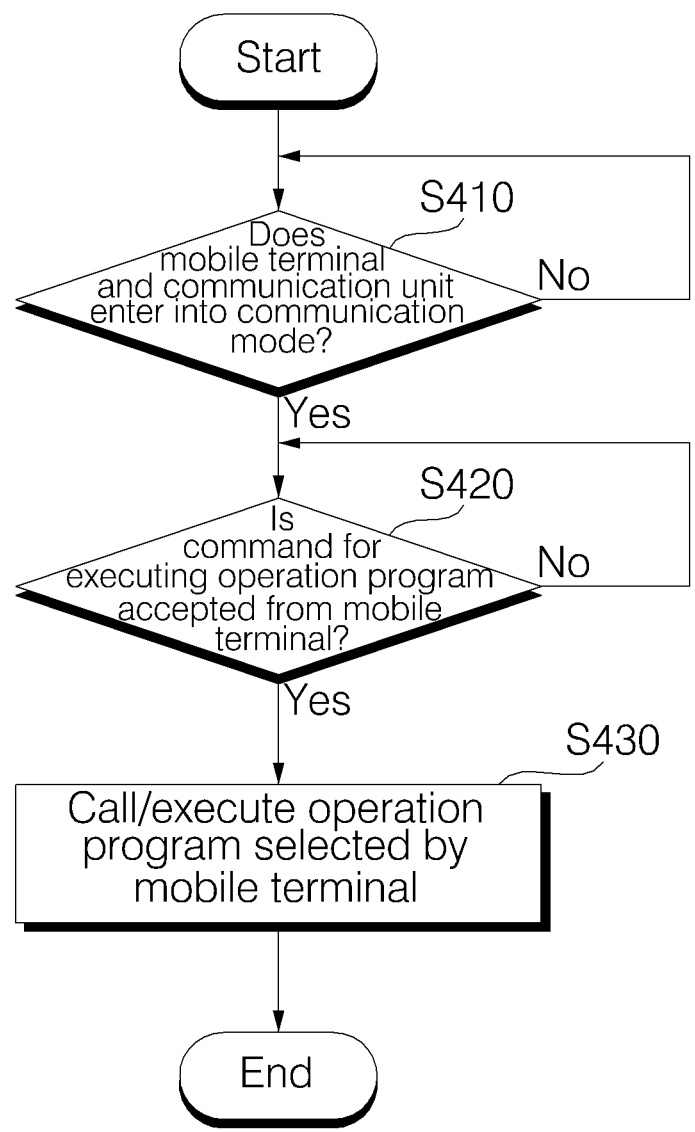
FIG. 10 is a flowchart illustrating a control method of a washer according to the second embodiment of the present invention.

FIG. 10 is a flowchart illustrating a control method of a washer according to the second embodiment of the present invention.

Referring to FIG. 10, if the mobile terminal M and the communication unit 160 enter into a communication mode in which they can communicate with each other (S410), the washer W is in a communication standby state until data is transmitted to the washer W from the mobile terminal M.

Subsequently, in a case where a command for executing a specific operation program among the plurality of operation programs stored in the memory unit 150 of the washer W is accepted from the mobile terminal M (S420), the control unit 170 calls the corresponding operation program from the memory unit 150 and controls the operation program to be executed (S430).

Figure 11:
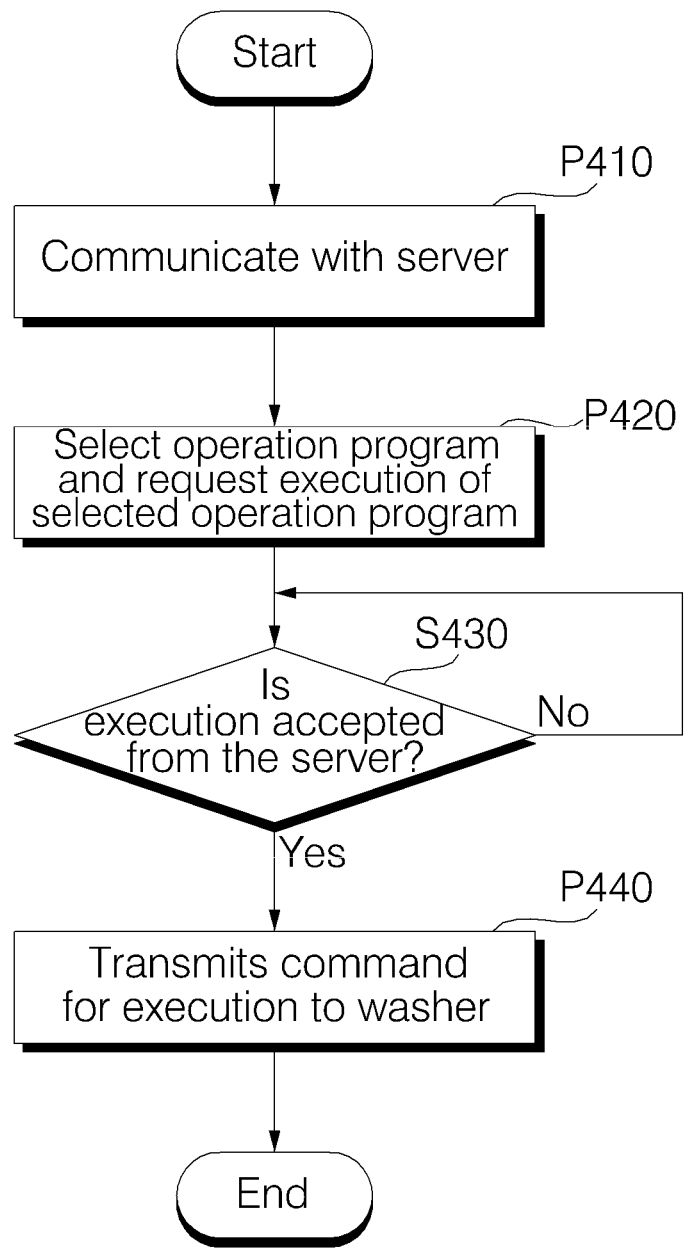
FIG. 11 is a flowchart illustrating an example of a control method of a mobile terminal communicating with the washer according to the second embodiment of the present invention.

FIG. 11 is a flowchart illustrating an example of a control method of a mobile terminal communicating with the washer according to the second embodiment of the present invention.

Referring to FIG. 11, if the mobile terminal M and the communication unit 160 enter into a communication mode in which they can communicate with each other (P410), a user searches for operation programs of the washer W, stored in the memory unit 150, through the mobile terminal M, and selects a desired program among the searched programs. Accordingly, a request for executing the selected operation program is performed from the mobile terminal M to the server SVC (P420). If the execution of the operation program is accepted from the server SVC (P430), a command for executing the corresponding operation program is transmitted to the washer W (P440).

Figure 12:
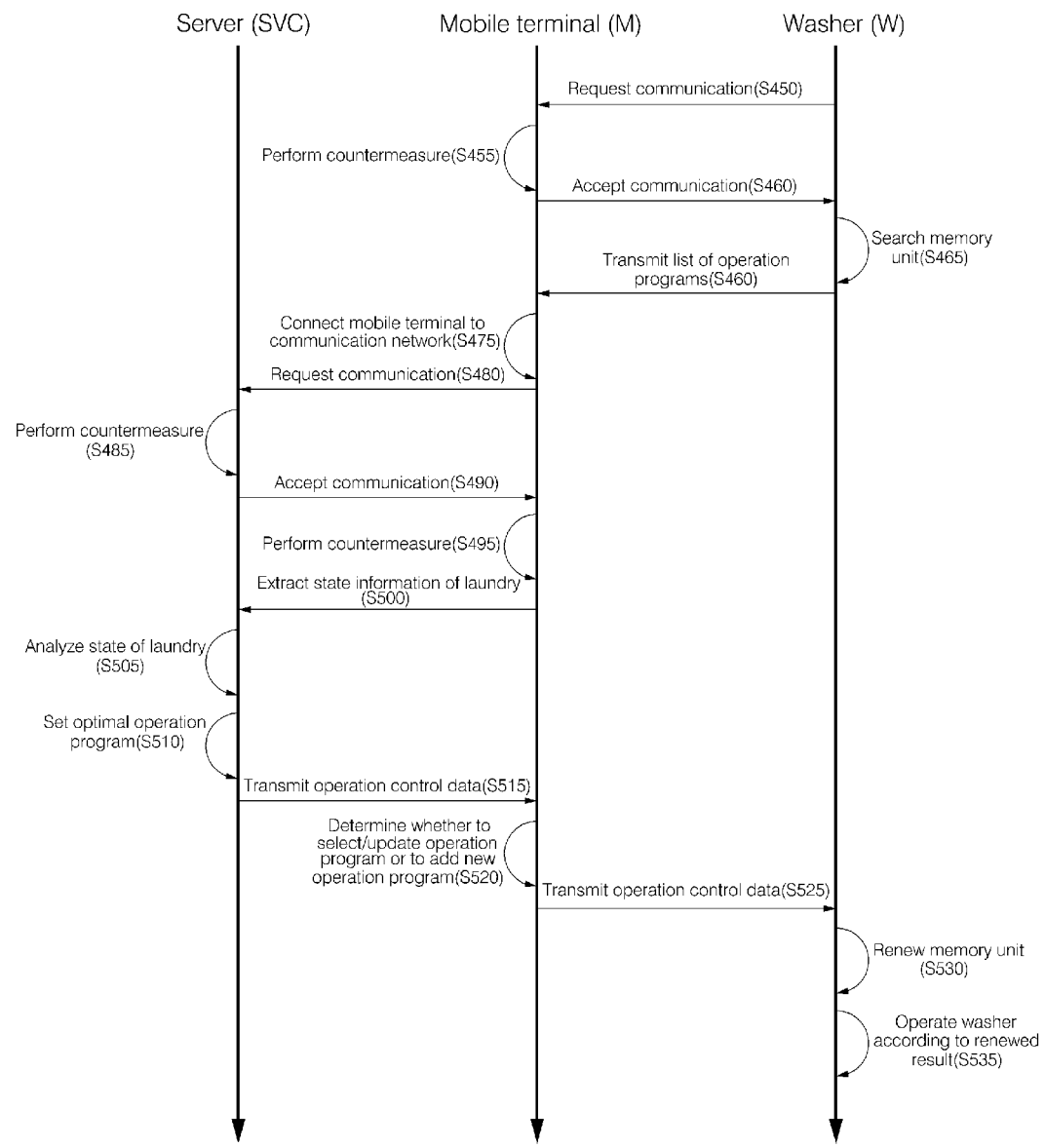
FIG. 12 illustrates a signal processing process performed in the laundry treatment system according to a third embodiment of the present invention.

FIG. 12 illustrates a signal processing process performed in the laundry treatment system according to a third embodiment of the present invention.

Referring to FIG. 12, after the mobile terminal M is mounted to the terminal mounting unit 140 of the washer W, a request for communication is performed from the washer W to the mobile terminal M (S450). An appropriate countermeasure such as an acceptance or rejection is performed from the mobile terminal M, corresponding to the request for communication (S455). In a case where the communication is accepted under a user's operation or automatically, a communication acceptance signal is transmitted to the washer W (S460), so that the washer W and the mobile terminal M are in a state in which they can communicate with each other.

The control unit 170 searches the memory unit 150 (S465), controls a list of operation programs stored in the memory 150 to be transmitted to the mobile terminal M (S470). The mobile terminal M is connected to the communication network by a user's operation or a previously set program (S475), and the connection is requested from the mobile terminal M to the server SVC through the communication network (S480).

The server SVC rejects or accepts the communication, corresponding to the request for communication (S485). The server SVC accepts the communication through a predetermined authentication procedure (S490), so that the server SVC and the mobile terminal M are in a state in which they can communicate with each other.

Subsequently, an appropriate operation for transmitting image information of laundry, stored in the mobile terminal M, is performed (S495), and the image information is transmitted to the server SVC (S500).

The server SVC extracts state information of the laundry by analyzing the transmitted image information (S505), and sets an appropriate operation program so that an optimal treatment of the laundry is performed according to the extracted state information (S510). The server SVC transmits operation control data corresponding to the appropriate operation program to the mobile terminal M.

In this case, the server SVC may transmit the list of the operation programs stored in the memory unit 150 of the washer W from the mobile terminal M. In a case where the appropriate operation program to be performed corresponding to the analyzed state information of the laundry does not exist in the list, the server SVC allows new operation program data to be included in the operation control data. In the contrary case, the server SVC allows data for instructing the washer W to execute the corresponding operation program to be included in the operation control program. It will be apparent that data for updating the operation programs previously stored in the memory unit 150 may be included in the operation control data transmitted from the server SVC to the mobile terminal M.

Various data described above may be included in the operation control data transmitted from the server SVC to the mobile terminal M. The mobile terminal M determines whether to select and update an appropriate operation program among the operation programs previously stored in the memory unit 150, to add a new operation program, etc., corresponding to each case (S520), and transmits operation control data corresponding to the determined result to the washer W (S525).

The control unit 170 controls the various kinds of components of the washer W according to the transmitted operation control data, and renews the memory unit 150 by performing updating, addition of a new operation program, etc., when necessary (S530). The control unit 170 controls the washer W to be operated according to the renewed result (S535).

Figure 13:
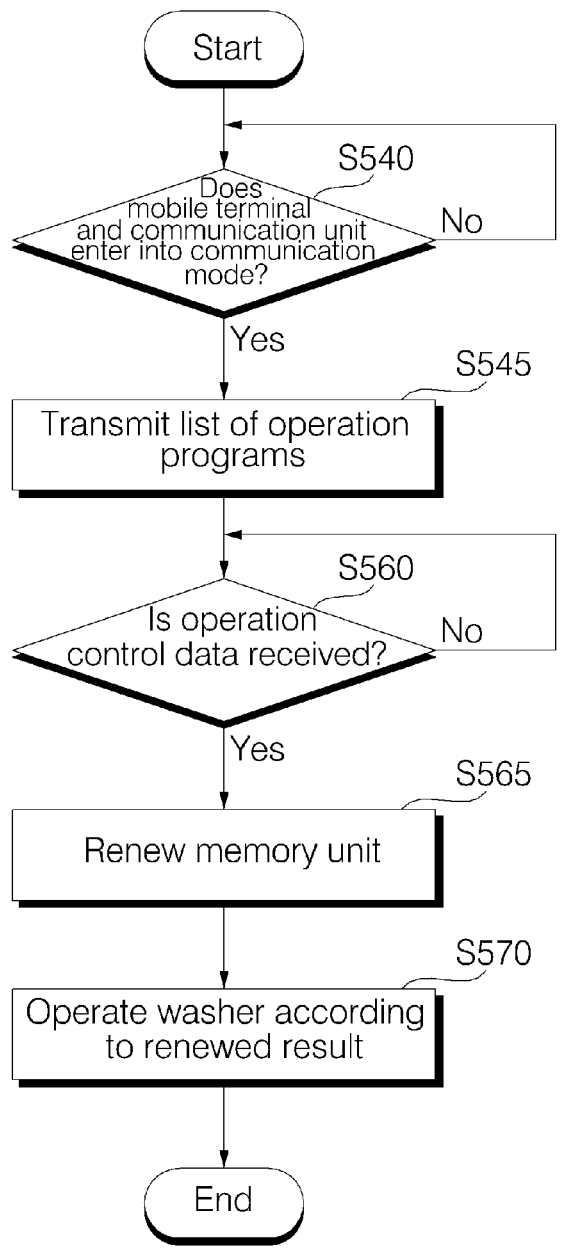
FIG. 13 is a flowchart illustrating a control method of a washer according to the third embodiment of the present invention.

FIG. 13 is a flowchart illustrating a control method of a washer according to the third embodiment of the present invention.

Referring to FIG. 13, if the mobile terminal M and the communication unit 160 enter into a communication mode in which they can communicate with each other (S540), the control unit 170 controls a list of operation programs stored in the memory unit 150 to be transmitted to the mobile terminal M through the communication unit 160 (S545). Then, if operation control data is input from the mobile terminal M to the communication unit 160 (S560), the control unit 170 renews the memory unit 150 (S565), and controls the washer W to be operated according to the renewed result (S570).

Figure 14:
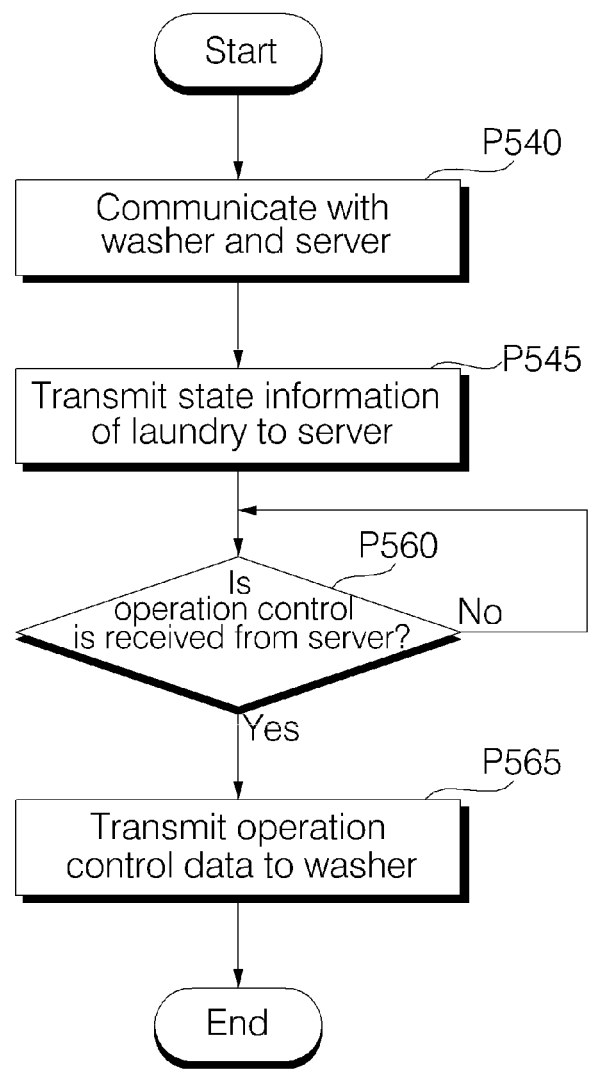
FIG. 14 is a flowchart illustrating an example of a control method of a mobile terminal communicating with the washer according to the third embodiment of the present invention.

FIG. 14 is a flowchart illustrating an example of a control method of a mobile terminal communicating with the washer according to the third embodiment of the present invention.

Referring to FIG. 14, if the mobile terminal M and the washer W enter into a communication mode in which they can communicate with each other (P540), the mobile terminal M transmits an image of laundry to the server SVC (P545). If a predetermined operation control data is received according to state information of the laundry, obtained by analyzing the image (P560), the mobile terminal M retransmits the operation control data to the washer W (P565).

Figure 15:
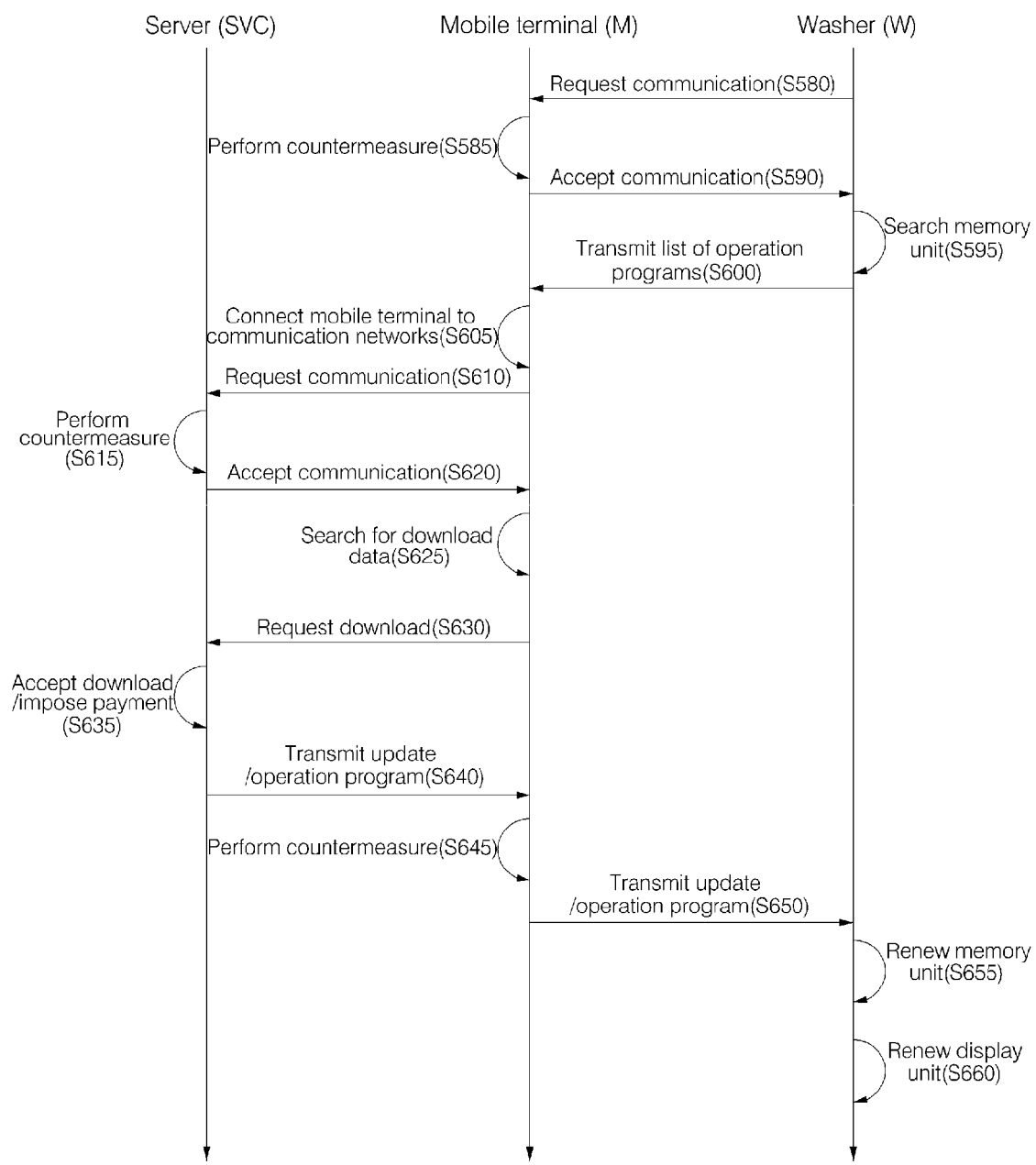
FIG. 15 illustrates a signal processing process performed in the laundry treatment system according to a fourth embodiment of the present invention.

FIG. 15 illustrates a signal processing process performed in the laundry treatment system according to a fourth embodiment of the present invention.

Referring to FIG. 15, after the mobile terminal M is mounted to the terminal mounting unit 140 of the washer W, a request for communication is performed from the washer W to the mobile terminal M (S580). An appropriate countermeasure such as an acceptance or rejection is performed from the mobile terminal M, corresponding to the request for communication (S585). In a case where the communication is accepted under a user's operation or automatically, a communication acceptance signal is transmitted to the washer W (S590), so that the washer W and the mobile terminal M are in a state in which they can communicate with each other.

The control unit 170 searches the memory unit 150 (S595), controls a list of operation programs stored in the memory 150 to be transmitted to the mobile terminal M (S600). The mobile terminal M is automatically connected to the communication network by a user's operation or a previously set program (S605). In this case, a request for communication is performed from the mobile terminal M to the server SVC through the communication network (S610), and the server SVC performs a countermeasure of rejecting or accepting the communication, corresponding to the request for communication (S615). The server SVC accepts the communication through a predetermined authentication (S620), so that the server SVC and the mobile terminal M are in a state in which they can communicate with each other.

Subsequently, a user searches operation programs stored in the server SVC through the mobile terminal M (S625). In a case where necessary update information or operation program to be added exists among the searched operation programs, the user selects the information or operation program, so that a request for download is performed (S630).

The server SVC accepts the download through a predetermined authentication or payment process (S635), and the requested operation update/operation program data is transmitted to the mobile terminal W (S640).

A download state is displayed in the mobile terminal M according to the situation of data transmitted from the mobile terminal M, or an appropriate countermeasure of retransmitting the data to the washer W is performed after the download is finished (S645). Then, the update/operation program transmitted to the mobile terminal M is retransmitted to the washer W (S650).

If the transmission of the update/operation program to the washer W is finished, the control unit 170 renews the memory unit 150 (S655), and renews the display of the display unit according to the renewed result (S660).

Figure 16:
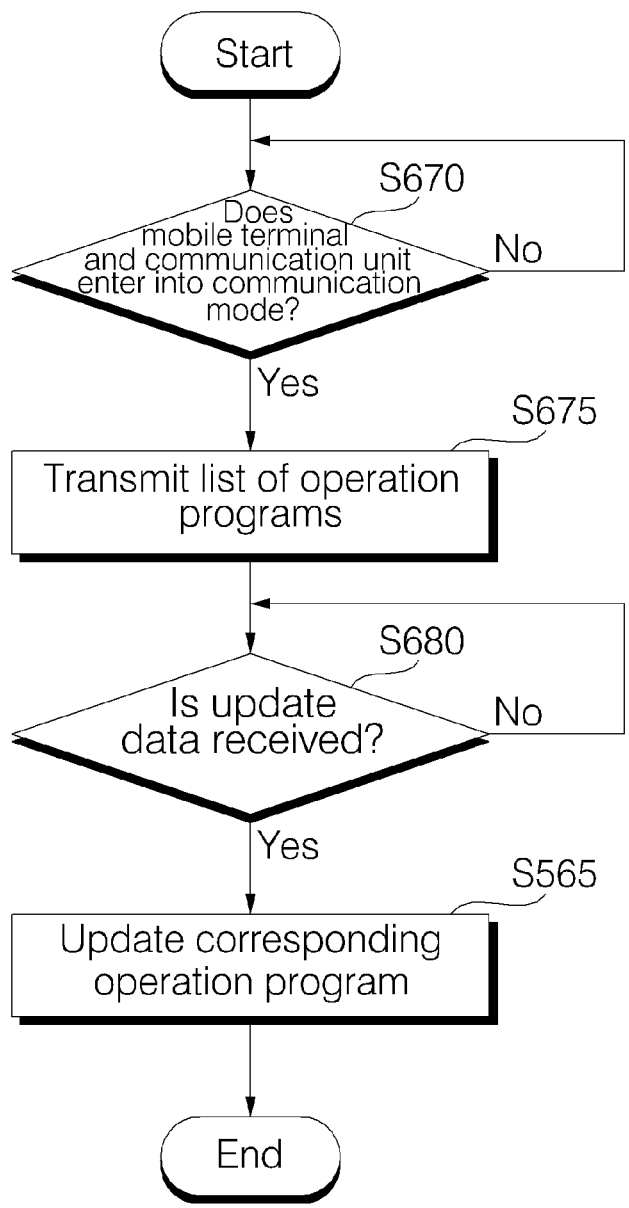
FIG. 16 is a flowchart illustrating a control method of a washer according to the fourth embodiment of the present invention.

FIG. 16 is a flowchart illustrating a control method of a washer according to the fourth embodiment of the present invention.

Referring to FIG. 16, if the mobile terminal M and the communication unit 160 enter into a communication mode in which they can communicate with each other (S670), the control unit 170 controls a list of operation programs stored in the memory unit 150 to be transmitted to the mobile terminal M through the communication unit 160 (S675). Then, if update data is input from the mobile terminal M to the communication unit 160 (S680), the control unit 170 updates a corresponding operation program to be updated (S685).

Figure 17:
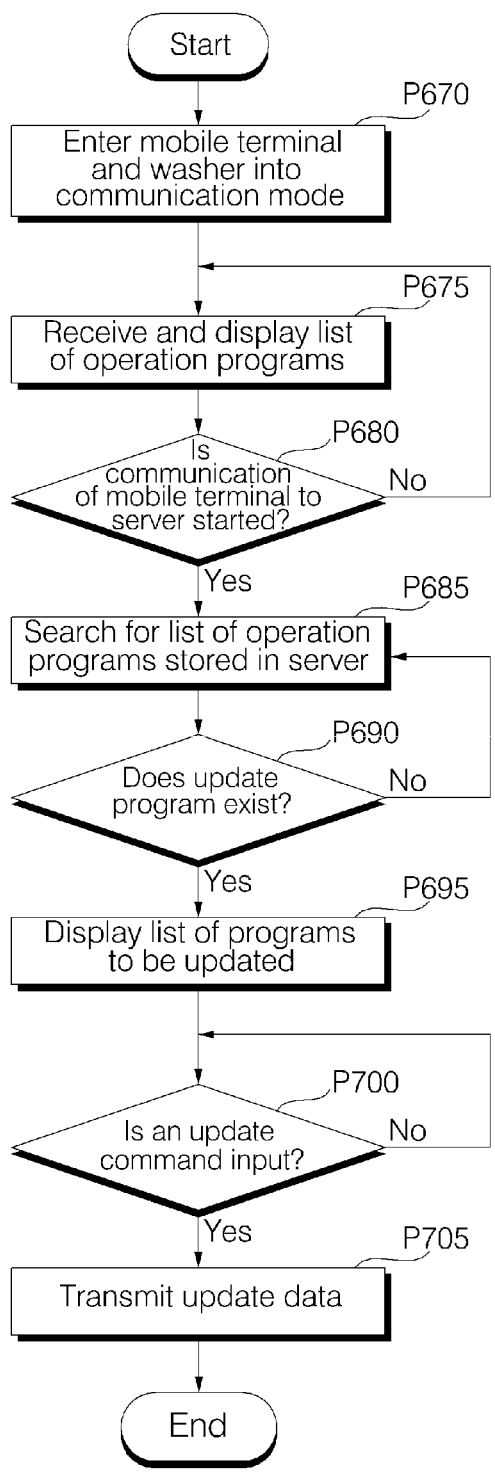
FIG. 17 is a flowchart illustrating an example of a control method of a mobile terminal communicating with the washer according to the fourth embodiment of the present invention.

FIG. 17 is a flowchart illustrating an example of a control method of a mobile terminal communicating with the washer according to the fourth embodiment of the present invention.

Referring to FIG. 17, if the mobile terminal M and the washer W enter into a communication mode in which they can communicate with each other (P670), a list of operation programs transmitted from the washer W is displayed on a screen of the mobile terminal M (P675), and the communication of the mobile terminal M with the server SVC is started (P680). The mobile terminal M searches for the list for the operation programs stored in the server SVC (P685), and determines whether an operation program to be updated exists by comparing the operation program with the list of the operation programs transmitted from the washer W (P690). In a case where there exists an operation program to be updated, the control unit 170 displays the operation program on the screen of the mobile terminal M so that a user can select whether to update the operation program (P695). If an update command is input from the user (P700), the mobile terminal M receives the selected update program transmitted from the server SVC, corresponding to the update command, and then retransmits the update program to the washer W (P705).

Figure 18:
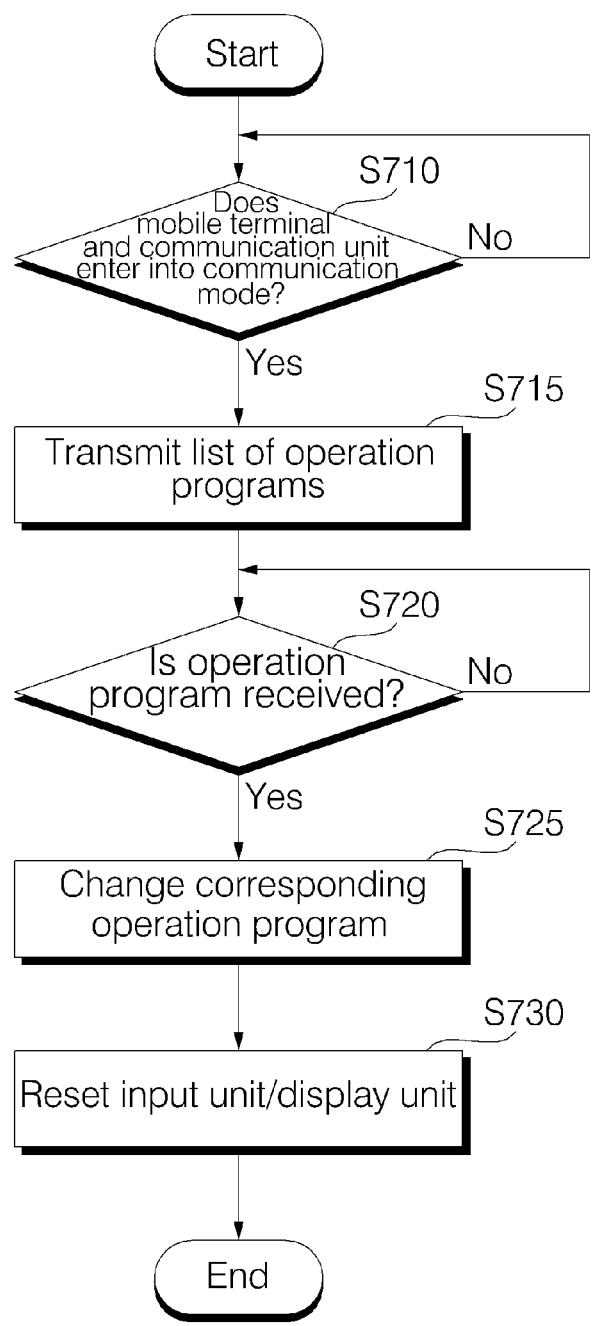
FIG. 18 is a flowchart illustrating a control method of a washer according to a fifth embodiment of the present invention.

FIG. 18 is a flowchart illustrating a control method of a washer according to a fifth embodiment of the present invention.

Referring to FIG. 18, this embodiment is different from the embodiment described with reference to FIG. 15 in that a new operation program is added to the memory unit 150. In this case, the addition of the new operation program to the memory unit 150 may include not only a case where the previously stored operation program is deleted to be replaced with the new operation program but also a case where the new operation program is added to the memory unit 150 in the state in which the previously stored operation program is maintained as it is.

If the mobile terminal M and the communication unit 160 enter into a communication mode in which they can communicate with each other (S710), the control unit 170 controls a list of operation programs stored in the memory unit 150 to be transmitted to the mobile terminal through the communication unit 160 (S715). Then, if new operation program data is input from the mobile terminal M to the communication unit 160 (S720), the control unit 170 changes the operation programs stored in the memory unit 150 by deleting an operation program previously stored in the memory unit 150 and replacing the operation program with a new operation program or additionally storing the new operation program in the memory unit 150 (S725). Then, the control unit 170 resets the input unit 142 and/or the display unit 144, corresponding to the changed operation program (S730).

For example, if an execution command is input to the input unit 142, a baby care course displayed in the display unit 144 is selected, and the washer is set so that the baby care program previously stored in the memory unit 150 is performed. In a case where the baby care program stored in the memory unit 150 through the process of changing the operation program is replaced with a child care program, the control unit 170 controls a child care course to be displayed, rather then a baby care course, through the display unit 144. Accordingly, when the execution command is input to the input unit 142, the control unit 170 controls the child care course to be performed by changing the setting of the input unit 142.

Alternatively, in a case where the child care program is additionally stored in the memory unit 160 in addition to the operation program previously stored in the memory unit 150, the control unit 170 controls the child care course to be additionally displayed in the display unit 144, and the input unit 142 is reset so that a user can select the added child care course.

Figure 19:
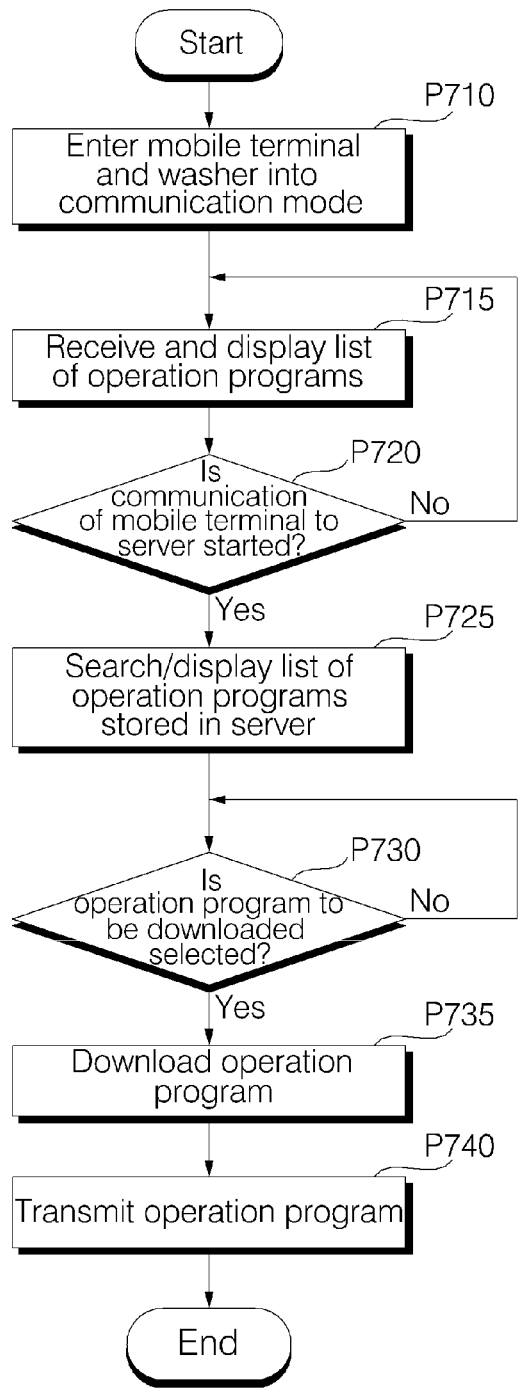
FIG. 19 is a flowchart illustrating an example of a control method of a mobile terminal communicating with the washer according to the fifth embodiment of the present invention.

FIG. 19 is a flowchart illustrating an example of a control method of a mobile terminal communicating with the washer according to the fifth embodiment of the present invention.

Referring to FIG. 19, if the mobile terminal M and the washer W enter into a communication mode in which they can communicate with each other (P710), a list of operation programs transmitted from the washer W is displayed on a screen of the mobile terminal M (P715), and the communication of the mobile terminal M with the server SVC is started (P720). The mobile terminal M searches for the list for the operation programs stored in the server SVC (P685), and determines whether an operation program to be downloaded exists by comparing the operation program with the list of the operation programs transmitted from the washer W. In a case where there exists an operation program to be downloaded, the control unit 170 displays the operation program on the screen of the mobile terminal M so that a user can select whether to download the operation program (P725). If the operation program to be downloaded is selected (P730), the mobile terminal M downloads a corresponding operation program from the server SVC, corresponding to the selected operation program (P735), and transmits the downloaded operation program to the washer W (P740).

Figure 20:
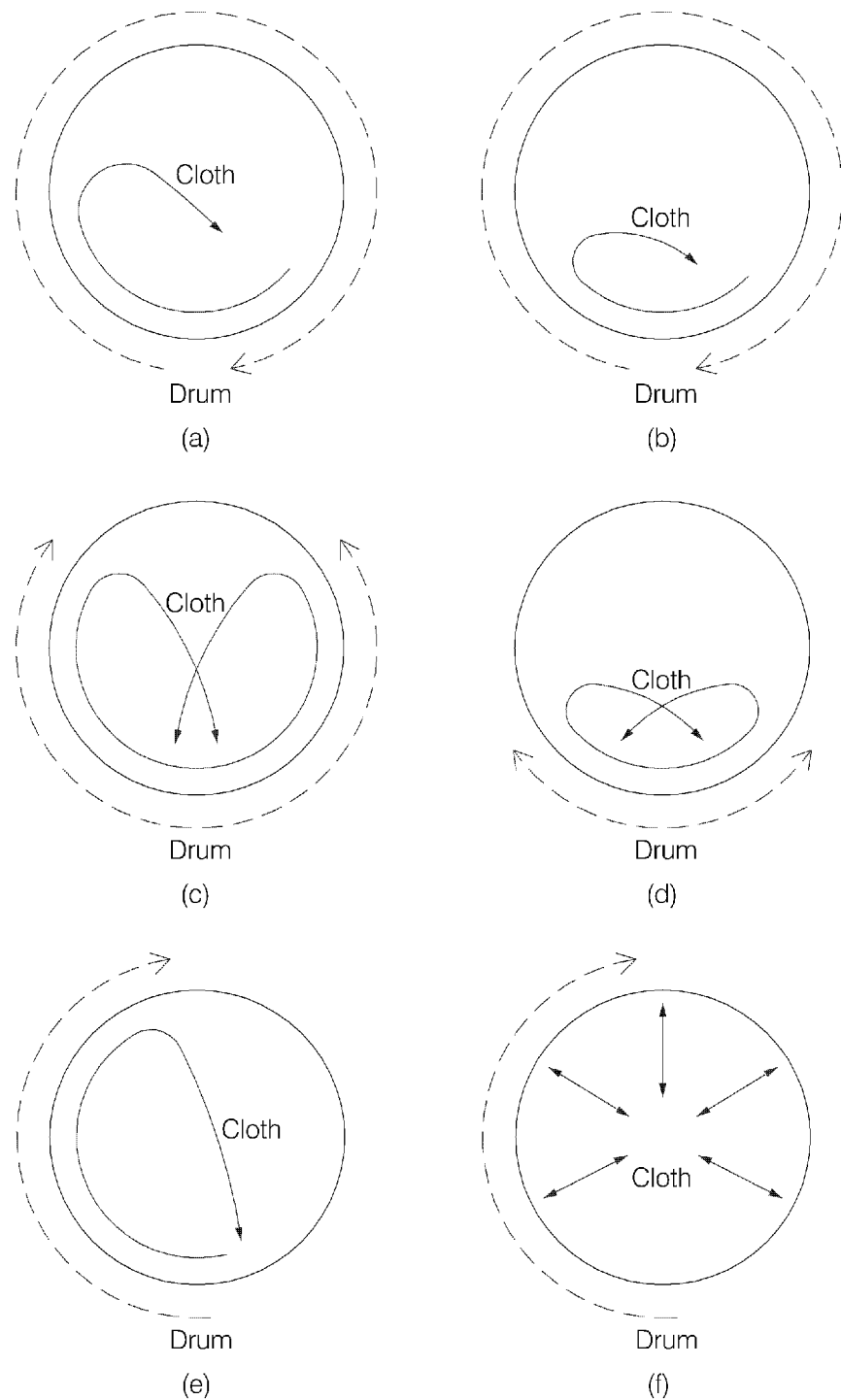
FIG. 20 illustrates various drum motions applicable to the washer according to the present invention.

FIG. 20 illustrates various drum motions applicable to the washer according to the present invention.

Various drum motions for effectively treating laundry are devised, and accordingly, it is possible to improve washing performance, to minimize damage of cloth and to reduce the amount of washing water used and power consumption. Particularly, a new drum motion is devised, so that improved washing performance can be obtained by changing only an operation program in the state in which the conventional configuration of the washer W is maintained as it is.

The washer W according to the embodiment of the present invention receives a new operation program (hereinafter, referred to as a new drum motion) transmitted from the mobile terminal M, thereby improving washing performance. Hereinafter, six drum motions will be described as examples of operation programs which can be added to the washer W. The six drum motions can be downloaded free of charge or on payment from the server SVC through the mobile terminal M.

Hereinafter, the drum motions will be described.

FIG. 20(a) shows a motion (hereinafter, referred to as a "tumbling motion") in which the driving unit 113 rotates the drum 124 in a certain direction so that cloth is lifted at the lowest position of the drum 124 and then drops near a half of the height of the drum 124. If the driving unit 113 continuously rotates the drum 124 at about 45 rpm, the cloth in the drum 124 is lifted by the lifter 125 and then drops near a half of the height of the drum 124. The cloth in the drum 124 is washed by shock power and friction power.

FIG. 20(b) shows a motion (hereinafter, referred to as a "rolling motion") in which the driving unit 113 rotates the drum 124 in a certain direction so that cloth is lifted at the lowest position of the drum 124 and then drops at a height that does not exceed the half of the height of the drum 124. If the driving unit 113 continuously rotates the drum 124 at about 40 rpm, the cloth in the drum 124 is lifted by the lifter 125 and then drops as if rolling at the height that does not exceed the half of the height of the drum 124. The cloth in the drum 124 is washed by bending/stretching power and friction power.

FIG. 20(c) shows a motion (hereinafter, referred to as a "scrub motion") in which the driving unit 113 rotates the drum 124 in different directions so that cloth is lifted at the lowest position of the drum 124 and then drops at a height that exceeds the half of the height of the drum 124.

The drum 124 is rotated fast in a certain direction so that the cloth is lifted at the height that exceeds the half of the height of the drum 124. If the driving unit 113 applies a great torque to the drum 124 in a certain direction, the drum 124 is rotated fast in the certain direction, and the cloth is lifted at the height that exceeds the half of the height of the drum 124 while rotating in the state in which the cloth is stuck to the drum 124. In this case, the drum 124 is preferably rotates at no less than 60 rpm that is a speed of 1G or more so that the cloth can be rotated in the state in which the cloth is stuck to the drum 124.

After the cloth is lifted at the height that exceeds the half of the height of the drum 124, the driving unit 113 brakes the drum 124. If the cloth exceeds an angle of about 165 degrees, the driving unit 113 brakes the drum 124. The driving unit 113 preferably brakes the drum 124 through reverse phase braking in which the driving unit 113 brakes the drum 124 by driving the motor to generate torque in the opposite direction to the rotation direction of the motor.

If the driving unit 113 brakes the drum 124, the cloth drops. The cloth preferably drops at a high position so that the impulse of the cloth is maximized. At least a portion of the cloth may drop by passing through the center line of the drum 124.

After the cloth drops, the drum 124 is rotated fast in the opposite direction so that the cloth is lifted at the height that exceeds the half of the height of the drum 124. If the driving unit 113 applies a great torque to the drum 124 in the opposite direction, the drum 124 is rotated fast in the opposite direction, and the cloth drops at the height that exceeds the half of the height of the drum 124 while rotating in the state in which the cloth is stuck to the drum 124. In this case, the drum 124 is preferably rotated at no less than 60 rpm that is a speed of 1G or more so that the cloth can be rotated in the state in which the cloth is stuck to the drum 124.

After the cloth is lifted at the height that exceeds the half of the height of the drum 124, the driving unit 113 brakes the drum 124. If the cloth exceeds an angle of about 165 degrees, the driving unit 113 brakes the drum 124. The driving unit 113 preferably brakes the drum 124 through reverse phase braking in which the driving unit 113 brakes the drum 124 by driving the motor to generate torque in the opposite direction to the rotation direction of the motor.

If the driving unit 113 brakes the drum 124, the cloth drops. The cloth preferably drops at a high position so that the impulse of the cloth is maximized. At least a portion of the cloth may drop by passing through the center line of the drum 124.

After the cloth drops, the drum 124 is again rotated fast in a certain direction so that the cloth is lifted at the height that exceeds the half of the height of the drum 124, thereby repeating the procedure described above. The cloth in the drum 124 is washed by high shock power and friction power using the difference in elevation.

FIG. 20(*d*) shows a motion (hereinafter, referred to as a "swing motion") in which the driving unit 113 rotates the drum 124 in different directions so that cloth is lifted at the lowest position of the drum 124 and then drops near a half of the height of the drum 124.

If the driving unit 113 slowly rotates the drum 124 in a certain direction, the cloth is lifted by the lifter 125 and then drops as if rolling at the height that does not exceed the half of the height of the drum 124. In this case, the drum 124 is preferably rotated at no more than 40 rpm that is a speed of 1G or less so that the cloth is not rotated in the state in which the cloth is stuck to the drum 124.

When the cloth drops, the driving unit 113 stops the operation of the drum 124 or brakes the drum 124 through dynamic braking in which an electromotive force generated by a closed circuit configured in the motor is consumed in a resistor, thereby stopping the motor. If the driving unit 113 stops the operation of the drum 124 or brakes the drum, the drum 124 is decelerated.

If the driving unit 113 slowly rotates the drum 124 in the opposite direction, the cloth is lifted by the lifter 125 and then drops as if rolling at the height that does not exceed the half of the height of the drum 124. In this case, the drum 124 is preferably rotated at no more than 40 rpm that is a speed of 1G or less so that the cloth is not rotated in the state in which the cloth is stuck to the drum 124.

When the cloth drops, the driving unit 113 stops the operation of the drum 124 or brakes the drum 124 through dynamic braking in which an electromotive force generated by a closed circuit configured in the motor is consumed in a resistor, thereby stopping the motor. If the driving unit 113 stops the operation of the drum 124 or brakes the drum, the drum 124 is decelerated.

The driving unit 113 slowly re-rotates the drum 124 again in a certain direction, thereby repeating the procedure described above.

FIG. 20(*e*) shows a motion (hereinafter, referred to as a "step motion") in which the driving unit 113 rotates the drum 124 in a certain direction so that cloth is lifted at the lowest position of the drum 124 and then drops near the peak of the drum 124. In the step motion, the drum 124 is rotated at about 60 rpm or more so that the cloth is lifted. After the cloth is lifted at a height that exceeds the half of the height of the drum 124, the driving unit 113 brakes the drum 124 so that the cloth drops near the peak of the drum 124. After the cloth drops, the drum 124 is rotated in the same direction so that the cloth is lifted.

The drum 124 is rotated fast in a certain direction so that the cloth is lifted at the height that exceeds the half of the height of the drum 124. If the driving unit 113 applies a great torque to the drum 124 in a certain direction, the drum 124 is rotated fast in the certain direction, and the cloth is lifted at height that exceeds the half of the height of the drum 124 while rotating in the state in which the cloth is stuck to the drum 124. In this case, the drum 124 is preferably rotated at no less than 60 rpm that is a speed of 1G or more so that the cloth can be rotated in the state in which the cloth is stuck to the drum 124.

After the cloth is lifted at a height that exceeds the half of the height of the drum 124, the driving unit 113 brakes the drum 124. If the cloth exceeds an angle of about 165 degrees, the driving unit 113 brakes the drum 124. The driving unit 113 preferably brakes the drum 124 through reverse phase braking in which the driving unit 113 brakes the drum 124 by driving the motor to generate torque in the opposite direction to the rotation direction of the motor.

If the driving unit 113 brakes the drum 124, the cloth drops. The cloth preferably drops at a high position so that the impulse of the cloth is maximized. At least a portion of the cloth may drop by passing through the center line of the drum 124.

After the cloth drops, the drum 124 is again rotated fast in a certain direction so that the cloth is again lifted at the height that exceeds the half of the height of the drum 124, thereby repeating the procedure described above. The cloth in the drum 124 is washed by high shock power and friction power using the difference in elevation.

FIG. 20(*f*) shows a pressure motion in which the driving unit 113 changes the speed of the drum 124 in a fast period so that the cloth is folded and unfolded. In the pressure motion, the drum 124 is accelerated and then decelerated at a speed of about 50 to 100 rpm in a fast period so that the cloth repeats an operation of sticking the cloth to the drum 124 and then coming off from the drum 124.

If the driving unit 113 rotates the drum 124 at a high speed, the cloth is rotated in the state in which the cloth is stuck to the drum 124. If the drum 124 is rotated at about 100 rpm, the cloth is rotated while being pressed by the drum 124. If the driving unit 113 decelerates the drum 124, the cloth comes off from the drum 124. If the drum 124 is rotated at a speed of 1G or less, the cloth comes off from the drum 124 and is then gathered at a lower end of the center of the drum 124.

If the driving unit 113 accelerates the drum 124 again, the cloth is rotated in the state in which the cloth is stuck to the drum 124, thereby repeating the procedure described above. In the procedure described above, washing water is preferably supplied into the drum 124 to be uniformly sprayed on the cloth. The movement of the cloth in the drum 124 is reinforced, so that a change in washing performance between washing courses is reduced, and the cloth uniformly comes in contact with the washing water.

In the laundry treatment system of the present invention, the user can download a desired drum motion among the six drum motions from the server SVC through the mobile terminal M and change the operation program of the washer W using the downloaded drum motion. Thus, the performance of the washer W can be improved by applying a new operation program to the washer W without replacing the washer W. Further, the user can manage operation programs stored in the washer W, so that the operation program that is not used any more can be replaced with a new operation program downloaded from the server SVC.

Meanwhile, the six drum motions described above are merely examples of the operation program to be downloaded from the server SVC, and it will be apparent that the washer of the present invention also downloads other operation programs released from the server SVC through the communication network, thereby improving the performance of the washer.

Figure 21:
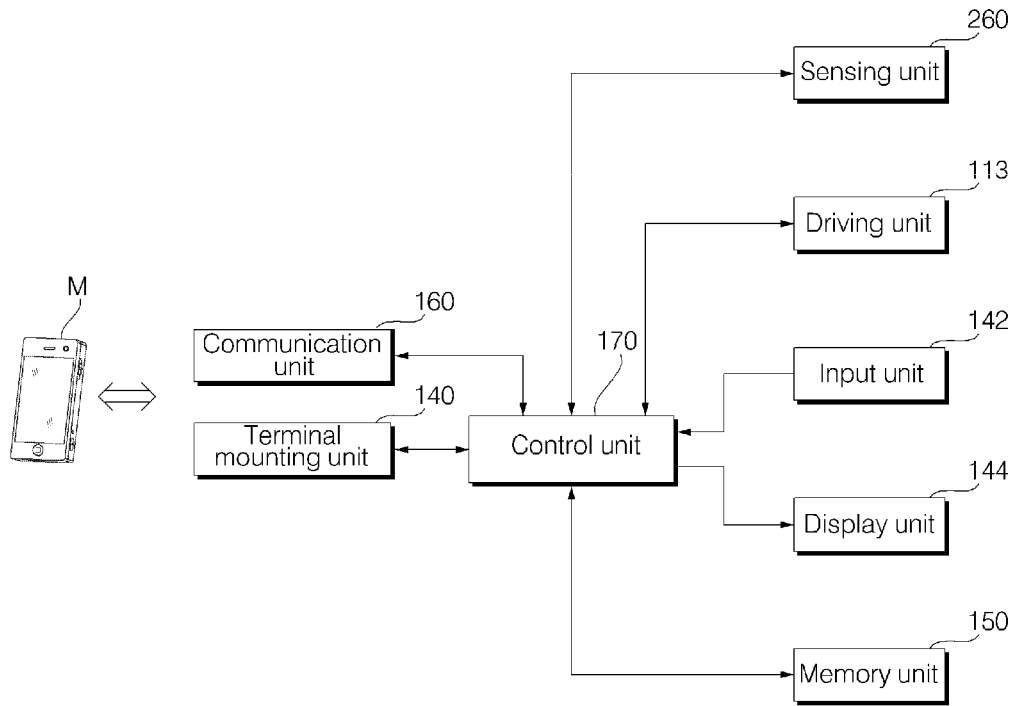
FIG. 21 is a block diagram illustrating a control configuration of a home appliance according to an embodiment of the present invention.

FIG. 21 is a block diagram illustrating a control configuration of a home appliance according to an embodiment of the present invention. Referring to FIG. 21, the home appliance includes the communication unit 160, the driving unit 113, the input unit 142, the display unit 144, the memory unit 150 and the control unit 170, which are the components described with reference to FIG. 4, and further includes the terminal mounting unit 140 and a sensing unit 260. Detailed descriptions of the components described in FIG. 4 will be omitted below.

The sensing unit 260 senses at least one of temperature, pressure, voltage, current, water level and the number of times of rotation through a plurality of sensing means provided to the inside or outside of the home appliance. The sensing unit 260 inputs, to the control unit 170, data sensed or measured from each sensing means.

For example, the sensing means in the washer W measures the level of water in water supply or drainage, and measures the temperature of water supplied, the rotation speed of a washing tub or drum, etc.

The memory unit 150 stores operation information such as operation state data generated while the home appliance performs a predetermined operation and setup data input by the input unit 142 so that the home appliance performs the predetermined operation, and fault information including the number of times in which the home appliance performs a specific operation, model information of the home appliance and information on the cause or position of malfunction when the malfunction occurs.

The memory unit 150 stores terminal data for distinguishing each mobile terminal from mobile terminals M connected to the washer W through the terminal mounting unit 140 or the communication unit 160, and stores data transmitted/received from the mobile terminal.

The memory unit 150 stores communication information for data communication with the mobile terminal M and registration information for registering a new mobile terminal when the new mobile terminal is connected to the washer W. The memory unit 150 stores data on a test mode for confirming an operation state of the home appliance.

In this case, the memory unit 150 is a storage means for storing data on the home appliance, and includes a data storage means such as ROM or EEPROM. The memory unit 150 includes a storage means for arbitrarily storing data as a buffer of the control unit 170, and RAM, DRAM, SRAM, etc. may be used as the memory unit 150.

The communication unit 160 includes at least one communication module, and is connected to the mobile terminal M by wire/wireless. In this case, the communication unit 160 may be connected to the Internet according to the kind of communication module provided thereto. The communication unit 160 includes a communication module using a communication scheme such as Bluetooth, infrared data association (IrDA) or short-range communication.

The communication unit 160 transmits operation state data to the mobile terminal M connected thereto, and receives diagnosis result data from the mobile terminal M.

The terminal mounting unit 140 includes a predetermined connection terminal, and is connected to the mobile terminal M by wire. In this case, the terminal mounting unit 140 is preferably provided at any one of front and side portions of the home appliance, but the position of the terminal mounting unit 140 is not limited thereto. The terminal mounting unit 140 may be configured to have a form in which the terminal mounting unit 140 is wound inside the home appliance. The terminal mounting unit 140 electrically connects the mobile terminal M and the home appliance to each other.

In this case, the home appliance is connected to the mobile terminal M through at least one of the communication unit 160 and the terminal mounting unit 140. In a case where the communication unit for connecting the home appliance to the mobile terminal M is provided, the home appliance may not include the terminal mounting unit. In a case where the terminal mounting unit is provided, the home appliance may not include the communication unit.

The terminal mounting unit 140 is configured so that the mobile terminal M is attached or detached thereto/therefrom. Thus, when the mobile terminal M is mounted to the terminal mounting unit 140, the home appliance is electrically connected to the mobile terminal M so as to transmits predetermined data to the mobile terminal M under a control command of the control unit 170 and to provide data input from the mobile terminal M to the control unit 170.

When the mobile terminal M is attached to or detached from the terminal mounting unit 140, the terminal mounting unit 140 senses the attachment or detachment of the mobile terminal M and provides a sensing signal to the control unit 170.

The terminal mounting unit 140 further includes a fixing means or protecting means for fixing the mobile terminal M when the mobile terminal M is mounted thereto.

If the mobile terminal M is mounted to the terminal mounting unit 140, the mobile terminal M is operated as a display means of the home appliance. In this case, the home appliance may include the separate display unit 144 as shown in FIG. 1, and may use the mobile terminal M mounted to the terminal mounting unit 140 as a basic display means.

The communication unit 160 or the terminal mounting unit 140 receives data on a voice recognition result from the mobile terminal M connected thereto and provides the received data to the control unit 170. The communication unit 160 or the terminal mounting unit 140 transmits operation state data generated by the control unit 170 to the mobile terminal M.

The control unit 170 sets a value for the operation of the home appliance by receiving a signal provided from the input unit 142. The control unit 170 controls the driving unit 130 to be operated according to the set value.

For example, in the laundry treatment machine, the control unit 170 sets a washing course or operation, corresponding to the signal input by the input unit 142, and provides, to the driving unit 113, a control signal corresponding to the set washing course or operation. The driving unit 113 controls each operation of the home appliance, corresponding to the control command, thereby performing main washing, rinsing and dewatering cycles.

If a test mode is set corresponding to a request of the input unit 142 or the mobile terminal, the control unit 170 controls the driving unit 113 so that the home appliance performs the operation specified in the test mode. The test mode is an operation mode for confirming the state of the home appliance. The control unit 170 transmits data collected in the test mode as operation state data to the mobile terminal M.

In this case, the control unit 170 includes individual test modes for measuring vibration, noise, form and balance when the test mode is set, so that operations differently set according to the individual test modes are performed. When a plurality of individual test modes are set, the control unit 170 consecutively performs a plurality of operations for each test mode.

Although a separate test mode is not set, the control unit 170 stores data generated or measured during each operation in the memory unit 150. In a case where a request of the mobile terminal M exists, the control unit 170 may transmit the stored data to the mobile terminal M.

When the home appliance is in a normal state, the control unit 170 measures data as described above and uses the measured data as reference data for data comparison in diagnosis. In this case, the reference data includes data generated or measured during the operation of the home appliance and data measured in the mobile terminal M during the operation of the home appliance. The reference data may be provided to a manufacturer as a guide for the normal operation of the home appliance.

If the home appliance is connected to the mobile terminal M through the terminal mounting unit 140 or the communication unit 160, the control unit 170 receives diagnosis data on the operation of the home appliance by providing operation state data to the mobile terminal M. In this case, the operation state data includes data generated or measured while the home appliance performs the set operation and result data according to the performance of the operation.

If the home appliance receives diagnosis data from the mobile terminal M through the terminal mounting unit 140 or the communication unit 160, the control unit 170 outputs the corresponding diagnosis data through the display unit 144. When necessary, the control unit 170 may output the diagnosis result in the form of at least one of effect sound, warning sound, state light, warning light, guide message and warning message through an output means.

The control unit 170 upgrades a control program and basic data of the home appliance using the control data received from the mobile terminal M. The control unit 170 may separately perform authentication for the mobile terminal M before transmitting the operation state data to the mobile terminal M connected thereto.

In a case where the home appliance operates in the test mode, the mobile terminal M collects data generated during the operation of the home appliance. For example, the mobile terminal M measures and stores noise or vibration generated during the operation of the home appliance, and photographs and stores an operation state of the home appliance.

If the home appliance is connected to the mobile terminal M through the terminal mounting unit 140 or the communication unit 160, the control unit 170 receives voice recognition result data from the mobile terminal M, and generates an operation command corresponding to the voice recognition result data, thereby changing the operation of the home appliance. In this case, the control unit 170 may change a setting for the operation of the home appliance or change the operation being performed by the home appliance, corresponding to the voice recognition result data.

The control unit 170 changes the operation of the home appliance as described above, corresponding to the voice recognition result data, and enables operation state monitoring of the home appliance by controlling the operation state of the home appliance to be output through the mobile terminal M.

In this case, the operation state data includes data generated or measured while the home appliance performs the set operation and result data according to the operation performed by the home appliance.

If the home appliance is connected to the mobile terminal M through the terminal mounting unit 140 or the communication unit 160, the control unit 170 generates, as operation state data, information on the operation being performed by the home appliance or information on the operation that has performed by the home appliance, and provides the generated information to the mobile terminal M.

The control unit 170 transmits, to the mobile terminal M, operation state data including at least one of operation setting, progress state during operation, remaining time and guide information. The control unit 170 controls the operation state data to be displayed as at least one combination of a character, a number, a special character and an image in a display means of the mobile terminal M. Thus, the display means of the mobile terminal M can be used as a display means of the washer W.

The control unit 170 determines whether the mobile terminal M is mounted to the terminal mounting unit 140 corresponding to the sensing signal provided from the terminal mounting unit 140. In a case where the mobile terminal M is mounted to the terminal mounting unit 140, the control unit 170 provides the operation state data to the mobile terminal M through the terminal mounting unit 140, so that information on the operation state of the home appliance is displayed through the mobile terminal M.

If predetermined data is input from the terminal mounting unit 140, the control unit 170 changes setting for the operation of the home appliance, corresponding to the input data, and provides a control command to the driving unit 113 to be operated according to the control command. The control unit 170 upgrades the control program and basic data of the home appliance using control data received from the mobile terminal M.

If the mobile terminal M is mounted to the terminal mounting unit 140, the control unit 170 receives information on the mobile terminal and stores the information as terminal data in the memory unit 150 so as to register the mobile terminal M connected to the terminal mounting unit 140. In this case, the control unit 170 may perform authentication for the mobile terminal M using authentication information and then register the mobile terminal M. When the mobile terminal M is mounted to the terminal mounting unit 140, the control unit 170 determines whether the mobile terminal M connected using the terminal information of the mobile terminal M is a registered mobile terminal.

In a case where an unregistered mobile terminal is connected to the home appliance, the control unit 170 registers the unregistered mobile terminal as a new mobile terminal or displays only operation information through the mobile terminal M without registering the unregistered mobile terminal. In this case, the control unit 170 blocks data input from the mobile terminal M.

When being mounted to the home appliance, the mobile terminal M displays a mounting state, and outputs data received from the home appliance on a screen of the display means provided thereto.

The mobile terminal M is mounted to the terminal mounting unit 140 so as to receive data diagnosed by the control unit 170, and displays the received data in the display means provided thereto. In this case, the mobile terminal M displays information input by an operation key, information on an operation being performed by the laundry treatment machine and information when the laundry treatment machine is finished on the screen, corresponding to a control command. When the home appliance malfunctions, the mobile terminal M displays an error related to the malfunction. For example, the mobile terminal M may display the progress state of the operations of main washing, rinsing and dewatering cycles using at least one of a character, a number, a special character and an image.

The mobile terminal M includes a program for the home appliance or a control menu for the home appliance, and performs the program or control menu when being mounted to the home appliance, so as to output data on the operation state received from the home appliance. In this case, the data on the operation state includes information on a current operation of the home appliance, a progress situation and information on operation setting. The operation state includes fault information on the presence of abnormal operation.

The mobile terminal M may input predetermined data to the home appliance through the program or control menu.

The mobile terminal M executes a diagnosis program for the home appliance, based on the collected data or the operation state data received from the home appliance, and diagnoses the operation state of the home appliance, based on the diagnosis data.

Figure 22:
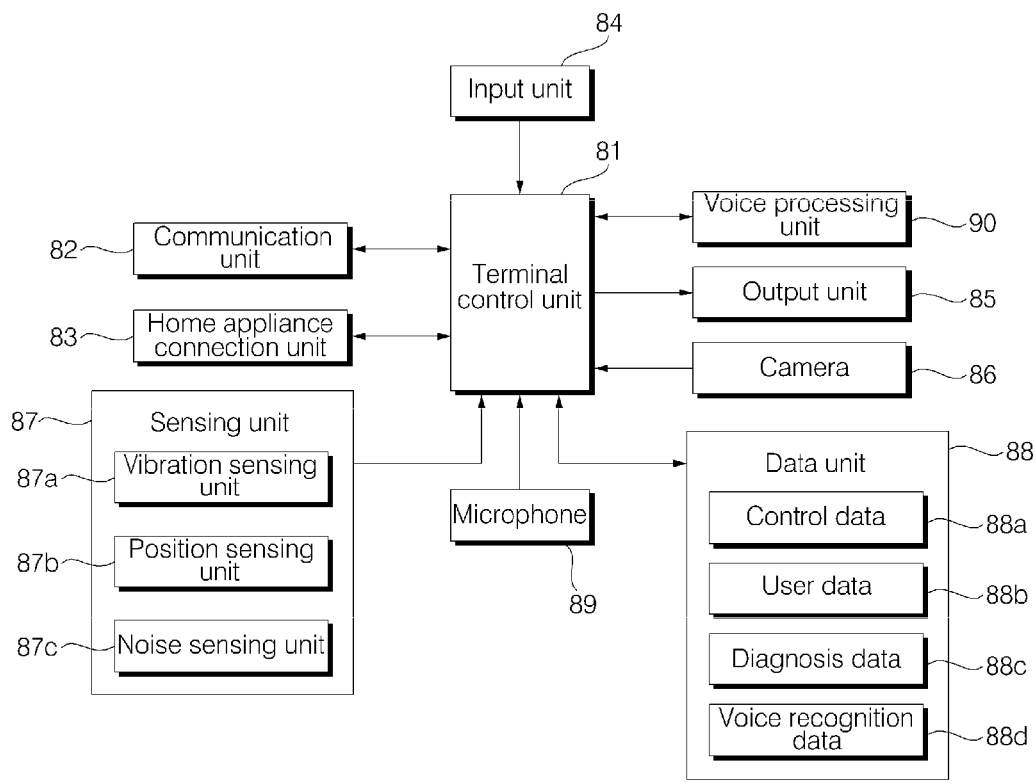
FIG. 22 is a block diagram illustrating a control configuration of a mobile terminal according to an embodiment of the present invention.

The mobile terminal is configured as fallows. FIG. 22 is a block diagram illustrating a control configuration of a mobile terminal according to an embodiment of the present invention.

Referring to FIG. 22, the mobile terminal M includes an input unit 84, a microphone 89, an output unit 85, a camera 86, a data unit 88, a communication unit 82, a home appliance connecting unit 83, a sensing unit 87, a voice processing unit 90 and a terminal control unit 81 controlling whole operations of the mobile terminal M.

The input unit 84 is provided with at least one input means. The input unit 84 inputs a predetermined signal, corresponding to an operation such as press, rotation or touch, thereby providing predetermined data to the terminal control unit 81.

The microphone 89 collects ambient sounds and inputs sound data to the mobile terminal M. In this case, the microphone 89 includes a processing unit converting an analog sound into digital data, or is connected to the processing unit so as to convert the ambient sounds into data that the terminal control unit 81 can recognize.

The output unit 85 includes output means such as a display means, a speaker and a lamp, and outputs an operation state of the mobile terminal M. Particularly, the display means visually displays the operation state of the mobile terminal M as a combination of a predetermined menu screen, a character, a number and an image, corresponding to the operation of the mobile terminal M, so that a user can easily confirm the operation state data of the mobile terminal M.

In a case where the mobile terminal M collects data on the operation state of the home appliance, the output unit 85 displays information on the collected data. When the mobile terminal M is connected to the home appliance, the output unit 85 displays a connection state of the mobile terminal M. The output unit 85 outputs a diagnosis result for the home appliance.

The camera 86 includes a lens (not shown), a photographing device (not shown) and an image processing unit (not shown), and stores a specific image as data. In this case, the camera 86 photographs an image of the home appliance through the input unit 84, corresponding to a photographing command during the operation of the home appliance, and stores the photographed image as image data.

The sensing unit 87 includes a vibration sensing unit 87a sensing vibration of the mobile terminal or its surroundings, a position sensing unit 87b sensing a direction of the mobile terminal M and a noise measuring unit 87c sensing a degree of noise with respect to the sound data input from the microphone 84. The terminal control unit 81 may change the display direction of the output unit 85 according to the direction of the mobile terminal M, sensed by the position sensing unit 87b.

The communication unit 82 includes at least one communication module, and allows the mobile terminal M to be connected to Internet, a mobile communication network or a predetermined network. The communication unit 82 is connected to the communication unit 160 provided to the home appliance so as to perform data communication between the home appliance and the mobile terminal M.

The home appliance connecting unit 83 is electrically connected to the terminal mounting unit 140 provided to the home appliance so as to perform data communication between the home appliance and the mobile terminal M.

In this case, the terminal control unit 81 is connected to the home appliance through any one of the communication unit 82 or the home appliance connecting unit 83 so as to receive operation state data from the home appliance and to transmit a diagnosis result for the home appliance to the home appliance.

The data unit 88 includes control data 88a required for the mobile terminal M to perform a predetermined operation, user data 88b stored by a user, diagnosis data 88c for diagnosing a state of the home appliance and voice recognition data 88d for recognizing input voice.

The voice processing unit 90 recognizes voice from sound information collected through the microphone 96 and provides the recognized voice to the terminal control unit 81. The voice processing unit 90 converts operation state data of the home appliance, corresponding to a control command of the terminal control unit 81, and allows the operation state data to be output as voice through the speaker 87.

The voice processing unit 90 distinguishes and recognizes a user's voice from the sound information collected through the microphone 86, based on the voice recognition data stored in the data unit 88, and generates information on the recognized voice as voice recognition result data.

The voice processing unit 90 includes TTS. The voice processing unit 90 converts data into voice data and provides the voice data to the speaker 87, so that the operation state data of the home appliance is output as voice through the speaker 87.

The terminal control unit 81 controls the mobile terminal M to perform a predetermined operation according to data input through the input unit 84, and outputs information on an operation of the mobile terminal M through the output unit 85.

The terminal control unit 81 is connected to the home appliance through any one of the communication unit 82 or the home appliance connecting unit 83 so as to transmit the voice recognition result data recognized by the voice processing unit 90 to the home appliance. The terminal control unit 81 receives operation state data from the home appliance and provides the received operation state data to the voice processing unit 90.

The terminal control unit 81 collects information on the home appliance by driving at least one of the camera 86, the vibration sensing unit 87*a*, the noise measuring unit 87*c* and the microphone 89. In this case, the terminal control unit 81 may set a separate measurement mode for measuring the state of the home appliance. The terminal control unit 81 may set specific data to be collected corresponding to a menu item selected by the user.

The terminal control unit 81 stores, as the user data 88*b*, data collected from the home appliance, i.e., a vibration value sensed through the vibration sensing unit 87*a*, a noise value measured through the noise measuring unit 88*c*, image data photographed by the camera and operation state data of the home appliance, received from the communication unit 82 or the home appliance connecting unit 83.

The terminal control unit 81 analyzes each measured value stored as the user data or the received data using the diagnosis program and the diagnosis data 88*c*, thereby diagnosing the operation state of the home appliance. The terminal control unit 81 controls a diagnosis result to be output through the output unit 85, and transmits the diagnosis result to the home appliance through the communication unit 82 or the home appliance connecting unit 83.

In a case where the home appliance is abnormal, the terminal control unit 81 is connected to a service center through the communication unit 82 so as to transmit diagnosis result data to the service center and to request the service center of a service for the home appliance.

Figure 23:
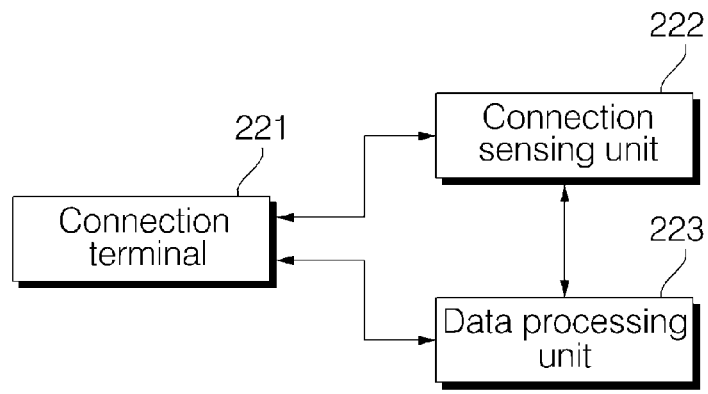
FIG. 23 is a block diagram illustrating a configuration of a terminal mounting unit of the home appliance.

FIG. 23 is a block diagram illustrating a configuration of the terminal mounting unit of the home appliance. Referring to FIG. 23, the terminal mounting unit 140 includes a connection terminal 221, a connection sensing unit 222 and a data processing unit 223.

The connection terminal 221 electrically connects the mobile terminal m and the home appliance to each other. In this case, the connection terminal 222 is provided with a plurality of connection terminals made of a conductor to be connected to a connection terminal of the mobile terminal M, so that the terminal mounting unit 140 transmits data of the home appliance to the mobile terminal M and receives data of the mobile terminal M.

In this case, the connection terminal 221 is provided in the same manner as the terminal of the mobile terminal M. For example, a 24-pin standard terminal or 20-pin standard terminal is preferably used as the connection terminal 221. However, in a case where the connection terminal 221 is provided in a different manner from the terminal of the mobile terminal M, the connection terminal 221 may further include a separate gender for connection so that the terminal mounting unit 140 is connected to the mobile terminal M through the gender.

If the mobile terminal M is mounted to the terminal mounting unit 140, the connection sensing unit 222 senses the presence of mounting of the mobile terminal, corresponding to a change in amplitude of the voltage or current of a signal provided to the connection terminal 221. In a case where the mobile terminal M is mounted to or separated from the terminal mounting unit 140, the connection sensing unit 222 provides a sensing signal indicating a connection state of the mobile terminal M to the control unit 170.

The data processing unit 223 transmits operation state data of the home appliance to the mobile terminal M through the connection terminal 221, corresponding to a control command of the control unit 170, and provides data received from the mobile terminal M to the control unit 170.

In a case where the data form or transmission method of the home appliance is different from that of the mobile terminal M, the data processing unit 223 converts the data and transmits the converted data.

In a case where an unregistered mobile terminal is connected to the connection terminal 221, the data processing unit 223 blocks data from being received from the mobile terminal M, corresponding to the control command of the control unit 170.

Figure 24:
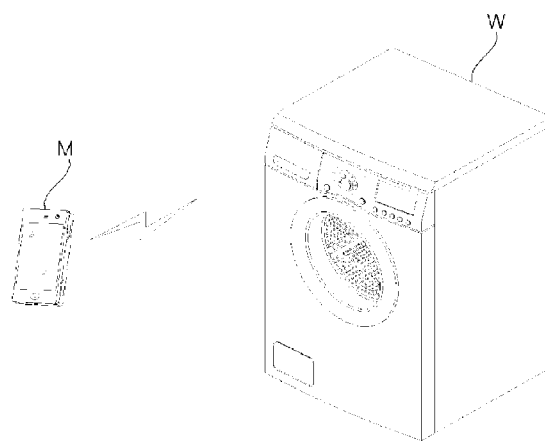
FIGS. 24 and 25 illustrate examples of connection between the home appliance and the mobile terminal according to an embodiment of the present invention.
Figure 24:
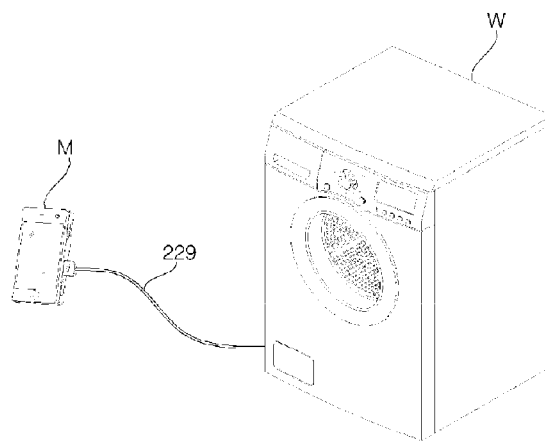
Figure 25:
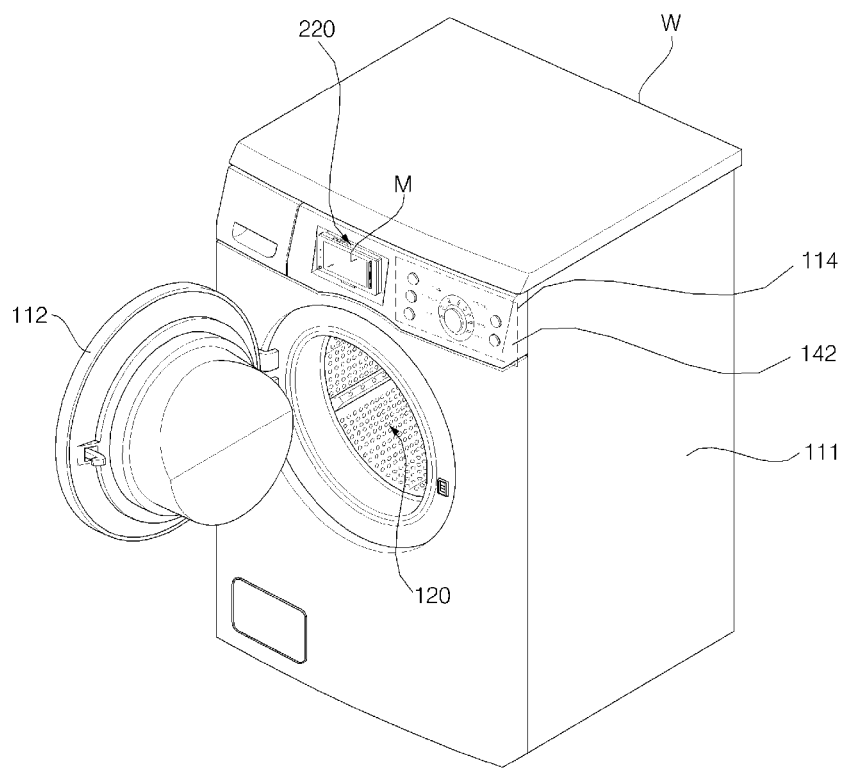

FIGS. 24 and 25 illustrate examples of connection between the home appliance and the mobile terminal according to an embodiment of the present invention.

Referring to FIG. 24(*a*), the home appliance and the mobile terminal M are connected to each other by wireless through the communication units 160 and 82 respectively provided thereto so that data is communicated between the home appliance and the mobile terminal M.

In this case, the home appliance and the mobile terminal M may be connected to each other using a short-range communication scheme such as Bluetooth, IrDA or WiFi.

As shown in FIG. 24(*b*), the terminal mounting unit 140 of the home appliance is electrically connected to the home appliance connecting unit 83 of the mobile terminal M so that data is communicated between the home appliance and the mobile terminal M.

The connection between the terminal mounting unit 140 and the home appliance connecting unit 83 may be formed so that the mobile terminal M is mounted to the home appliance, but the present invention is not limited to the drawing. That is, any direct connection using a cable is possible.

The mobile terminal M may be connected to a service center, corresponding to a diagnosis result for the home appliance. The mobile terminal M may transmit the diagnosis result for the home appliance to the service center and request the service center of a service for the home appliance. When necessary, the mobile terminal M may relay the connection between the home appliance and the service center. In this case, the mobile terminal M may be connected to the service center so as to transmit the diagnosis result for the home appliance and to renew a diagnosis program or diagnosis data for diagnosing the home appliance.

Referring to FIG. 25, the terminal mounting unit 140 provided to the control panel 144 of the washer W electrically connects a predetermined mobile terminal M to the home appliance. In this case, the terminal mounting unit 140 includes a connection terminal electrically contacted with the mobile terminal M so as to communicate data with the mobile terminal M.

The terminal mounting unit 140 transmits an operation state of the home appliance and information on an operation of the home appliance to the mobile terminal M so that the operation state and the information are displayed through the mobile terminal M. The terminal mounting unit 140 may provide, to the home appliance, a signal input from the mobile terminal M connected thereto.

In a case where a separate display unit is not provided to the home appliance, the display unit of the mobile terminal connected to the home appliance through the terminal mounting unit operates as a display of the home appliance.

In a case where a separate display unit is further provided to the home appliance as described in FIG. 1, any one of a display means of the mobile terminal connected to the home appliance through the terminal mounting unit and a display unit provided to the washer may operate as a main display, and the other may operate as an auxiliary display.

In this case, the terminal mounting unit 140 may be disposed at the front or top of the home appliance. The terminal mounting unit 140 is preferably disposed at a position that a user can easily access for the purposed of the attachment/detachment of the mobile terminal. The terminal mounting unit 140 may further include a protecting means such as a case for protecting the mobile terminal M connected to the terminal mounting unit 140 from an external impact or dangerous factor.

Figure 26:
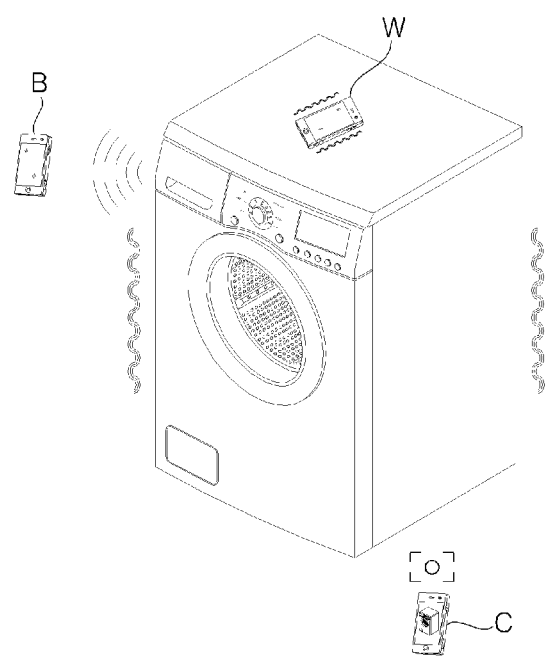
FIG. 26 illustrates an example of data collection using the mobile terminal during an operation of the home appliance of the present invention.

FIG. 26 illustrates an example of data collection using the mobile terminal during an operation of the home appliance of the present invention.

As shown in FIG. 26, during the operation of the home appliance, the mobile terminal M measures noise generated in the home appliance (A), measures vibration generated in the home appliance (B), and photographs an image under the operation of the home appliance using a camera (C).

In this case, a separate test mode may be set in the home appliance. A measurement mode may also be set in the mobile terminal M. However, the mobile terminal M may measure vibration or noise generated in the home appliance by setting the measurement mode and photograph an image of the home appliance even when the home appliance performs a general operation.

In a case where the mobile terminal is mounted on the top of the home appliance, the terminal control unit 81 may measure a balance of the home appliance. That is, the terminal control unit 81 may sense whether the home appliance is inclined toward any one side.

The terminal control unit 81 controls at least one of the microphone, the noise measuring unit, a vibration sensing unit and the camera to be driven individually or in a predetermined order for the purpose of measuring sound, noise, vibration and photographing an image. In a case where these units are sequentially driven, the terminal control unit 81 may output a guide message on a screen of the mobile terminal.

For example, when noise is measured, the terminal control unit 81 may display a guide message, i.e., 'Please, don't bring the mobile terminal close to the home appliance within a certain distance', and may receive a measurement starting command input through the input unit. When vibration is measured, the terminal control unit 81 may display a guide message, i.e., 'Please, put the mobile terminal on the top of the home appliance and maintain the state for 10 seconds'.

During the measuring, the terminal control unit 81 may output a guide message so that the mobile terminal does not move. In this case, the terminal control unit 81 displays a progress state using at least one of a state bar, an image and a number so as to guide a user to maintain the state in which the mobile terminal does not move at a certain position.

The guide message may be displayed in the home appliance as well as the mobile terminal M. In a case where the test mode of the home appliance is set, the control unit 170 of the home appliance may control the guide information described above to be output through the display unit 144.

The mobile terminal M diagnoses an operation state of the home appliance using data on the vibration, noise and image measured during the operation of the home appliance. In a case where the mobile terminal M is connected to the home appliance, the mobile terminal M diagnoses the home appliance using both the operation state data received from the home appliance and the data measured as described above.

The mobile terminal M determines, based on the diagnosis data, whether the measured vibration is a reference vibration or more, whether the measured noise is a reference noise or more, and whether the exterior appearance of the home appliance is abnormal through the image.

However, in case of the image, a user's decision may be added. In this case, mobile terminal M displays the image together with an option for the image on a screen so that the operation state of the home appliance can be determined using the image, corresponding to a user's input. When being connected to a service center, the mobile terminal M may provide image data as basic data on an installation position of the home appliance and installation environment.

Here, as described above, the case where the mobile terminal diagnoses the operation state of the home appliance has been described as an example. However, when necessary, a self-diagnosis program and data on the self-diagnosis program may be provided to the home appliance so that the home appliance can perform self-diagnosis.

In a case where the home appliance performs self-diagnosis, the mobile terminal transmits, to the home appliance, data collected by measuring noise and vibration generated during the operation of the home appliance and photographing an image of the home appliance.

The home appliance may perform self-diagnosis using at least one of the collected data transmitted from the mobile terminal and operation state data self-stored during the operation of the home appliance. In a case where the home appliance is abnormal as a self-diagnosis result, the user may connect the service center through the mobile terminal or request the mobile terminal of connection to the service center.

Figure 27:
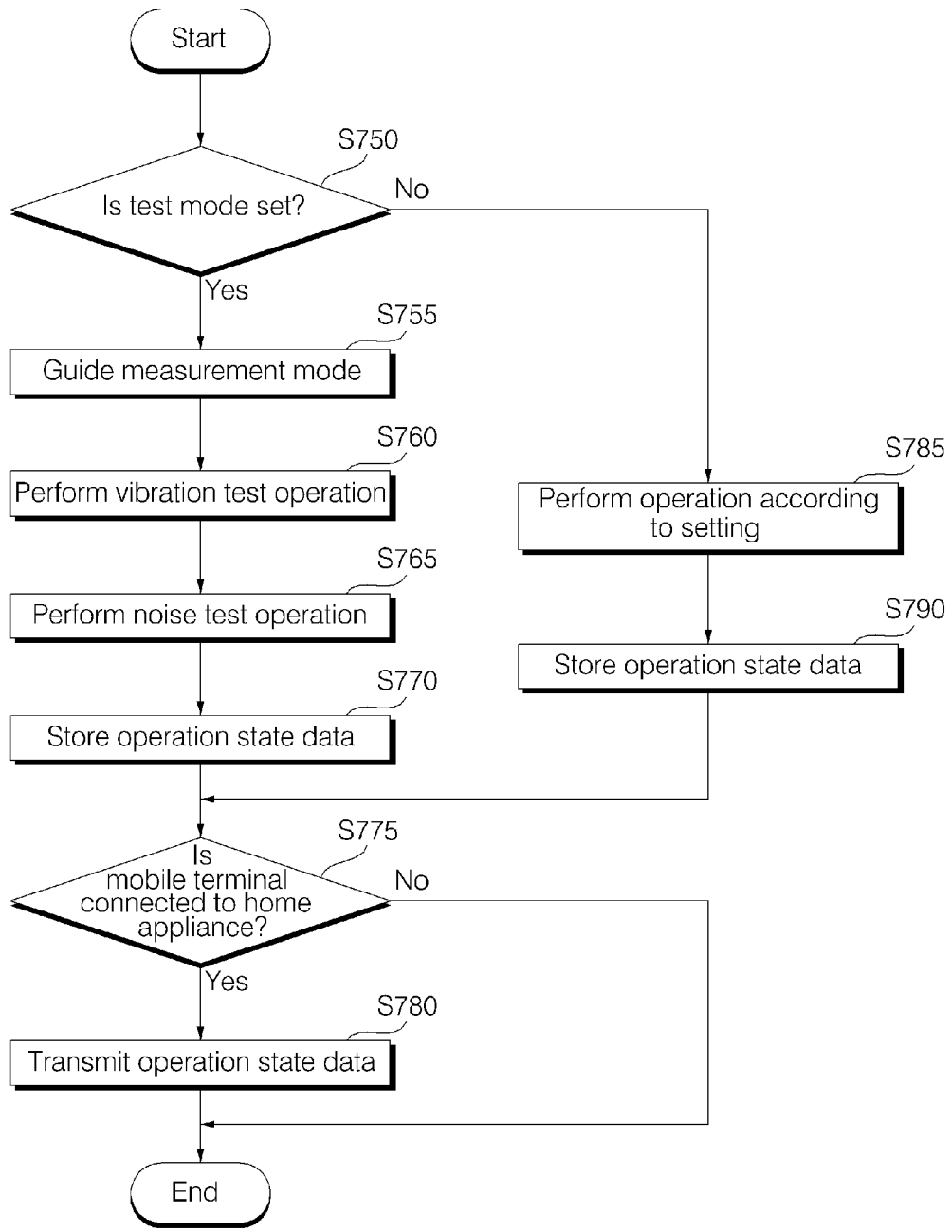
FIG. 27 is a flowchart illustrating an operating method according to the setting of a test mode of the home appliance of the present invention.

FIG. 27 is a flowchart illustrating an operating method according to the setting of a test mode of the home appliance of the present invention. Referring to FIG. 27, if a test mode is set in the home appliance (S750), the home appliance guides a measurement mode (S755) and starts a specified operation.

The control unit 170 performs a specific operation, based on test operation data stored in the memory unit 150. The control unit 170 performs a dewatering cycle in which vibration is frequently generated by rotating the motor at a high speed so that a vibration test operation is performed (S760). In this case, the control unit may perform the vibration test operation step by step by changing the rotation speed of the motor.

The control unit 170 performs a noise test operation, separately from the vibration test operation (S765). In this case, since noise is generated by vibration, the control unit 170 may perform the noise test operation together with the vibration test operation.

For example, if the vibration test operation is performed based on speed, the noise test operation may be performed based on a maintenance time with respect to a certain rotation speed. That is, the noise test operation may be performed to measure noise generated when the noise is maintained at a certain rotation speed for a predetermined time.

If the test operation is finished, the control unit 170 stores data generated or measured during the test operation (S770). In this case, the stored data is data self-measured in the home appliance. When the vibration or noise test operation is performed as described above, the mobile terminal M may separately measure vibration and noise.

If the mobile terminal is connected to the home appliance through the terminal mounting unit 140 or the communication unit 160 (S775), the control unit 170 transmits the stored data as operation state data to the mobile terminal (S780).

Meanwhile, in a case where the test mode is not set, the control unit 170 performs a general operation according to setting input by the input unit 142 (S785). The control unit 170 stores data generated or measured during the operation of the home appliance according to the input setting (S790).

In a case where the mobile terminal M is connected to the home appliance after the operation of the home appliance is finished (S775), the control unit 170 transmits the data stored during the general operation as operation state data to the mobile terminal M (S780).

If the diagnosis is finished through the mobile terminal M, the control unit 170 receives a diagnosis result from the mobile terminal M and controls the received result to be output through the display unit 144.

Figure 28:
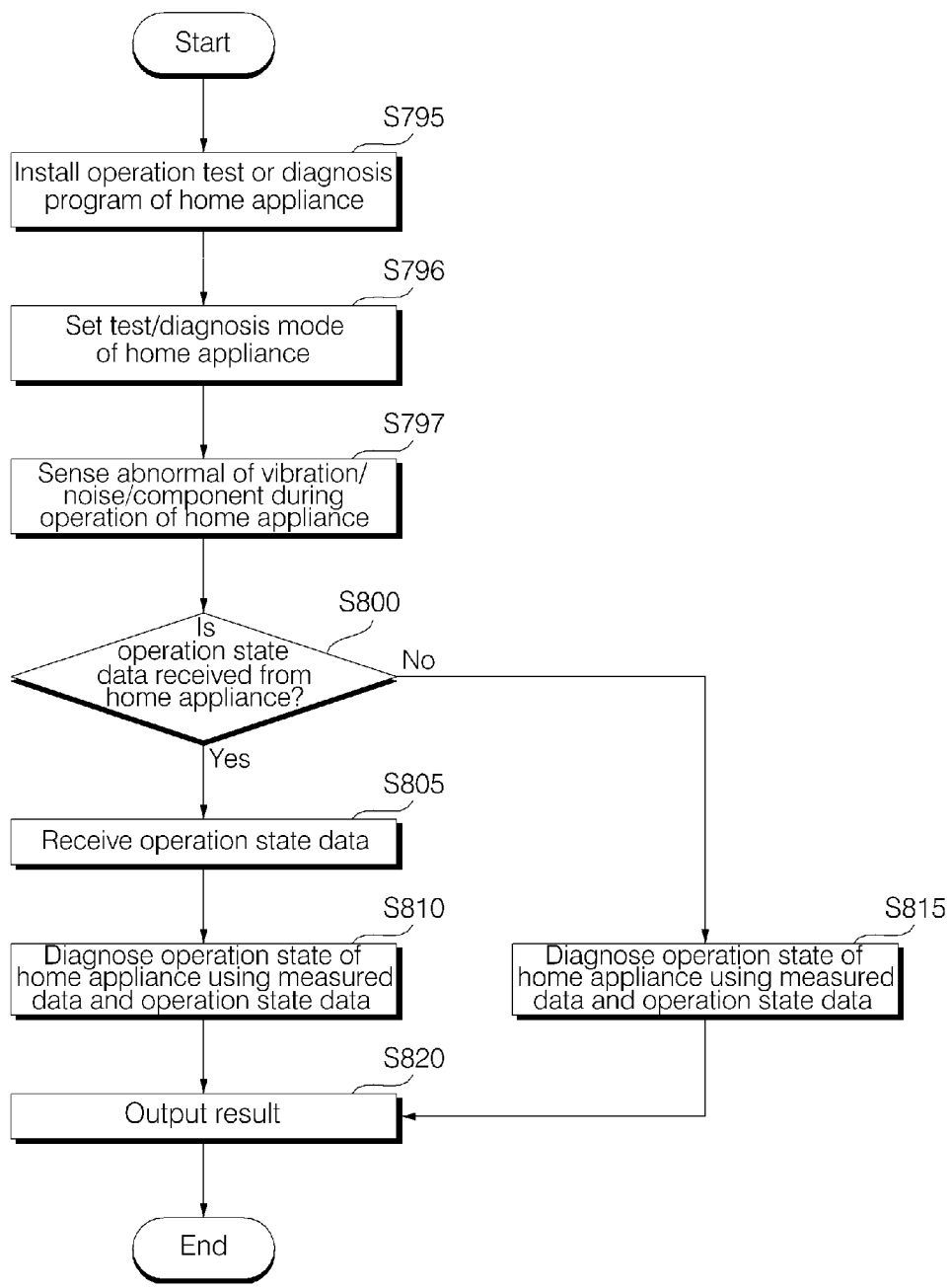
FIG. 28 is a flowchart illustrating an operating method of the mobile terminal that collects data and diagnoses the state of the home appliance when the home appliance operates in the test mode.

FIG. 28 is a flowchart illustrating an operating method of the mobile terminal that collects data and diagnoses the state of the home appliance when the home appliance operates in the test mode. Referring to FIG. 28, the mobile terminal M installs a test for the home appliance or a diagnosis program for diagnosing an operation state of the home appliance (S795).

The terminal control unit 81 may install a program for measuring vibration or noise of the home appliance and a diagnosis program for diagnosing an operation state of the home appliance using measured data or operation state data of the home appliance. When the diagnosis program is installed, diagnosis data is stored together with the diagnosis program. In this case, the terminal control unit 81 may download a program through the Internet and install the download program.

The terminal control unit 81 sets a measurement mode of the home appliance (S796). The terminal control unit 81 controls a predetermined guide message to be output through the output unit 85 according to data to be measured as described above. In this case, the guide message may include at least one of a character, a number and an image. The guide message may be output as a guide sound.

During the operation of the home appliance, the mobile terminal M measures and stores vibration and noise generated in the home appliance (S797). The mobile terminal M photographs an image of the home appliance. The terminal control unit 81 controls at least one of the vibration sensing unit 87*a*, the noise measuring unit 87*c*, the microphone 89 and the camera 86 to be operated, and stores the measured or photographed data.

After the measurement is finished, the terminal control unit 81 determines whether the mobile terminal M is connected to the home appliance through the communication unit 82 or the home appliance connecting unit 83 (S800). In a case where the mobile terminal M is connected to the home appliance, the terminal control unit 81 receives operation state data from the home appliance (S805).

The terminal control unit 81 executes a diagnosis program and diagnoses the operation state of the home appliance using the receive operation state data (S810).

Meanwhile, in a case where the mobile terminal is not connected to the home appliance, the terminal control unit 81 executes the diagnosis program and diagnoses the operation state of the home appliance using the measured data (S815).

If the diagnosis is finished, the terminal control unit 81 outputs a diagnosis result (S820). In a case where the mobile terminal M is connected to the home appliance, the terminal control unit 81 transmits the diagnosis result to the home appliance.

Figure 29:
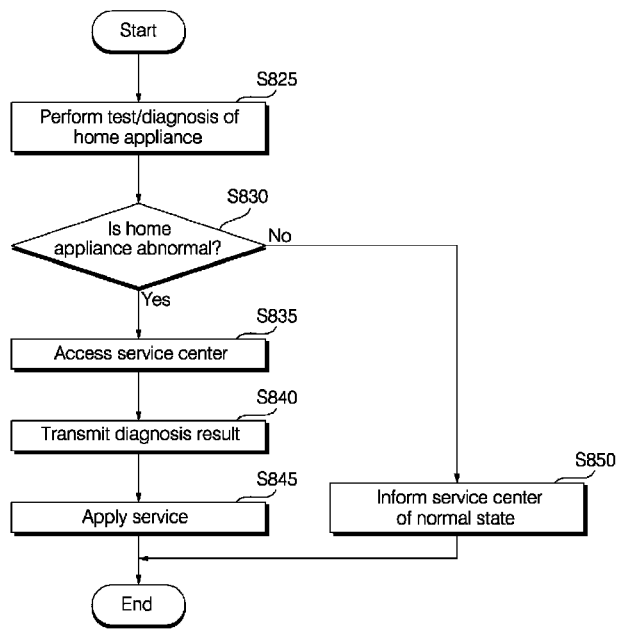
FIG. 29 is a flowchart illustrating an operating method of the mobile terminal connected to a service center after the diagnosis of the home appliance.

FIG. 29 is a flowchart illustrating an operating method of the mobile terminal connected to a service center after the diagnosis of the home appliance.

Referring to FIG. 29, the mobile terminal M performs a diagnosis of the home appliance using the measured data or the operation state data received from the home appliance as described above (S825).

In the home appliance is abnormal corresponding to a diagnosis result (S830), the terminal control unit 81 accesses a service center (S835) and transmits the diagnosis result to the service center (S840). The terminal control unit 81 requests the service center of a service for the home appliance (S845).

In a case where the home appliance normally operates as the diagnosis result, the terminal control unit 81 outputs a guide message for informing the service center that the home appliance is in a normal state (S850).

As the home appliance and the mobile terminal operate as described above, the data measurement of the home appliance can be conveniently performed using the home appliance by installing a program in the mobile terminal, and the operation state of the home appliance can be confirmed and diagnosed. Further, the mobile terminal can access the service center according to the operation state of the home appliance, so that A/S can be easily provided.

Figure 30:
FIG. 30 illustrates a configuration of connection between the home appliance and the mobile terminal according to an embodiment of the present invention.

FIG. 30 illustrates a configuration of connection between the home appliance and the mobile terminal according to an embodiment of the present invention. Referring to FIG. 30, the mobile terminal M is connected to the home appliance.

In this case, the terminal mounting unit may be disposed on the top of the home appliance, and the mobile terminal M is mounted and fixed to the terminal mounting unit.

As described above, the mobile terminal may be connected to the home appliance through a connection line with a predetermined length. The mobile terminal M may be connected to the home appliance by wireless through the communication unit. However, although the mobile terminal M is connected to the home appliance by wireless, the mobile terminal M is preferably positioned within a predetermined distance from the home appliance. When the mobile terminal M and the home appliance are connected to each other by wire/wireless, the mobile terminal M and the home appliance communicate predetermined data with each other.

The mobile terminal M collects ambient sounds and recognizes a user's voice using the recognition program and voice recognition data provided thereto. The mobile terminal M transmits predetermined data according to the voice recognition to the home appliance.

The home appliance receives the predetermined data transmitted from the mobile terminal M as the voice recognition result, and changes the operation of the home appliance, based on the received data. The home appliance generates data on the operation state of the home appliance, corresponding to the data received from the mobile terminal M, and transmits the generated data to the mobile terminal M.

The mobile terminal M may output the operation state data of the home appliance as voice or display the operation state data of the home appliance as a character on a screen, corresponding to the format of the data received from the home appliance.

In this case, the user's voice recognized in the mobile terminal M is a user's voice command for controlling the operation of the home appliance. The mobile terminal M may be mounted to the home appliance so as to recognize the voice command or may be positioned within a predetermined distance.

Figure 31:
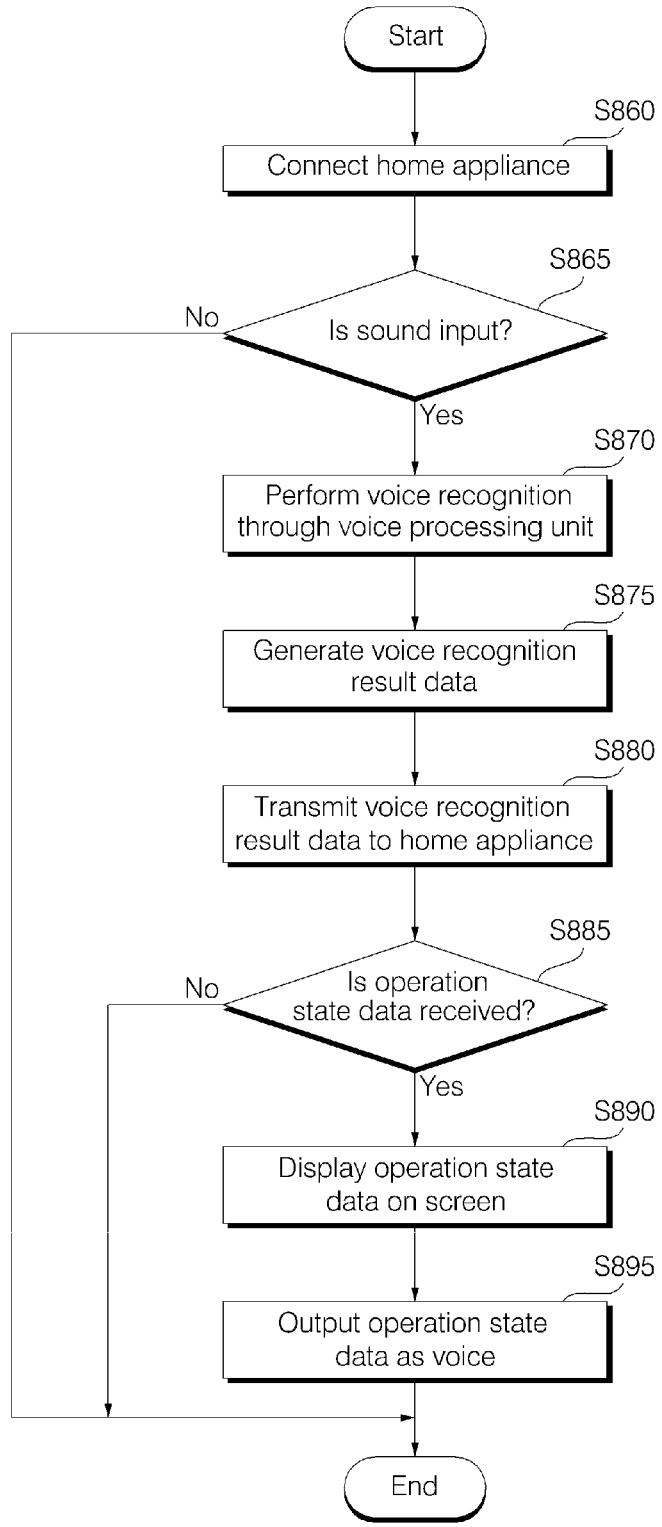
FIG. 31 is a reference flowchart illustrating a method for controlling an operation of the home appliance of the present invention through the mobile terminal.

FIG. 31 is a reference flowchart illustrating a method for controlling an operation of the home appliance of the present invention through the mobile terminal.

In a case where the mobile terminal is mounted or connected to the home appliance by recognizing a connection state between the mobile terminal and the home appliance (S860), the mobile terminal performs a voice recognition mode according to setting. The terminal control unit controls ambient sounds to be collected through the microphone by driving the microphone (S865).

The voice processing unit converts sound information collected through the microphone, and performs voice recognition, based on the converted data (S870). In this case, the voice processing unit distinguishes voice from noise, based on the previously stored voice information and voice data, and recognizes the voice, thereby generating predetermined data (S875).

If the voice recognition is finished through the voice processing unit, the terminal control unit transmits voice recognition result data to the home appliance (S880). In this case, the transmission may be changed depending on a connection scheme.

If operation state data is received from the home appliance (S885), the terminal control unit provides the operation state data to the display unit so as to display the operation state of the home appliance on the screen (S890) or to output the operation state of the home appliance as voice through the speaker (S895). The terminal control unit may display the operation state of the home appliance on the screen and simultaneously outputs the operation state of the home appliance as voice through the speaker.

The voice processing unit converts operation state data of the home appliance and controls voice corresponding to a character to be output through the speaker, so that the operation state data is output as the voice through the speaker.

Figure 32:
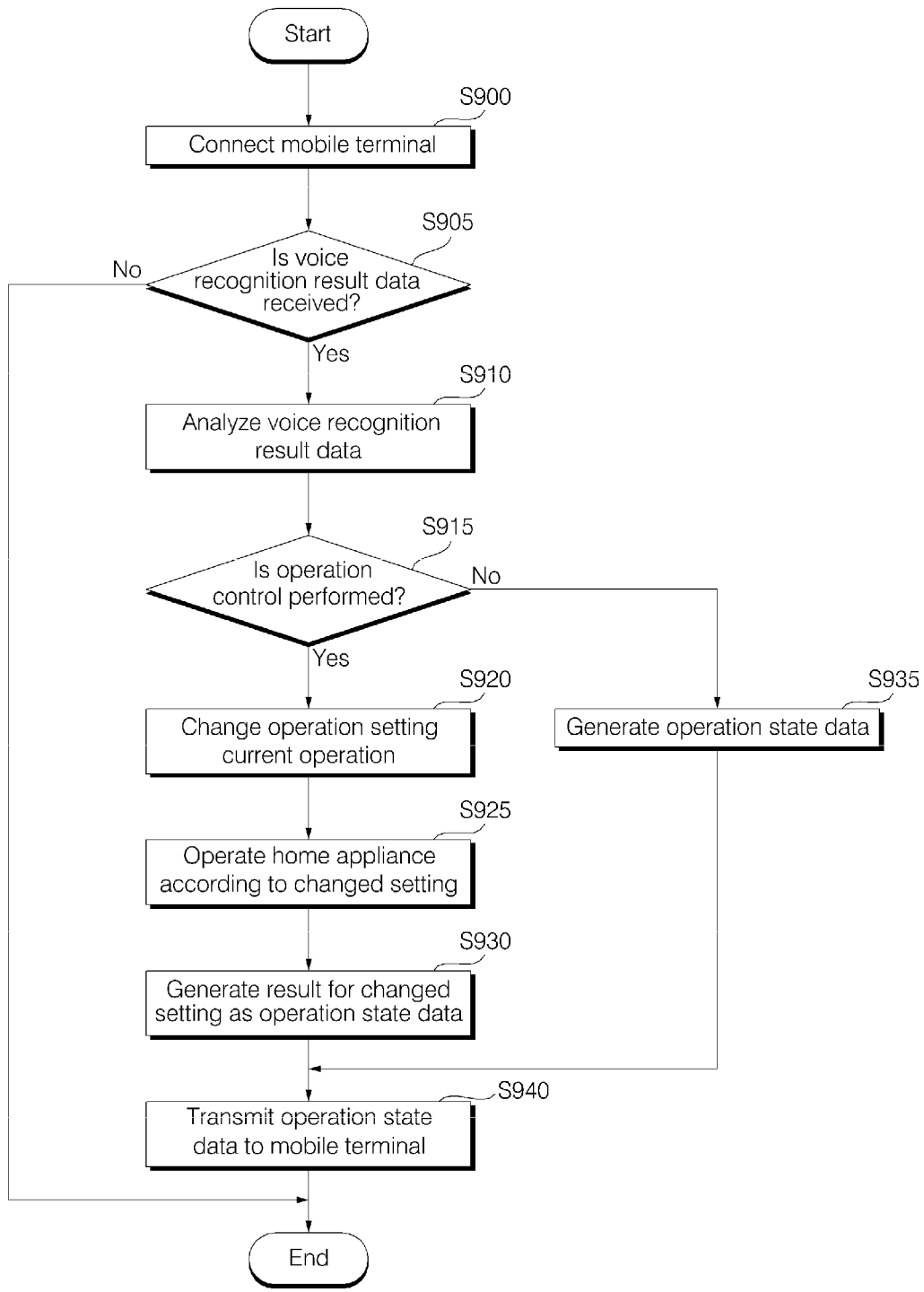
FIG. 32 is a reference flowchart illustrating voice recognition of the mobile terminal and a method for controlling an operation of the home appliance based on the voice recognition according to an embodiment of the present invention.

FIG. 32 is a reference flowchart illustrating voice recognition of the mobile terminal and a method for controlling an operation of the home appliance based on the voice recognition according to an embodiment of the present invention.

Referring to FIG. 32, if the home appliance is connected to the mobile terminal (S900), the home appliance transmits information on an operation thereof to the mobile terminal.

If voice recognition result data is received from the mobile terminal (S905), the home appliance analyzes the voice recognition result data (S910) and generates a control command corresponding to the voice recognition result data. Then, the home appliance provides the control command to each component thereof.

In a case where voice input according to the voice recognition result data is one related to an operation control (S915), the control unit changes setting for the operation of the home appliance or variably controls a current operation being performed (S920). The home appliance is operated according to the changed setting (S925).

The control unit generates operation state data of the current or finished operation of the home appliance (S930) and transmits the operation state data to the mobile terminal (S940).

In a case where the voice recognition result data is one related a monitoring information request, the control unit generates operation state data and immediately transmits the operation state data to the mobile terminal (S935).

In a case where the voice recognition result data is one related to the operation control, the control unit controls the operation of the home appliance as described above. Then, the control unit generates information on the control result as the operation state data and transmits the generated information to the mobile terminal, so that the result for the operation control through voice is output through the mobile terminal.

As the home appliance and the mobile terminal operate as described above, voice is conveniently recognized using the home appliance by installing a program in the mobile terminal and then applied to the home appliance, so that the home appliance can be controlled using voice, and the state information of the home appliance can be output as voice through the mobile terminal.

Figure 33:
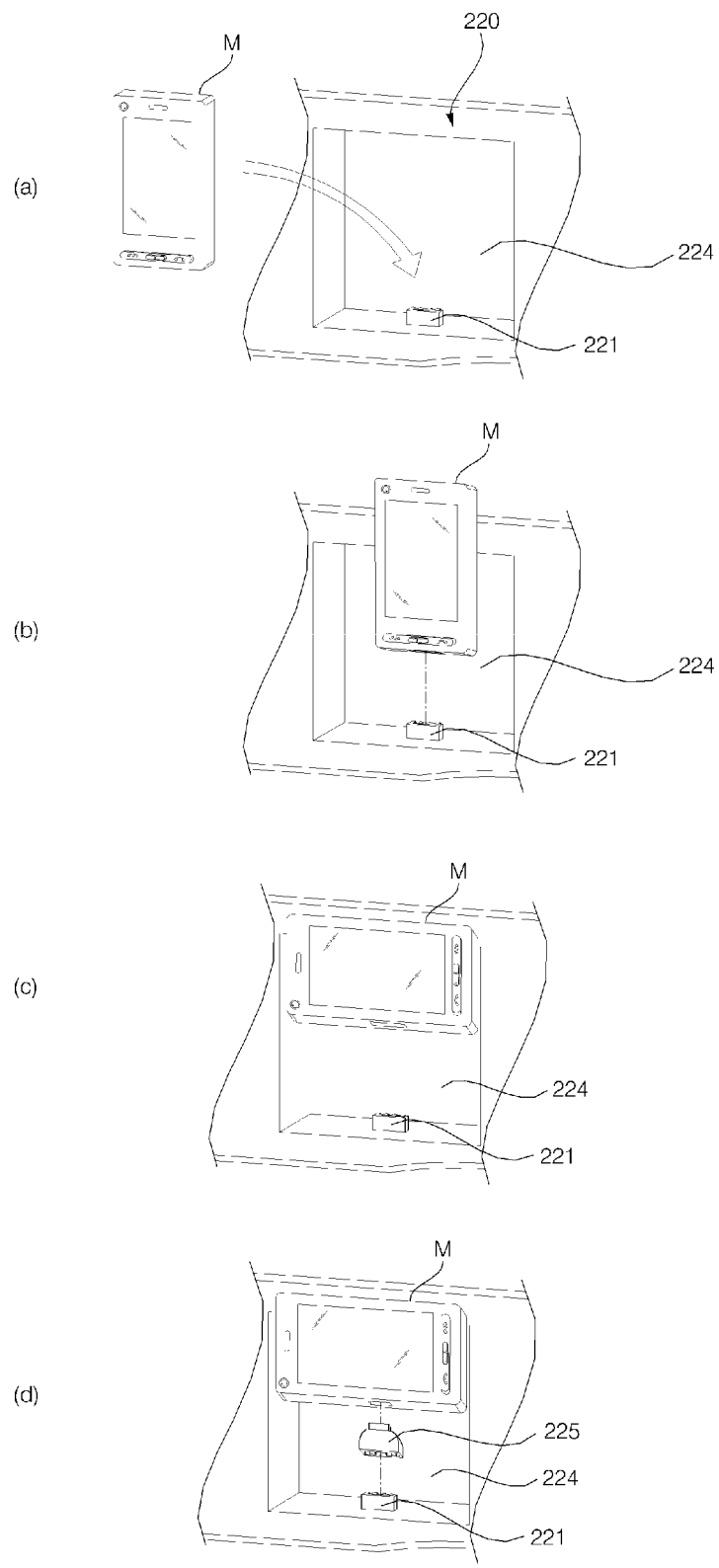
FIG. 33 illustrates a connection configuration of the home appliance to the mobile terminal according to an embodiment of the present invention.
Figure 34:
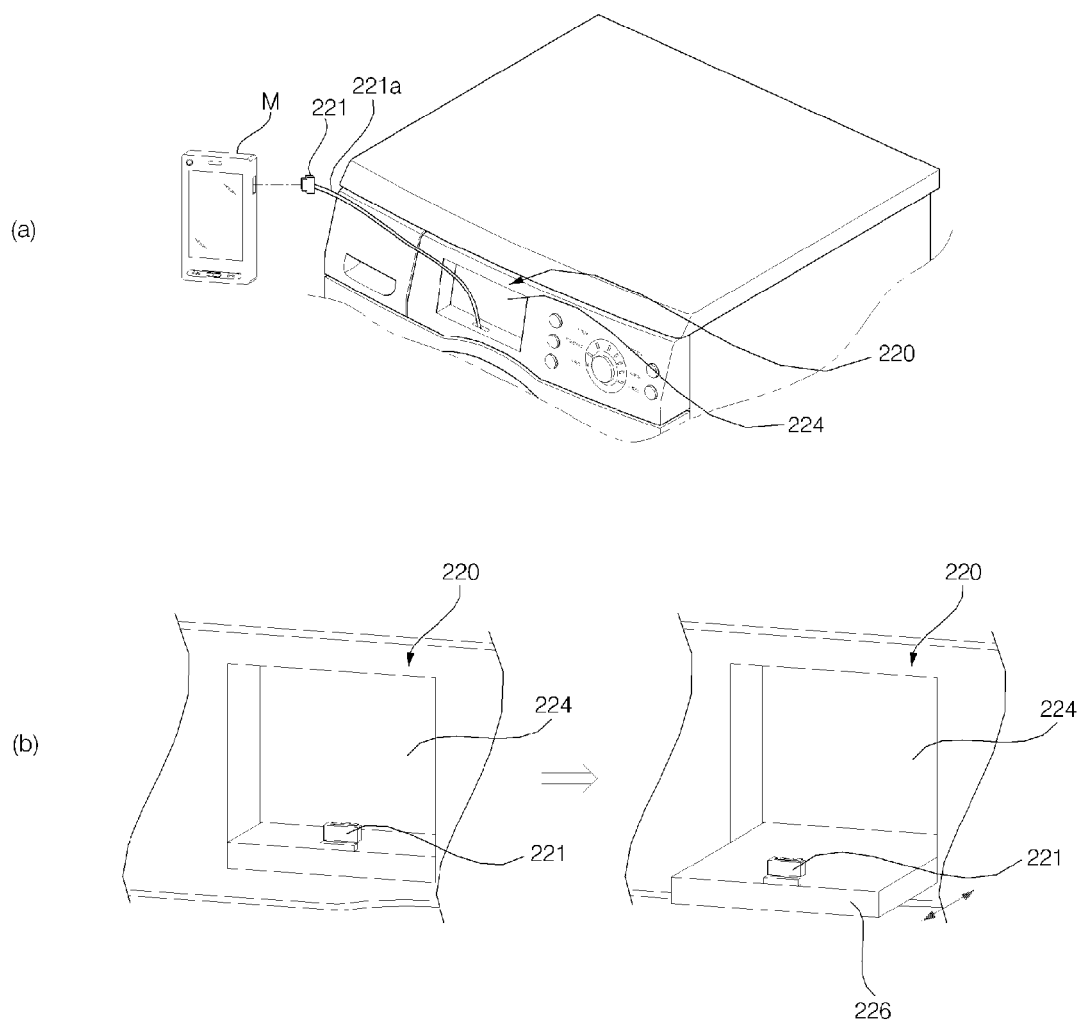
FIGS. 34 and 35 illustrate a structure of the terminal mounting unit of the home appliance and connection of the home appliance to the mobile terminal according to an embodiment of the present invention.
Figure 35:
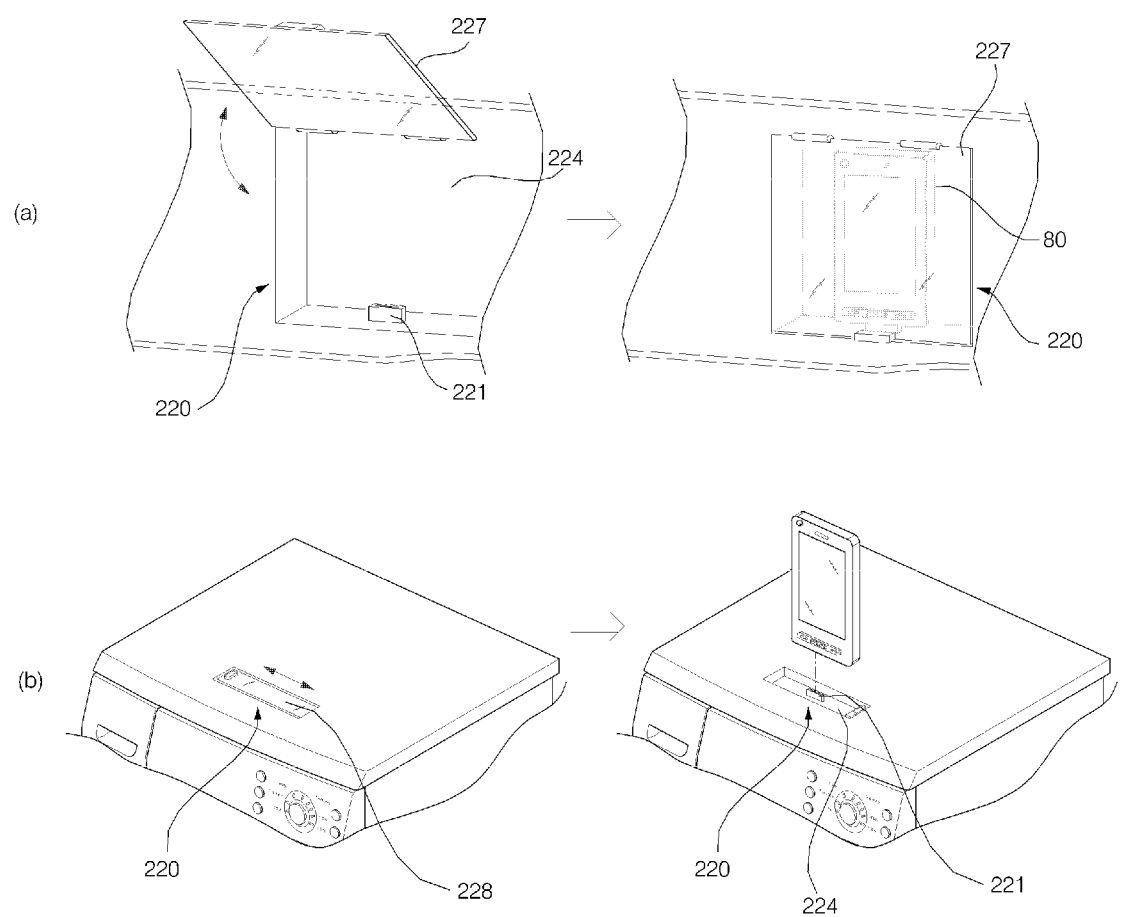

FIG. 33 illustrates a connection configuration of the home appliance to the mobile terminal according to an embodiment of the present invention. FIGS. 34 and 35 illustrate a structure of the terminal mounting unit of the home appliance and connection of the home appliance to the mobile terminal according to an embodiment of the present invention.

As shown in FIG. 33(a), the terminal mounting unit 140 or 220 is provided at the front of the home appliance, and has a connection terminal 221 through which the mobile terminal can be mounted to the terminal mounting unit 140 or 220.

As shown in FIG. 33(b), the mobile terminal M is connected to the connection terminal 221 of the terminal mounting unit 140, and is mounted in a concave space 224 of the terminal mounting unit 140.

In this case, the mobile terminal M may be mounted in a longitudinal direction as shown in FIGS. 33(a) and 33(b), and may be mounted in a lateral direction as shown in FIG. 33(c) according to the position of a terminal of the mobile terminal M. The mobile terminal M may automatically change the direction of the screen according to the mounted direction and display the changed direction.

The space 224 having the mobile terminal M mounted therein is preferably formed to have a size in which the mobile terminal M can be mounted in the lateral or longitudinal direction. The terminal mounting unit 140 may further include a support platform fixing the mounted mobile terminal M.

The connection terminal 221 may be connected to the mobile terminal M through a separate gender 225 as shown in FIG. 33(d).

As shown in FIG. 34(a), the connection terminal 221 may be formed to protrude to the outside by being connected to an extension line 221a. In this case, the extension line 221a is connected to the connection terminal 221 so as to be automatically wound inside the home appliance. Thus, if the mobile terminal M is mounted in the space 224 of the home appliance after the mobile terminal is connected to the home appliance, the extension line 221a is wound inside the home appliance.

As shown in FIG. 34(b), the terminal mounting unit 140 may be configured so that a bottom support platform 226 having the connection terminal 221 provided thereto is protruded to the front of the home appliance.

As the bottom support platform 226 is protruded to the front of the home appliance, the mobile terminal M can be easily mounted together with the extension line 221a.

As shown in FIG. 35(a), the terminal mounting unit 140 may be provided with a connection terminal cover 227 protecting the connection terminal 221 or the mobile terminal M connected to the connection terminal 221 from external impact, moisture, etc.

In this case, the connection terminal cover 227 is connected to the top of the terminal mounting unit 140 so as to be lifted. Thus, the connection terminal cover 227 is configured to open/close the terminal mounting unit 140. When necessary, the connection terminal cover 227 may be formed in a structure in which the connection terminal cover 227 opens/closes the terminal mounting unit 140 by moving to the top/bottom or left/right.

As shown in FIG. 36(b), the terminal mounting unit 140 may include a connection terminal cover 228 provided to the top of the home appliance so as to protect the connection terminal 221 and the mobile terminal M from external impact. The terminal mounting unit 140 may further include a support platform fixing the mobile terminal so that the mobile terminal is mounted in the lateral or longitudinal direction.

Figure 36:
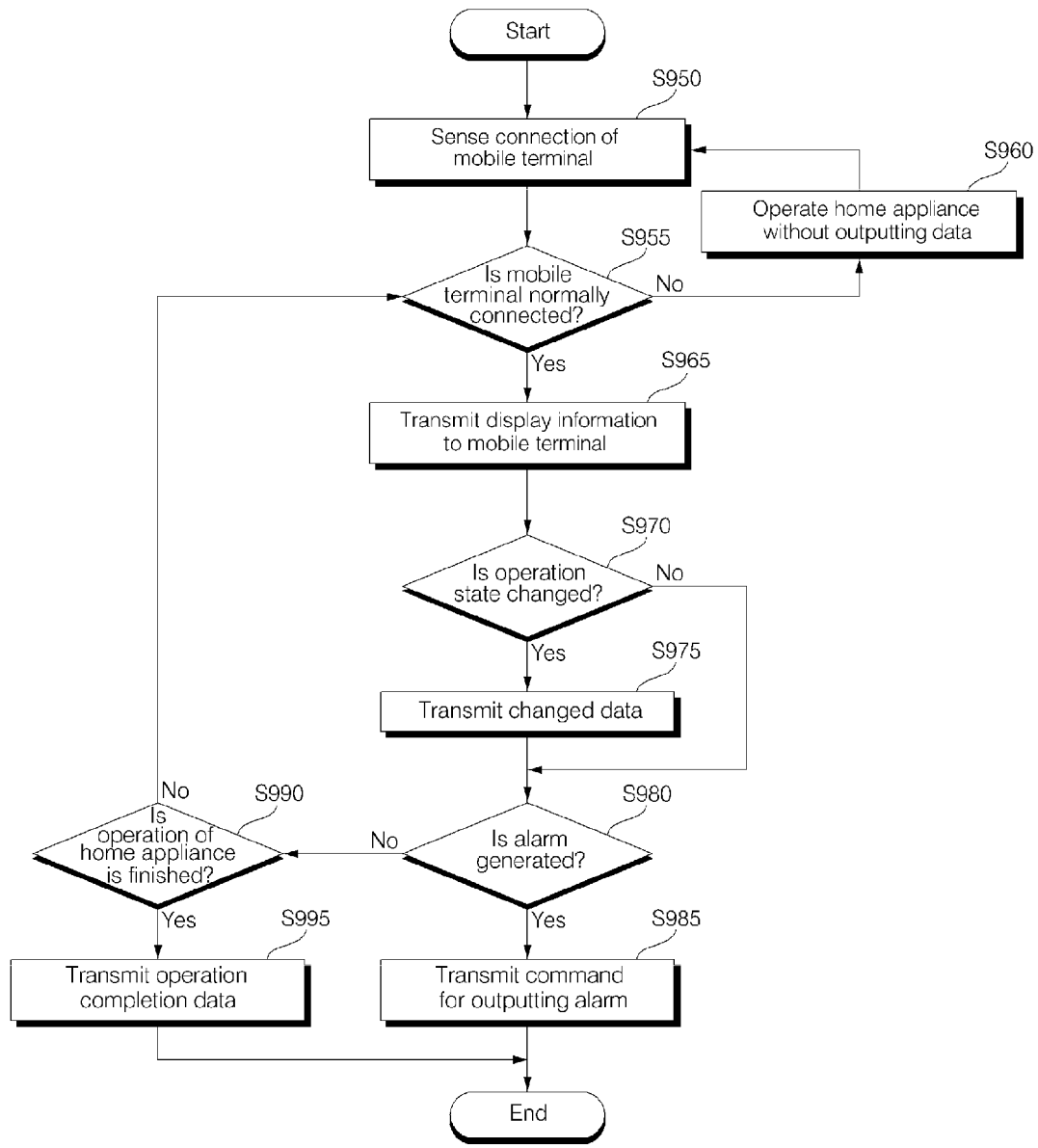
FIG. 36 is a flowchart illustrating a method for displaying an operating state of the home appliance having the mobile terminal mounted thereto through the mobile terminal.
Figure 37:
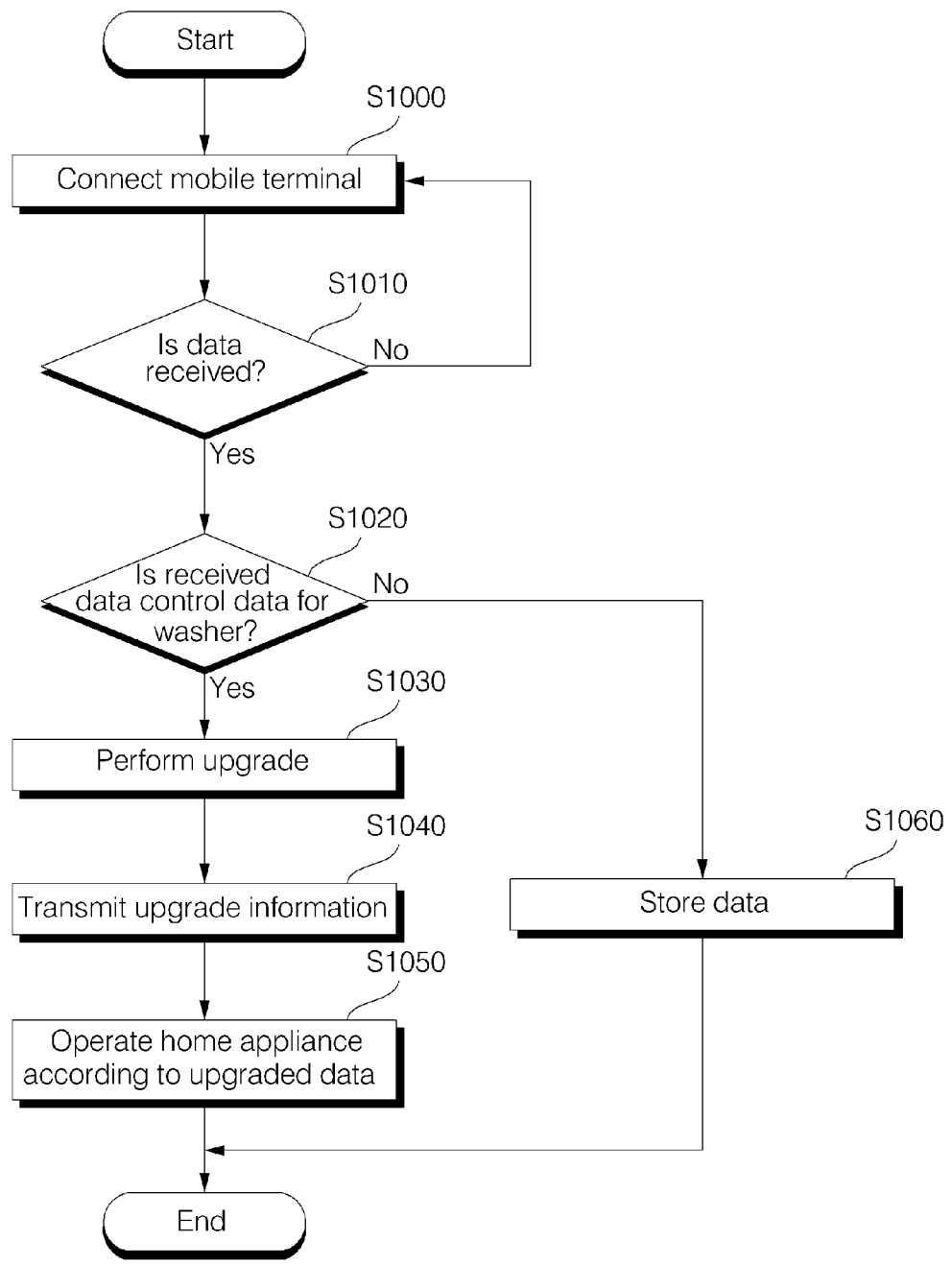
FIG. 37 is a flowchart illustrating an operating method of the home appliance for data received from the mobile terminal mounted to the home appliance.
Figure 38:
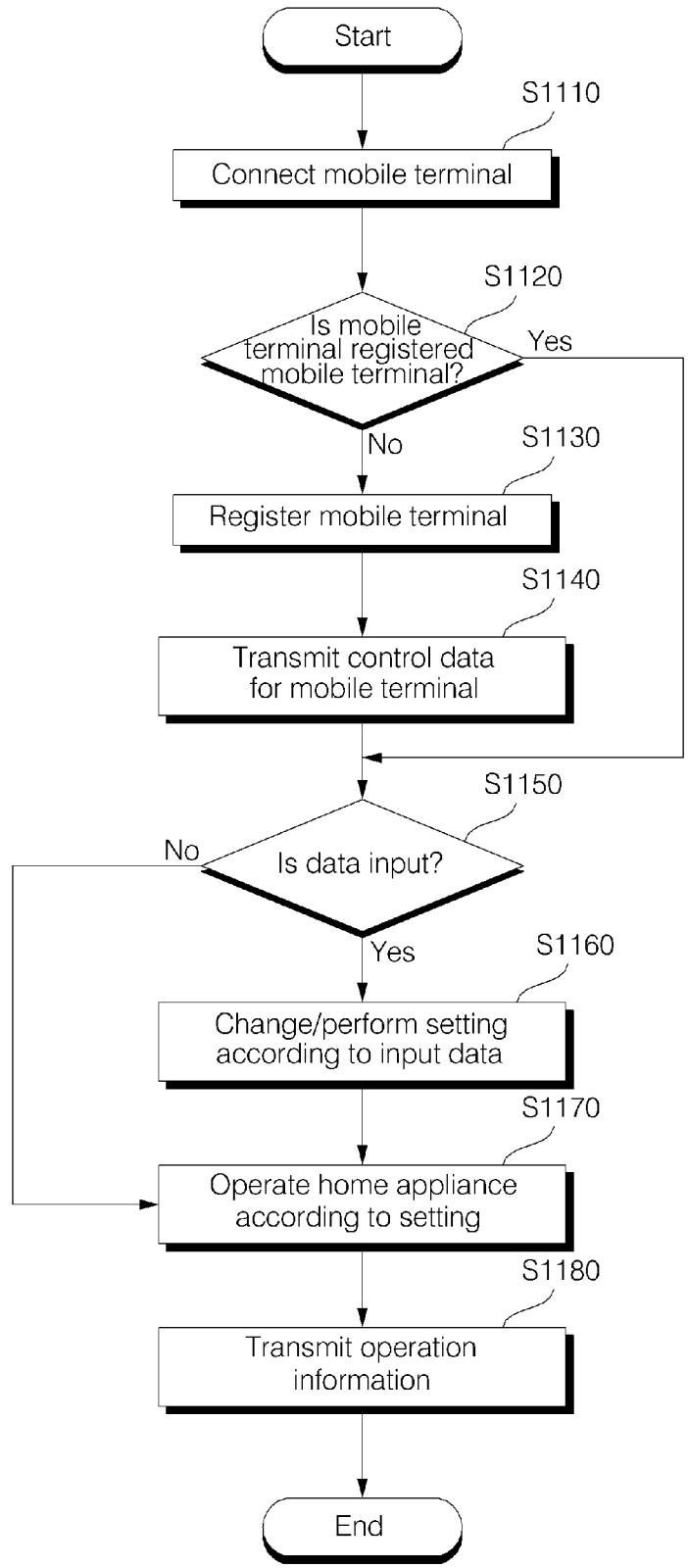
FIG. 38 is a flowchart illustrating a method for registering the home appliance to the mobile terminal and a data processing method when the mobile terminal is mounted to the home appliance.

FIGS. 36 to 38 are flowcharts illustrating a method for sensing a mobile terminal connected to a home appliance and operating the mobile terminal connected to the home appliance.

FIG. 36 is a flowchart illustrating a method for displaying an operating state of the home appliance having the mobile terminal mounted thereto through the mobile terminal. Referring to FIG. 36, the home appliance senses a connection of the mobile terminal with respect to whether the mobile terminal is mounted to the terminal mounting unit 140 (S950). The connection sensing unit 222 of the terminal mounting unit 140 senses whether the mobile terminal is connected to the connection terminal 221 and accordingly provides a sensing signal to the control unit 170.

The control unit 170 determines whether the mobile terminal M is connected to the connection terminal 221, corresponding to the input sensing signal. In a case where the mobile terminal M is normally connected to the connection terminal 221 (S955), the control unit 170 generates operation state data including operation information of the home appliance or setting information before the operation of the home appliance, and transmits the operation state data to the mobile terminal M through the terminal mounting unit 140 (S965). Accordingly, the mobile terminal M receives the operation state data and displays the information included in the operation state data in the display means.

In a case where the mobile terminal M is not connected to the connection terminal 221, the control unit 170 maintains the operation of the home appliance without a separate data output (S960). In a case where a separate display unit is provided to the home appliance, the operation state may be output through the display unit provided to the home appliance.

In a case where the operation state is changed during the operation of the home appliance (S970), the control unit 170 transmits the changed data to the mobile terminal M, and controls the transmitted data to be displayed through the mobile terminal (S975). For example, in a case where a main washing cycle is finished and a rinsing cycle is then performed, the control unit 170 generates a progress situation of the rinsing cycle and contents of the rinsing cycle as operation state data and transmits the operation state data to the outside.

When an alarm is generated (S980), e.g., when the level of water is abnormal or when the temperature of water is abnormal, the control unit 170 transmits information on the generated alarm to the mobile terminal (S985).

Accordingly, when being mounted to the home appliance, the mobile terminal M displays the operation state data of the home appliance.

Meanwhile, if the operation of the home appliance is finished without any alarm (S990), the control unit 170 stores data on the performed operation, and informs the mobile terminal M that the set operation has been finished (S995). The mobile terminal M displays a guide message for informing the mobile terminal that the set operation has been finished.

The home appliance continuously or periodically senses a connection state between the connection terminal 221 and the mobile terminal M through the connection sensing unit 222. The control unit 170 determines the presence of changing of the mounting state of the mobile terminal M until the operation of the home appliance is finished (S955). Then, the control unit 170 determines whether the operation state is changed and accordingly data according to the determined result to the mobile terminal M, so that the operation state of the home appliance is displayed through the mobile terminal M.

FIG. 37 is a flowchart illustrating an operating method of the home appliance for data received from the mobile terminal mounted to the home appliance. As shown in FIG. 37, if the mobile terminal M is mounted to the terminal mounting unit 140 (S1000), the mobile terminal M outputs operation state data of the home appliance and transmits input data to the home appliance.

If predetermined data is received from the mobile terminal M (S1010), the control unit 170 determines whether the received data is control data of the washer (S1020).

In a case where the input data is control data of the washer, the control unit 170 performs upgrade by converting control data of the home appliance into new input data (S1030).

When the upgrade is finished, the control unit 170 transmits information on the upgrade to the mobile terminal (S1040), and performs an operation of the home appliance, based on the upgraded data (S1050).

Meanwhile, in a case where the data input from the mobile terminal is not control data of the washer (S1020), the control unit 170 stores the input data in the memory unit 150 (S1060).

Thus, in the home appliance and the method for operating the same according to the present invention, it is possible to confirm the operation state of the home appliance without providing any separate display means to the home appliance.

Further, it is possible to display information on the operation state of the home appliance using the mobile terminal mounted to the home appliance and to partially supplement functions of the home appliance using the mobile terminal.

FIG. 38 is a flowchart illustrating a method for registering the home appliance to the mobile terminal and a data processing method when the mobile terminal is mounted to the home appliance.

Referring to FIG. 38, if the mobile terminal M is mounted to the terminal mounting unit 140 (S1110), the control unit 170 of the home appliance determines whether the mobile terminal M is one previously registered (S1120).

In this case, the control unit 170 determines the presence of registration of the mobile terminal M using terminal information on the previously registered mobile terminal. Here, a separate authentication process may be further included.

Meanwhile, in a case where the mobile terminal M is an unregistered mobile terminal, the control unit 170 registers the unregistered mobile terminal as a new mobile terminal. (S1130), and transmits, to the mobile terminal, terminal control data for displaying data required to transmit/receive data when the mobile terminal is connected to the home appliance or operation state data transmitted from the home appliance (S1140).

When necessary, the control unit 170 does not register the unregistered mobile terminal and controls only the operation state to be displayed.

If predetermined data is input to the home appliance from the mobile terminal M connected to the connection terminal 221 of the terminal mounting unit 140 (S1150), the control unit 170 changes the operation of the home appliance and the setting for the operation of the home appliance according to the input data (S1160).

If the setting for the operation of the home appliance is changed by the control unit 170 according to the input data, the control unit 170 controls the home appliance to be operated according to the corresponding setting (S1170), and provides the operation state data according to the operation of the home appliance to the mobile terminal M so that the operation state data is displayed through the mobile terminal (S1180).

Although the preferred embodiment and other embodiments of the method for preparing high-purity alumina according to the present invention has been explained in detail with reference to the accompanying drawings. However, the embodiments of the present invention are not limited thereto, and it will be apparent that various modifications and other embodiments are possible within the scope of the invention. Accordingly, the substantial scope of the invention shall be determined only by the appended claims and their equivalents.

The invention claimed is:

1. A home appliance, comprising:
   a terminal mounting unit to which a mobile terminal having a display means is mounted; and
   a control unit transmitting operation state data to the mobile terminal through the terminal mounting unit during an operation of the home appliance, and controlling the operation state data to be displayed in the mobile terminal, when the mobile terminal is mounted to the terminal mounting unit,
   wherein the control unit transmits, to the mobile terminal, the operation state data including at least one of operation setting, progress state during operation, remaining time, and guide information, and controls the operation state data to be displayed in a display means of the mobile terminal, and
   wherein the mobile terminal includes a program or a control menu for the home appliance, and performs the program or the control menu when mounted to the home appliance to output the operation state data received from the home appliance.

2. The home appliance of claim 1, wherein the control unit controls the operation state data to be displayed as at least one combination of a character, a number, a special character and an image in a display means provided to the mobile terminal.

3. The home appliance of claim 1, wherein the control unit changes the operation of the home appliance, corresponding to data received from the mobile terminal through the terminal mounting unit.

4. The home appliance of claim 1, wherein the terminal mounting unit comprises:
   a connection terminal electrically connected to the mobile terminal;
   a connection sensing unit sensing whether the mobile terminal is mounted to the terminal mounting unit through the connection terminal; and
   a data processing unit transmitting the operation state data to the mobile terminal through the connection terminal and providing the data received from the mobile terminal to the control unit.

5. The home appliance of claim 4, wherein the terminal mounting unit is provided at the front of the home appliance, has the connection terminal so that the mobile terminal is mounted in a lateral or longitudinal direction, and further includes a support platform allowing the mobile terminal to be fixed thereto.

6. The home appliance of claim 4, wherein, which the mobile terminal is mounted to the terminal mounting unit, the terminal mounting unit further includes a connection terminal cover protecting the mobile terminal from external impact.

7. The home appliance of claim 4, wherein the terminal mounting unit is configured so that a bottom support platform provided with the connection terminal is protruded to the front of the home appliance.

8. The home appliance of claim 4, wherein the terminal mounting unit further comprises:
   a connection terminal cover provided at the top of the home appliance so as to protect the connection terminal and the mobile terminal from external impact; and
   a support platform fixing the mobile terminal so that mobile terminal is mounted in the lateral or longitudinal direction when the connection terminal cover is opened.

9. The home appliance of claim 1, wherein, if the mobile terminal is mounted to the terminal mounting unit, the control unit determines whether the mobile terminal is registered, and registers the mobile terminal according to terminal information received from the mobile terminal when the mobile terminal is not registered.

10. The home appliance of claim 1, further comprising:
    a communication unit communicating with the mobile terminal by wire/wireless,
    wherein, if the mobile terminal is separated from the terminal mounting unit, the control unit controls the home appliance to communicate data with the mobile terminal through the communication unit.

11. The home appliance of claim 1, further comprising:
    a display unit outputting an operation state,
    wherein, if the mobile terminal is mounted to the terminal mounting unit, the control unit sets the display means of the mobile terminal as a main display and sets the display unit as an auxiliary display, and
    wherein, if the mobile terminal is separated from the terminal mounting unit, the control unit displays the operation state through the display unit.

12. A method for operating a home appliance, comprising:
    sensing whether a mobile terminal is mounted to the home appliance;
    transmitting operation state data of the home appliance to the mobile terminal, when the mobile terminal is mounted to the home appliance;
    outputting the operation state data through the mobile terminal, when the mobile terminal performs a stored program or a control menu for the home appliance; and
    operating the home appliance by changing an operation setting according to data input from the mobile terminal, when the data is input from the mobile terminal,
    wherein the operation state data includes at least one of operation setting, progress state during operation, remaining time and guide information, and is displayed in a display means of the mobile terminal.

13. The method of claim 12, wherein the operation state data is displayed as at least one combination of a character, a number, a special character and an image in a display means of the mobile terminal.

14. The method of claim 12, further comprising:
    determining whether the mobile terminal is registered when the mobile terminal is mounted to the home application, and registering the mobile terminal according to terminal information received from the mobile terminal when the mobile terminal is not registered.

15. The home appliance of claim 1, wherein the mobile terminal generates a control signal for an input voice by recognizing the input voice, and transmits the control signal to the home appliance, when the mobile terminal is connected to the home appliance by being mounted to the terminal mounting unit.

16. The home appliance of claim 15, wherein the mobile terminal comprises:
a connection unit electrically connecting the mobile terminal to the home appliance when the mobile terminal is mounted to the terminal mounting unit;
a communication unit connected to the home appliance through wireless communication;
a data unit storing data for voice conversion and information of a control signal according to a voice;
a voice processing unit recognizing an input voice and generating a control signal corresponding to the voice; and
a control unit transmitting the control signal to the home appliance through the connection unit, and transmitting the control signal the home appliance through the communication unit, when the mobile terminal is not connected to the home appliance through the connection unit.

17. The method of claim 12, further comprising:
inputting a control signal corresponding to a voice from the mobile terminal when the voice is recognized in the mobile terminal;
starting or finishing an operation, corresponding to the control signal, and changing an operation being performed by the home appliance; and
transmitting information on an operation performed or changed, corresponding to the control signal, as operation state data to the mobile terminal.

18. A method for operating a mobile terminal, comprising:
sensing whether the mobile terminal is mounted to a home appliance;
performing a program or a control menu for the home appliance to control and monitor the home appliance;
receiving operation state data from the home appliance;
displaying the operation state data on a screen or converting the operation state data into a voice and then displaying the voice through a speaker;
converting and analyzing an input voice, when the input voice is sensed; and
generating a control signal corresponding to the voice and providing the generated control signal to the home appliance, when the voice is a voice related to a control of the home appliance.

* * * * *